(12) United States Patent
Nakamura et al.

(10) Patent No.: US 7,074,843 B2
(45) Date of Patent: Jul. 11, 2006

(54) MICROENCAPSULATED PIGMENT, PRODUCTION PROCESS THEREFOR, AQUEOUS DISPERSION AND INK JET RECORDING INK

(75) Inventors: Hiroto Nakamura, Nagano (JP); Toshiyuki Miyabayashi, Nagano (JP); Masahiro Yatake, Nagano (JP); Hidehiko Komatsu, Nagano (JP)

(73) Assignee: Seiko Epson Corporation, Tokyo (JP)

(*) Notice: Subject to any disclaimer, the term of this patent is extended or adjusted under 35 U.S.C. 154(b) by 104 days.

(21) Appl. No.: 10/228,162

(22) Filed: Aug. 26, 2002

(65) Prior Publication Data

US 2003/0195274 A1    Oct. 16, 2003

(30) Foreign Application Priority Data

| Aug. 27, 2001 | (JP) | P.2001-256025 |
| Aug. 27, 2001 | (JP) | P.2001-256033 |
| Feb. 15, 2002 | (JP) | P.2002-038793 |
| Aug. 23, 2002 | (JP) | P.2002-242979 |

(51) Int. Cl.
  *C08K 9/10* (2006.01)
  *C08K 5/23* (2006.01)

(52) U.S. Cl. ................ 523/205; 524/190

(58) Field of Classification Search ........... 523/160, 523/161, 200, 205; 428/403, 407; 524/190
See application file for complete search history.

(56) References Cited

U.S. PATENT DOCUMENTS

| 5,219,943 A | * | 6/1993 | Akasaki et al. ............ 525/273 |
| 5,747,611 A | * | 5/1998 | Tanabe ..................... 526/73 |
| 6,234,601 B1 | * | 5/2001 | Hayashi et al. ............ 347/16 |
| 6,511,534 B1 | * | 1/2003 | Mishina et al. .......... 106/31.33 |
| 2003/0050362 A1 | * | 3/2003 | Sakai et al. ............... 523/160 |

FOREIGN PATENT DOCUMENTS

| EP | 947567 A1 | * | 10/1999 |
| EP | 1006161 A1 | * | 6/2000 |
| EP | 1077238 A1 | * | 2/2001 |
| JP | 3-157464 A | | 7/1991 |
| JP | 5-320276 A | | 12/1993 |
| JP | 5-339516 A | | 12/1993 |
| JP | 7-94634 B | | 10/1995 |
| JP | 8-59715 A | | 3/1996 |
| JP | 8-81647 A | | 3/1996 |
| JP | 8-183920 A | | 7/1996 |
| JP | 8-218015 A | | 8/1996 |
| JP | 8-295837 A | | 11/1996 |
| JP | 8-302227 A | | 11/1996 |
| JP | 8-302228 A | | 11/1996 |
| JP | 9-3376 A | | 1/1997 |
| JP | 9-31360 A | | 2/1997 |
| JP | 9-104834 A | | 4/1997 |
| JP | 9-151342 A | | 6/1997 |
| JP | 9-217019 A | | 8/1997 |
| JP | 9-286939 A | | 11/1997 |
| JP | 9-316535 A | | 12/1997 |
| JP | 10-46075 A | | 2/1998 |
| JP | 10-110129 A | | 4/1998 |
| JP | 10-140065 A | | 5/1998 |
| JP | 10-292143 A | | 11/1998 |
| JP | 11-49974 A | | 2/1999 |
| JP | 11-80633 A | | 3/1999 |
| JP | 11-152424 A | | 6/1999 |
| JP | 11-166145 A | | 6/1999 |
| JP | 11-199783 A | | 7/1999 |
| JP | 11-209672 A | | 8/1999 |
| JP | 11-349870 A | | 12/1999 |
| JP | 2000-7961 A | | 1/2000 |
| JP | 2000-44852 A | | 2/2000 |
| JP | 2000-53889 A | | 2/2000 |
| JP | 2000-53897 A | | 2/2000 |
| JP | 2000-53898 A | | 2/2000 |
| JP | 2000-53900 A | | 2/2000 |
| JP | 2001-152060 A | | 6/2001 |

* cited by examiner

*Primary Examiner*—Callie Shosho
(74) *Attorney, Agent, or Firm*—Ladas & Parry LLP

(57) ABSTRACT

Provided are ink jet ink excellent in dispersion stability and ejection stability and capable of forming images with fastness, abrasion resistance, color developability, and high density with little feathering; a microencapsulated pigment (MCP) providing the ink and a process of making the same; and an aqueous dispersion of the MCP. The MCP comprises pigment particles having a hydrophilic group on their surface (hydrophilized pigment particles) and coated with a polymer by emulsion polymerization. The process comprises emulsion polymerization in the presence of the hydrophilized pigment particles. The ink essentially contains the MCP and water.

14 Claims, 5 Drawing Sheets

MICROENCAPSULATED PIGMENT, PRODUCTION PROCESS THEREFOR, AQUEOUS DISPERSION AND INK JET RECORDING INK

FIELD OF THE INVENTION

This invention relates to a microencapsulated pigment, a production process therefor, an aqueous dispersion, and an ink jet recording ink.

BACKGROUND OF THE INVENTION

Ink jet recording is an image forming technique comprising ejecting ink droplets from fine nozzles of a recording head to form letters or figures on a recording medium such as paper. Ink jet recording technologies that have been implemented include drop-on-demand techniques, such as a method in which electrical signals are converted to mechanical signals by a piezoelectric actuator to discontinuously eject ink droplets stored in the nozzle head and a method in which part of ink is rapidly heated to generate a bubble near the nozzle of a recording head to discontinuously eject ink droplets by the volume expansion of the bubble.

Aqueous pigment inks having a pigment dispersed in water have recently been developed for use in ink jet recording systems. Compared with inks containing water-soluble dyes, aqueous pigment inks are characterized by excellent water resistance and light resistance. It is a generally followed practice that such aqueous pigment ink is prepared by dispersing a pigment in an aqueous medium with the aid of a dispersant, such as a surface active agent or a polymeric dispersant.

For example, JP-A-3-157464 proposes using a polymeric dispersant for helping pigment particles be dispersed and using a mixture of water, a non-volatile organic solvent, and a lower alcohol as an aqueous medium in a pigment ink formulation containing an acetylene glycol-based penetrant thereby to secure dispersion stability of the pigment. However, use of a dispersant for pigment particles leads to an increased number of elements involved in ink preparation, which makes it difficult to control ink physical properties such as viscosity within designed ranges. Besides this, the proposed pigment ink still has the problem that a sufficient image density is hard to obtain.

Further, aqueous pigment ink containing a dispersant has the dispersant merely adsorbed on the surface of pigment particles. Since a strong shear force is applied to ink ejected through a fine nozzle of a recording head, the dispersant can come off the surface of pigment particles to lose its dispersing capability, which can result in instable ink ejection. Destabilization can also occur when the aqueous pigment ink is stored for a long time.

Introducing a sulfonic acid group on the surface of pigment particles has been proposed as a successful technique for dispersing pigment particles in water. For example, JP-A-10-110129 discloses a pigment ink containing a surface-sulfonated organic pigment which is obtained by treating an organic pigment dispersed in a solvent having no active protons with a sulfonating agent (referred to as related art (1)). The inventors of the related art 1 allege that the pigment ink has excellent dispersion stability and exhibits satisfactory ejection stability from the nozzle of a recording head (the property of being stably ejected from the recording head in a fixed direction).

JP-A-11-49974 teaches that a positively chargeable organic pigment mass is prepared by treating a sulfonated organic pigment mass with a monovalent metallic ion and that a pigment prepared from the positively chargeable organic pigment mass is formulated together with a dispersant and water into an aqueous ink composition having high storage stability (dispersion stability) (referred to as related art (2)).

Although the ink compositions of the related arts (1) and (2) which contain surface-treated pigment particles as a colorant are excellent in dispersion stability and ejection stability as compared with conventional ink jet recording inks, the images printed with them on recording media such as plain paper or inkjet recording media (recording media having an ink receiving layer designed for ink jet recording ink) have insufficient abrasion resistance. This seems to be due to insufficient fixability of the surface-treated pigment particles on the recording media.

Application of polymer-encapsulated pigments to ink jet recording technologies is known for improved fixability of pigments on a recording medium. JP-B-7-94634 and JP-A-8-59715 disclose encapsulated pigment particles. JP-A-5-339516, JP-A-8-302227, JP-A-8-302228, and JP-A-8-81647 propose pigment particles having a polymer grafted on their surface. JP-A-5-320276 suggests a method of microencapsulating hydrophobic powder with an amphiphilic graft polymer, which has turned out to involve the problem that use of such a previously polymerized material for encapsulation results in too large a particle diameter. Additionally, JP-A-8-218015, JP-A-8-295837, JP-A-9-3376, JP-A-8-183920, JP-A-10-46075, JP-A-10-292143, JP-A-11-80633, JP-A-11-349870, and JP-A-12-7961 disclose inks containing pigment particles coated with a resin capable of forming film at room temperature by phase reversal of emulsion. JP-A-9-31360, JP-A-9-217019, JP-A-9-316353, JP-A-9-104834, JP-A-9-151342, JP-A-10-140065, JP-A-11-152424, JP-A-11-166145, JP-A-11-166145, JP-A-11-199783, and JP-A-11-209672 propose inks containing pigment particles coated with an anionic group-containing organic polymer by acid precipitation. JP-A-9-286939, JP-A-12-44852, JP-A-12-53897, JP-A-12-53898, JP-A-12-53899, and JP-A-12-53900 propose inks comprising a polymer emulsion having polymer particles impregnated with a colorant by phase inversion of emulsion (referred to related art 3). Even in ink compositions containing such a colorant as obtained by phase inversion of emulsion or acid precipitation, the polymer adsorbed on the pigment particles can separate and dissolve in ink, resulting in insufficient performance in terms of dispersion stability, ejection stability, image quality, and the like, which depends on the kind of organic solvents used as, for example, a penetrant, though. Because the ink according to the related art 3 not a little suffers from separation of polymer from pigment particles, the pigment content in ink is of necessity limited for assuring dispersion stability. As a result, the ink only provides recorded matter with low image densities and, when printed on plain paper, easily feathers and attains only low color developability.

SUMMARY OF THE INVENTION

An object of the present invention is to provide a microencapsulated pigment capable of providing an ink jet recording ink satisfying all the requirements: (1) high dispersion stability, (2) high stability when ejected from a recording head, (3) capability of providing images with excellent fastness, (4) capability of providing images with high density, (5) capability of providing images with excellent abrasion resistance, and (6) capability of providing images which hardly feather and show high color developability even when formed on plain paper.

Another object of the present invention is to provide a process for producing the microencapsulated pigment.

A still other object of the invention is to provide an aqueous dispersion.

A yet other object of the invention is to provide an ink jet recording ink which satisfies all the requirements (1) to (6) supra.

As a result of extensive investigations, the present inventors have surprisingly found that an ink jet recording ink satisfying all the requirements (1) to (6) supra can be obtained by preparing a specific microencapsulated pigment and using the microencapsulated pigment as a colorant. The present invention has been completed based on this finding.

The present invention provides:

(1) A microencapsulated pigment comprising pigment particles having a hydrophilic group on the surface thereof and being coated with a polymer by emulsion polymerization.

(2) The microencapsulated pigment according to item (1), which has an aspect ratio of 1.0 to 1.3 and a Zingg index of 1.0 to 1.3.

(3) The microencapsulated pigment according to item (1) or (2), wherein said polymer comprises a repeating unit derived from a polymerizable surface active agent having a hydrophilic group, a hydrophobic group and a polymerizable group.

(4) The microencapsulated pigment according to item (3), wherein said polymer is a copolymer further comprising a repeating unit that is derived from a comonomer copolymerizable with said polymerizable surface active agent.

(5) The microencapsulated pigment according to item (4), wherein said comonomer is at least one of a hydrophilic monomer and a hydrophobic monomer.

(6) The microencapsulated pigment according to item (5), wherein said hydrophobic monomer has at least a hydrophobic group and a polymerizable group per its molecule, and is selected from the group consisting of an aliphatic hydrocarbon group, an alicyclic hydrocarbon group and an aromatic hydrocarbon group.

(7) The microencapsulated pigment according to any one of items (1) to (6), wherein said polymer coating is prepared by adding said polymerizable surface active agent and a polymerization initiator to an aqueous dispersion having said pigment particles dispersed therein and subjecting the system to emulsion polymerization.

(8) The microencapsulated pigment according to any one of items (1) to (7), wherein said polymer coating is prepared by adding said polymerizable surface active agent, a comonomer copolymerizable with said polymerizable surface active agent, and a polymerization initiator to an aqueous dispersion having said pigment particles dispersed therein and subjecting the system to emulsion polymerization.

(9) The microencapsulated pigment according to item (1) or (2), wherein said hydrophilic group on the surface of the pigment particles is an anionic group, and said polymer is one prepared by polymerizing a hydrophilic monomer in the presence of a polymerization initiator having a cationic group.

(10) The microencapsulated pigment according to item (1) or (2), wherein said hydrophilic group on the surface of the pigment particles is an anionic group, and said polymer is one prepared by polymerizing a hydrophilic monomer and a comonomer copolymerizable with said hydrophilic monomer in the presence of a polymerization initiator having a cationic group.

(11) The microencapsulated pigment according to item (1) or (2), wherein said hydrophilic group on the surface of the pigment particles is an anionic group, and said polymer coating is prepared by mixing a polymerization initiator having a cationic group with an aqueous dispersion having the pigment particles dispersed therein under a condition that does not activate said polymerization initiator; adding a hydrophilic monomer and a surface active agent to the dispersion; and activating said polymerization initiator to carry out emulsion polymerization.

(12) The microencapsulated pigment according to item (1) or (2), wherein said hydrophilic group on the surface of the pigment particles is an anionic group, and said polymer coating is prepared by mixing a polymerization initiator having a cationic group with an aqueous dispersion having the pigment particles dispersed therein under a condition that does not activate said polymerization initiator; adding a hydrophilic monomer, a comonomer copolymerizable with said hydrophilic monomer, and a surface active agent to the dispersion; and activating said polymerization initiator to carry out emulsion polymerization.

(13) The microencapsulated pigment according to item (11) or (12), wherein said surface active agent is a polymerizable surface active agent having a hydrophilic group, a hydrophobic group, and a polymerizable group.

(14) The microencapsulated pigment according to any one of items (9) to (13), wherein said polymerization initiator is at least one member selected from the group consisting of 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(2-imidazolin-2-yl)propane] disulfite dihydrate, 2,2'-azobis[2-(3,4,5,6-tetrahydropyrimidin-2-yl)propane]dihydrochloride, 2,2'-azobis[2-[1-(2-hydroxyethyl)-2-imidazolin-2-yl]propane]dihydrochloride, and 2,2'-azobis(2-amidinopropane)dihydrochloride.

(15) The microencapsulated pigment according to any one of items (5) to (14), wherein said hydrophilic monomer has at least a hydrophilic group and a polymerizable group in its molecule thereof, and said hydrophilic group is selected from the group consisting of a sulfonic acid group or a salt thereof, a sulfinic acid group or a salt thereof, a carboxyl group or a salt thereof, a carbonyl group or a salt thereof, a hydroxyl group, an oxyethylene group, an amido group, and an amino group.

(16) The microencapsulated pigment according to any one of items (6) to (8) and (15), wherein said polymerizable group is a radically polymerizable unsaturated hydrocarbon group and is selected from the group consisting of a vinyl group, an allyl group, an acryloyl group, a methacryloyl group, a propenyl group, a vinylidene group, and a vinylene group.

(17) The microencapsulated pigment according to item (1) or (2), wherein said polymer is polymerized by a process comprising: polymerizing at least one of a polymerizable surface active agent having a hydrophilic group, a hydrophobic group and a polymerizable group, and a hydrophilic monomer in the presence of a polymeric azo initiator comprising a repeating unit represented by formula (I):

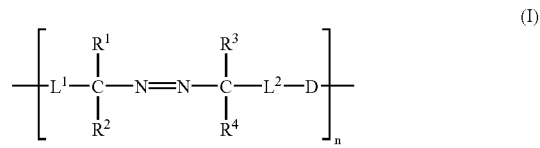

wherein D represents a portion having at least a hydrophobic segment; $L^1$ and $L^2$, which may be the same or different, each represent a linking group; $R^1$, $R^2$, $R^3$, and $R^4$ each represent an alkyl group having 1 to 4 carbon atoms or a cyano group; and n represents an integer of 1 or greater.

(18) The microencapsulated pigment according to item (1) or (2), wherein said polymer coating is prepared by mixing a polymeric azo initiator comprising a repeating unit represented by formula (I):

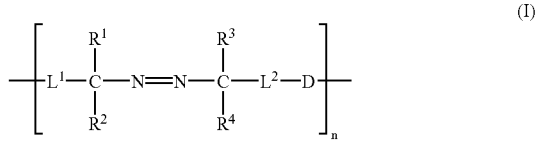

(I)

wherein D represents a portion having at least a hydrophobic segment; $L^1$ and $L^2$, which may be the same or different, each represent a linking group; $R^1$, $R^2$, $R^3$, and $R^4$ each represent an alkyl group having 1 to 4 carbon atoms or a cyano group; and n represents an integer of 1 or greater, with an aqueous dispersion having said pigment particles dispersed therein under a condition that does not activate said polymeric azo initiator;

adding at least one of a polymerizable surface active agent having a hydrophilic group, a hydrophobic group and a polymerizable group, and a hydrophilic monomer to the mixture; and activating said polymeric azo initiator to carry out emulsion polymerization.

(19) The microencapsulated pigment according to item (18), wherein said polymer coating is prepared by: mixing said polymeric azo initiator with said aqueous dispersion of the pigment particles under a condition that does not activate said polymeric azo initiator; and subjecting the system to emulsion polymerization in the presence of at least one of said polymerizable surface active agent and said hydrophilic monomer, and a hydrophobic monomer.

(20) The microencapsulated pigment according to item (18), wherein said polymer coating is prepared by: mixing said polymeric azo initiator with said aqueous dispersion of the pigment particles under a condition that does not activate said polymeric azo initiator; and subjecting the system to emulsion polymerization in the presence of at least one of said polymerizable surface active agent and said hydrophilic monomer, and a crosslinking agent.

(21) The microencapsulated pigment according to any one of items (17) to (20), wherein said polymeric azo initiator is a compound represented by formula (Ic):

surface of the pigment particles is at least one of a sulfonic acid anion ($-SO_3^-$) and a sulfinic acid anion ($-RSO_2^-$; wherein R represents an alkyl group having 1 to 12 carbon atoms, or a phenyl or its derivative group).

(25) The microencapsulated pigment according to any one of items (1) to (24), wherein said hydrophilic group on the surface of the pigment particles is at least one of a carboxyl group ($-COOH$) and a carboxylate anion ($-COO^-$).

(26) The microencapsulated pigment according to any one of items (3) to (8) and (13) to (25), wherein said polymerizable group of said polymerizable surface active agent is selected from the group consisting of a vinyl group, an allyl group, an acryloyl group, a methacryloyl group, a propenyl group, a vinylidene group, and a vinylene group.

(27) The microencapsulated pigment according to any one of items (3) to (8) and (13) to (26), wherein the hydrophilic group of the polymerizable surface active agent is selected from the group consisting of a sulfonic acid group or a salt thereof, a sulfinic acid group or a salt thereof, a carboxyl group or a salt thereof, and a carbonyl group or a salt thereof.

(28) The microencapsulated pigment according to any one of items (3) to (8) and (13) to (27), wherein said hydrophobic group of said polymerizable surface active agent is selected from the group consisting of an alkyl group, an aryl group, and a group composed of a combination thereof.

(29) A process for producing a microencapsulated pigment, comprising coating pigment particles having a hydrophilic group on the surface thereof with a polymer, wherein said polymer is prepared by emulsion polymerization in the presence of said pigment particles.

(30) The process according to item (29), comprising polymerizing a polymerizable surface active agent having a hydrophilic group, a hydrophobic group and a polymerizable group in an aqueous dispersion having said pigment particles dispersed therein.

(31) The process according to item (29), comprising polymerizing a polymerizable surface active agent having a hydrophilic group, a hydrophobic group and a polymerizable group and a comonomer copolymerizable with said polymerizable surface active agent in an aqueous dispersion having said pigment particles dispersed therein.

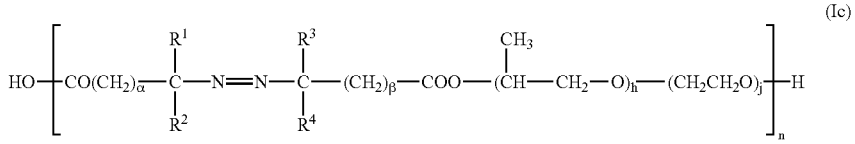

(Ic)

wherein $R^1$ and $R^3$ each represent an alkyl group having 1 to 4 carbon atoms; $R^2$ and $R^4$ each represent a cyano group; and $\alpha$, $\beta$, h, j, and n each represent an integer of 1 or greater.

(22) The microencapsulated pigment according to any one of items (1) to (21), wherein the pigment constituting said pigment particles is carbon black or an organic pigment.

(23) The microencapsulated pigment according to any one of items (1) to (22), wherein said hydrophilic group on the surface of the pigment particles is at least one of a sulfonic acid group ($-SO_3H$) and a sulfinic acid group ($-RSO_2H$; wherein R represents an alkyl group having 1 to 12 carbon atoms, or a phenyl or its derivative group).

(24) The microencapsulated pigment according to any one of items (1) to (23), wherein said hydrophilic group on the

(32) The process according to item (29), comprising: mixing a polymerization initiator having a cationic group with an aqueous dispersion having dispersed therein pigment particles having an anionic group as said hydrophilic group under a condition that does not activate said polymerization initiator; adding a hydrophilic monomer and a surface active agent to the dispersion; and activating said polymerization initiator to carry out polymerization.

(33) The process according to item (29), comprising: mixing a polymerization initiator having a cationic group with an aqueous dispersion having dispersed therein pigment particles having an anionic group as said hydrophilic group under a condition that does not activate said polymerization initiator; adding a hydrophilic monomer, a comonomer copolymerizable with said hydrophilic monomer and a surface active agent to the dispersion; and activating said polymerization initiator to carry out polymerization.

(34) The process according to item (32) or (33), wherein said polymerization initiator is at least one member selected from the group consisting of 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(2-imidazolin-2-yl)propane]disulfite dihydrate, 2,2'-azobis[2-(3,4,5,6-tetrahydropyrimidin-2-yl)propane]dihydrochloride, 2,2'-azobis[2-[1-(2-hydroxyethyl)-2-imidazolin-2-yl]propane]dihydrochloride, and 2,2'-azobis(2-amidinopropane) dihydrochloride.

(35) The process according to any one of items (32) to (34), wherein said surface active agent is a polymerizable surface active agent having a hydrophilic group, a hydrophobic group, and a polymerizable group.

(36) The process according to any one of items (30), (31), (34) and (35), wherein said polymerizable group of said polymerizable surface active agent is selected from the group consisting of a vinyl group, an allyl group, an acryloyl group, a methacryloyl group, a propenyl group, a vinylidene group, and a vinylene group.

(37) The process according to any one of items (30), (31) and (34) to (36), wherein said hydrophilic group of said polymerizable surface active agent is at least one of: an anionic group selected from the group consisting of a sulfonic acid group or a salt thereof, a sulfinic acid group or a salt thereof, a carboxyl group or a salt thereof, and a carbonyl group or a salt thereof; and a nonionic group selected from the group consisting of a hydroxyl group, and an oxyethylene group.

(38) The process according to any one of items (30), (31) and (34) to (37), wherein said hydrophobic group of said polymerizable surface active agent is selected from the group consisting of an alkyl group, an aryl group, and a group composed of a combination thereof.

(39) The process according to any one of items (29) to (38), wherein said hydrophilic group of said pigment particles is at least one of a sulfonic acid group (—SO$_3$H) and a sulfinic acid group (—RSO$_2$H; wherein R represents an alkyl group having 1 to 12 carbon atoms, or a phenyl or its derivative group).

(40) The process according to any one of items (29) to (38), wherein said hydrophilic group of said pigment particles is at least one of a sulfonic acid anion (—SO$_3^-$) and a sulfinic acid anion (—RSO$_2^-$; wherein R represents an alkyl group having 1 to 12 carbon atoms, or a phenyl or its derivative group).

(41) The process according to any one of items (29) to (38), wherein said hydrophilic group of said pigment particles is at least one of a carboxyl group (—COOH) and a carboxylate anion (—COO$^-$).

(42) The process according to any one of items (31) and (33) to (41), wherein said comonomer is at least one of a hydrophilic monomer and a hydrophobic monomer.

(43) The process according to item (42), wherein said hydrophobic monomer has at least a hydrophobic group and a polymerizable group per its molecule, and is selected from the group consisting of an aliphatic hydrocarbon group, an alicyclic hydrocarbon group and an aromatic hydrocarbon group.

(44) The process according to item (42) or (43), wherein said hydrophilic monomer has at least a hydrophilic group and a polymerizable group in its molecule thereof, and said hydrophilic group is selected from the group consisting of a sulfonic acid group or a salt thereof, a sulfinic acid group or a salt thereof, a carboxyl group or a salt thereof, a carbonyl group or a salt thereof, a hydroxyl group, an oxyethylene group, an amido group, and an amino group.

(45) The process according to item (43) or (44), wherein said polymerizable group is a radically polymerizable unsaturated hydrocarbon group and is selected from the group consisting of a vinyl group, an allyl group, an acryloyl group, a methacryloyl group, a propenyl group, a vinylidene group, and a vinylene group.

(46) An aqueous dispersion containing a microencapsulated pigment according to any one of items (1) to (28).

(47) An ink jet recording ink containing an aqueous dispersion according to item (46).

(48) An ink jet recording ink comprising a microencapsulated pigment according to any one of items (1) to (28) and water.

(49) The ink jet recording ink according to item (47) or (48), further comprising a water-soluble organic solvent.

(50) The ink jet recording ink according to item (49), wherein said water-soluble organic solvent is a high-boiling water-soluble organic solvent having a boiling point of 180° C. or higher.

(51) The ink jet recording ink according to item (49) or (50), wherein said water-soluble organic solvent contains at least one compound selected from the group consisting of glycerol, an alkyl ether of a polyhydric alcohol, and a 1,2-alkyldiol.

(52) The ink jet recording ink according to any one of items (47) to (51), which further comprises a solid wetting agent in an amount of 3 to 20% by weight based on the total weight of the ink.

(53) The ink jet recording ink according to item (52), wherein said solid wetting agent is at least one of trimethylolpropane and 1,2,6-hexanetriol.

(54) The ink jet recording ink according to any one of items (47) to (53), further comprising a surface active agent.

(55) The ink jet recording ink according to item (54), wherein said surface active agent is at least one of an acetylene glycol surface active agent and an acetylene alcohol surface active agent.

(56) The ink jet recording ink according to any one of items (47) to (55), which further comprises a saccharide.

BRIEF DESCRIPTION OF THE DRAWINGS

By way of example and to make the description clearer, reference is made to the accompanying drawing, in which.

Figure 1:
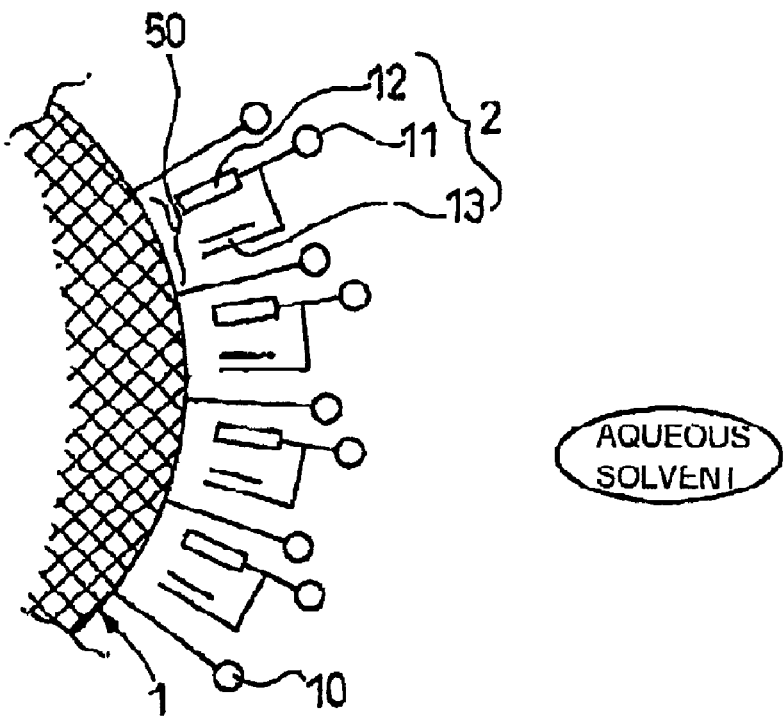
FIG. 1 schematically illustrates a first disperse state in which a pigment particle having a hydrophilic group on the surface thereof is dispersed in an aqueous medium and is coexistent with a polymerizable surface active agent.

Representation of Reference Numerals 1, 101: pigment particles
2: polymerizable surface active agent
10: hydrophilic group
11: hydrophilic group
12, 12': hydrophobic group
13, 13': polymerizable group
60, 61, 150: polymer layer (polymer)
100, 200, 300: microencapsulated pigment
102: azo compound (polymerization initiator)
103: hydrophilic monomer
104: comonomer
110: anionic group
111: cationic group
112: hydrophilic group
113: polymerizable group

DETAILED DESCRIPTION OF THE INVENTION

The microencapsulated pigment according to an embodiment of the present invention is characterized in that pigment particles having a hydrophilic group on the surface thereof are coated with a polymer by emulsion polymerization techniques.

In the emulsion polymerization system, there is produced a polarized state due to the surface hydrophilic group of the pigment particles and the polar group of an emulsifier (surface active agent) or a polymerization initiator used to carry out emulsion polymerization. As a result, the configuration of monomer molecules existing around the pigment particles on standby for polymerization is under highly accurate control by the polarization. Upon polymerizing the monomer in this state, there is obtained the microencapsulated pigment according to the invention. The microencapsulated pigment of the present invention is capable of providing an ink jet recording ink satisfying all the requirements: (1) high dispersion stability, (2) high ejection stability, (3) capability of providing images with excellent fastness, (4) capability of providing images with high density, (5) capability of providing images with excellent abrasion resistance, and (6) capability of providing images which hardly feather and show high color developability even when formed on plain paper. In contrast, it seems that coating of pigment particles with a previously polymerized material by means of emulsion phase inversion or acid precipitation fails to provide coated pigment particles that fulfill all the requirements (1) to (6) supra presumably because of a limited coating state achievable with the previously polymerized material.

The microencapsulated pigment of the present invention preferably has an aspect ratio (a ratio of the major diameter to the minor diameter) of 1.0 to 1.3 and a Zingg index of 1.0 to 1.3, particularly 1.0 to 1.2, for securing fulfillment of the requirements (1), (2), (4), and (6).

Taking the minor diameter, major diameter, and thickness of a particle taken as b, l, and t, respectively, provided that $1 \geq b \geq t > 0$, the aspect ratio and the flatness of the particle are represented by $l/b$ ($\geq 1$) and $b/t$ ($\geq 1$), respectively, and the Zingg index of the particle is represented by aspect ratio/flatness=$(l \cdot t)/b^2$. According to these representations, a true sphere has an aspect ratio of 1 and a Zingg index of 1.

Microencapsulated pigments with Zingg indices greater than 1.3 tend to fail to exhibit satisfactory results with respect to the requirements (1), (2), (4), and (6), which may be ascribable to a flatter shape and lower the isotropy of the microencapsulated pigments. While methods for controlling the aspect ratio and Zingg index within the above ranges are not particularly restricted, it is notable that a microencapsulated pigment in which the pigment particles having a hydrophilic group on their surface are coated with a polymer by emulsion polymerization readily satisfis these conditions. For securely obtaining microencapsulated pigments having the above-specified aspect ratio and Zingg index, it is particularly preferred to adopt the modes according to first to third embodiments hereinafter described. Where techniques other than emulsion polymerization, such as acid precipitation and emulsion phase inversion, are followed, it is difficult to obtain microencapsulated pigments having an aspect ratio and a Zingg index controlled within the recited ranges.

The microencapsulated pigment whose aspect ratio and Zingg index fall within the respective recited ranges is like a true sphere. Inks containing such microencapsulated pigments easily exhibit Newtonian flow behavior and excellent ejection stability. Being like a true sphere, it is assured that the ejected microcapsules are arranged on a recording medium such as paper at a high density to realize image density and color development with high efficiency. Also, being like a true sphere, superiority in dispersibility and dispersion stability is promised.

The preferred first to third embodiments of the microencapsulated pigment according to the present invention are described below.

[I] FIRST EMBODIMENT

The microencapsulated pigment according to the first embodiment comprises pigment particles having a hydrophilic group on the surface thereof and being coated with a polymer, wherein the polymer comprises a repeating unit derived from a polymerizable surface active agent having a hydrophilic group, a hydrophobic group, and a polymerizable group. The microencapsulated pigment of the first embodiment is conveniently produced by a process comprising the steps of adding a polymerizable surface active agent and a polymerization initiator to an aqueous dispersion having pigment particles dispersed therein and subjecting the system to emulsion polymerization. The disperse states the pigment particles could take in this process will herein be called "a first disperse state" and "a second disperse state", which will be illustrated hereunder by way of FIGS. 1 through 4. Note that the description contains theoretical assumptions.

First Disperse State:

FIG. 1 illustrates a first disperse state in which a pigment particle 1 having a hydrophilic group 10 on its surface is dispersed in a solvent mainly comprising water (hereinafter referred to as an aqueous medium) in the presence of a polymerizable surface active agent 2 having a hydrophilic group 11, a hydrophobic group 12, and a polymerizable group 13. The pigment particle 1 has on its surface hydrophilic groups 10 bonded through chemical bonding at a specific density and hydrophobic regions 50 among the hydrophilic groups 10. The molecules of the polymerizable surface active agent 2 enter between the hydrophilic groups 10 with their hydrophobic groups 12 facing the pigment particle 1 by the interaction between the hydrophobic groups 12 and the hydrophobic regions 50. The hydrophilic groups 11 of the polymerizable surface active agent 2 are directed toward the aqueous medium, i.e., away from the pigment particle 1.

Figure 2:
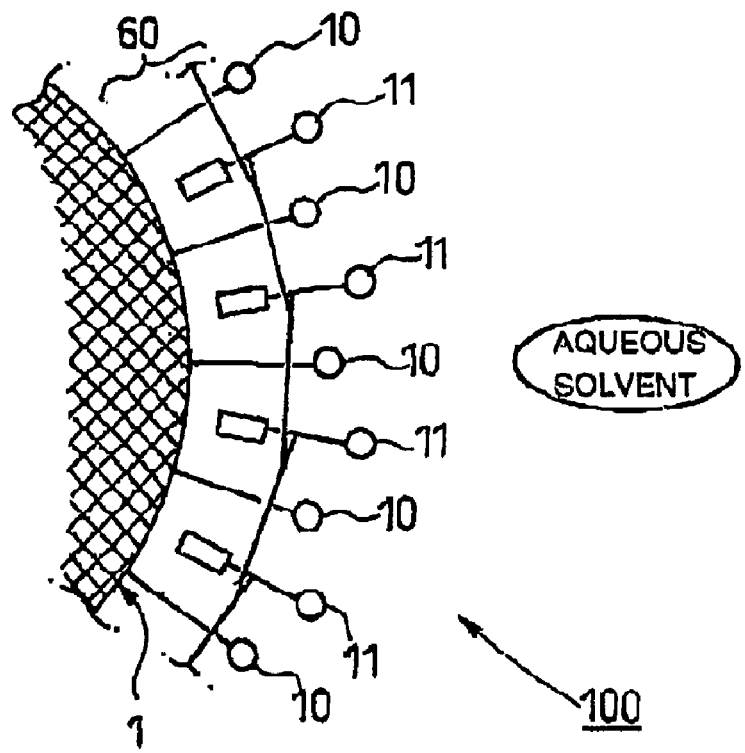
FIG. 2 schematically illustrates the first disperse state in which the polymerizable surface active agent has been polymerized.

In this disperse state, when the polymerizable groups 13 of the polymerizable surface active agent 2 are polymerized by, for example, addition of a polymerization initiator, there is produced a microencapsulated pigment 100 comprising the pigment particle 1 encapsulated with a polymer layer 60 as shown in FIG. 2. Since the polymer layer 60 has the hydrophilic groups 10 and/or the hydrophilic groups 11 on its surface, the microencapsulated pigment 100 is dispersible in the aqueous medium. If desired, a comonomer copolymerizable with the polymerizable surface active agent 2 may be present in the disperse system in the step of polymerization. In this case, the polymer layer 60 is a copolymer layer comprising the polymerizable surface active agent 2 and the comonomer.

Figure 3:
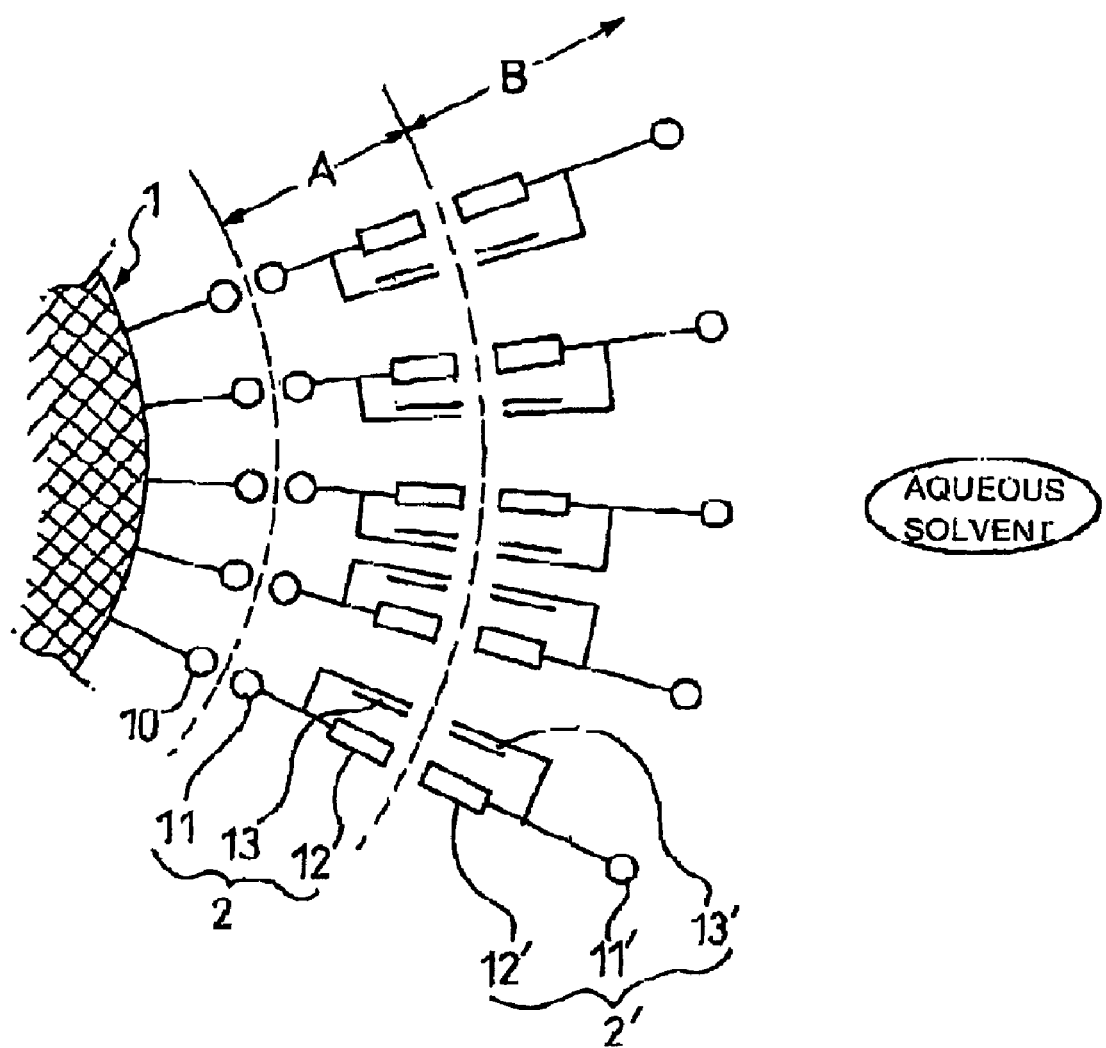
FIG. 3 schematically shows a second disperse state in which a pigment particle having a hydrophilic group on the surface thereof is dispersed in an aqueous medium and is coexistent with a polymerizable surface active agent.

Second Disperse State:

FIG. 3 illustrates a second disperse state in which a pigment particle 1 having a hydrophilic group 10 on its surface is dispersed in an aqueous medium and is coexistent with a polymerizable surface active agent 2 having a hydrophilic group 11, a hydrophobic group 12, and a polymerizable group 13 and another polymerizable surface active agent 2' having a hydrophilic group 11', a hydrophobic group 12', and a polymerizable group 13'. The polymerizable surface active agent 2 forms a monomolecular layer A in which the hydrophilic groups 11 face the hydrophilic groups 10 of the pigment particle 1 because of their interaction while the hydrophobic groups 12 face away from the pigment particle 1. The polymerizable surface active agent 2' forms a monomolecular layer B in which the hydrophobic groups 12' face the monomolecular layer A because of the interaction with the hydrophobic groups 12 of the monomolecular layer A while the hydrophilic groups 11' face the aqueous medium.

Figure 4:
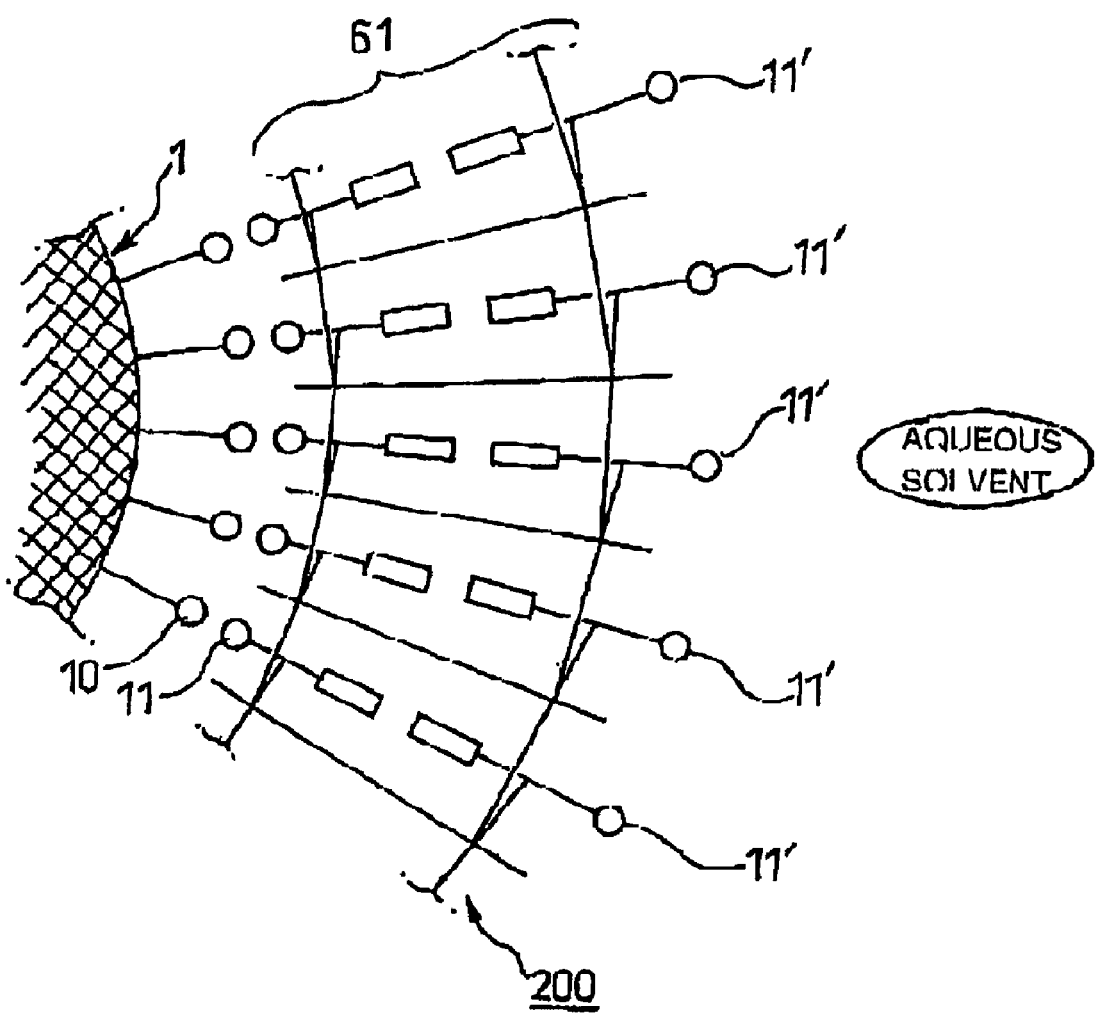
FIG. 4 schematically illustrates the second disperse state in which the polymerizable surface active agent has been polymerized.

In this second disperse state, when the polymerizable groups 13 and 13' of the polymerizable surface active agents 2 and 2' are polymerized by, for example, addition of a polymerization initiator, there is produced a microencapsulated pigment 200 comprising the pigment particle 1 encapsulated with a polymer layer 61 as shown in FIG. 4. Since the polymer layer 61 has the hydrophilic groups 11' on its outer surface, the microencapsulated pigment 200 is dispersible in an aqueous medium. If desired, a comonomer copolymerizable with the polymerizable surface active agents 2 and 2' may be present in the disperse system in carrying out polymerization. In this case, the polymer layer 61 can be a copolymer layer copolymerized from the polymerizable surface active agents 2 and 2' and the comonomer.

Either of the first and second disperse states begins with the pigment particle 1 being in a dispersed state in an aqueous medium by virtue of its surface hydrophilic groups 10. The pigment particles 1 achieve a highly dispersed state in an aqueous medium compared with pigment particles having no hydrophilic groups on their surface dispersed in an aqueous medium with the aid of a dispersant. According to the first embodiment, in which pigment particles having a hydrophilic group on their surface are covered with a polymer, improved stability of pigment dispersion in an aqueous medium can be achieved since the microencapsulated pigment particles have hydrophilic groups regularly and densely orientated toward the aqueous medium as illustrated in FIGS. 2 and 4. Therefore, application of the microencapsulated pigment of the first embodiment as a colorant of water-based ink jet recording ink provides an ink jet recording ink formulation which can have an increased pigment concentration and yet exhibits excellent dispersion stability equal to conventional microencapsulated pigment inks. Excellent dispersion stability of microencapsulated pigment leads to reduction of clogging the nozzle of a recording head, thus promising ejection stability. That is, the microencapsulated pigment of the first embodiment provides a pigment ink excellent in dispersion stability and ejection stability and having a higher pigment concentration than the conventional microencapsulated pigment inks. Ink jet recording using the microencapsulated pigment ink having the increased pigment concentration will produce recorded matter enjoying high image density as well as excellent image fastness.

The mechanism of action of the first embodiment will further be considered. It is believed that the microencapsulated pigment has the hydrophilic groups originated in the polymerizable surface active agent regularly and densely orientated toward the aqueous medium to produce electrostatic repulsive force among the encapsulated particles which is effective to stabilize the disperse state. Besides the electrostatic repulsion, the steric hindrance of the homo- or copolymer of the polymerizable surface active agent covering the pigment particles (polymer effect) seems to contribute to the excellent dispersion stability of the microencapsulated pigment in an aqueous medium.

Suppression of feathering on plain paper and the high image density achievable are considered to owe largely to the action of the hydrophilic groups regularly and densely orientated to the aqueous medium for the following reason. Upon landing of ink ejected from a recording head onto plain paper, the ink solvent swiftly soak paper. Conventional pigment particles dispersed with the aid of a dispersant, being coated with the dispersant, tend to spread randomly rather than be adsorbed on the surface cellulose fibers of paper. This is presumably partly because the hydrophilic group content on the pigment surface is lower than that of the microencapsulated pigment of the present embodiment and partly because the hydrophilic groups are not orientated regularly and densely. As a result, the image density is low, and the color developability is insufficient.

By contrast, the microencapsulated pigment according to the present invention is easily adsorbed onto the cellulose fiber of plain paper for the following reasons. The microencapsulated pigment easily agglomerate upon mutual action between the surface hydrophilic groups (especially anionic groups) and various metal ions present in plain paper, e.g., magnesium, calcium or aluminum ions. The microencapsulated pigment easily agglomerate and is adsorbed on plain paper upon mutual action between the hydrophilic groups (especially anionic groups) and cationic starch or a cationic polymer that has been used together with a size in sizing plain paper. Additionally, the hydrophilic groups (especially anionic groups) also exert interaction with the cellulose fibers of plain paper. Thus, when the microencapsulated pigment ink is ejected from a recording head and lands onto plain paper, the colorant readily stays at the landing position to give a high image density with little feathering.

Further, since the pigment particles are coated with a polymer, an ink jet printing ink according to the first embodiment exhibits higher fixability on a recording medium to form an image with higher abrasion resistance than inks comprising conventional surface-treated pigment particles.

Components constituting the microencapsulated pigment of the first embodiment will be described in detail.

The pigment particles having a hydrophilic group on their surface (hereinafter sometimes referred to as hydrophilized pigment particles) are conveniently prepared by treating pigment particles with a hydrophilic group-imparting agent. Therefore the pigment itself is not particularly limited as long as it is insoluble in the hydrophilic group-imparting agent chosen. Pigments for use in the ink of the present invention are divided into inorganic pigments and organic pigments.

Suitable inorganic pigments include carbon blacks (C.I. Pigment Black 7), such as furnace black, lamp black, acetylene black, and channel black, and iron oxide pigments. Suitable organic pigments include azo pigments, such as azo lakes, insoluble azo pigments, condensed azo pigments, and chelate azo pigments; polycyclic pigments, such as phthalocyanine pigments, perylene pigments, perinone pigments, anthraquinone pigments, quinacridone pigments, dioxane pigments, thioindigo pigments, isoindolinone pigments, and quinofranone pigments; dye chelates, such as basic dye chelates and acidic dye chelates; nitro pigments, nitroso pigments, and aniline black.

Specific examples of inorganic pigments used for black include carbon blacks, such as No. 2300, No. 900, MCF88, No. 33, No. 40, No. 45, No. 52, MA7, MA8, MA100 and No. 2200B, all available from Mitsubishi Chemical Corp.; Raven series 5750, 5250, 5000, 3500, 1255, and 700 from Columbian Carbon; Regal series 400R, 330R, and 660R, Mogul L, and Monarch series 700, 800, 880, 900, 1000, 1100, 1300, and 1400 from Cabot Corp.; and Color Black series FW1, FW2, FW2V, FW18, FW200, S150, S160, and S170, Printex series 35, U, V, and 140U, and Special Black series 6, 5, 4A, and 4 from Degussa Corp.

Specific examples of organic pigments for black include aniline black (C.I. Pigment Black 1).

Specific examples of organic pigments for yellow include C.I. Pigment Yellow 1 (Hansa Yellow), 2, 3 (Hansa Yellow 10G), 4, 5 (Hansa Yellow 5G), 6, 7, 10, 11, 12, 13, 14, 16, 17, 24 (Flavanthrone Yellow), 34, 35, 37, 53, 55, 65, 73, 74, 75, 81, 83, 93, 94, 95, 97, 98, 99, 108 (Anthrapyrimidine Yellow), 109, 110, 113, 117 (copper complex salt pigment), 120, 124, 128, 129, 133 (Quinophthalone), 138, 139 (Isoindolinone), 147, 151, 153 (nickel complex pigment), 154, 167, 172, and 180.

Specific examples of organic pigments for magenta ink include C.I. Pigment Red 1 (Para Red), 2, 3 (Toluidine Red), 4, 5 (ITR Red), 6, 7, 8, 9, 10, 11, 12, 14, 15, 16, 17, 18, 19, 21, 22, 23, 30, 31, 32, 37, 38 (Pyrazolone Red), 40, 41, 42, 48 (Ca), 48 (Mn), 57 (Ca), 57:1, 88 (Thioindigo), 112 (Naphthol AS), 114 (Naphthol AS), 122 (Dimethylquinacridone), 123, 144, 146, 149, 150, 166, 168 (Anthoanthrone Orange), 170 (Naphthol AS) 171, 175, 176, 177, 178, 179 (Perylene Maroon), 184, 185, 187, 202, 209 (Dichloroquinacridone), 219, 224 (perylene), and 245 (Naphthol AS); and C.I. Pigment Violet 19 (Quinacridone), 23 (Dioxazine Violet), 32, 33, 36, 38, 43, and 50.

Specific examples of organic pigments for cyan ink include C.I. Pigment Blue 1, 2, 3, 15, 15:1, 15:2, 15:3, 15:34, 15:4, 16 (metal-free phthalocyanine), 18 (alkali blue toner), 22, 25, 60 (Threne Blue), 65 (Violanthrone), and 66 (Indigo); and C.I. Vat Blue 4 and 60.

Other organic pigments used for color inks other than magenta, cyan or yellow inks include C.I. Pigment Green 7 (Phthalocyanine Green), 10 (Green Gold), 36, and 37; C.I. Pigment Brown 3, 5, 25, and 26; and C.I. Pigment Orange 1, 2, 5, 7, 13, 14, 15, 16, 24, 34, 36, 38, 40, 43, and 63.

These pigments can be used either individually or as a combination of two or more thereof in the microencapsulated pigment of the invention.

The hydrophilic group-imparting agents which can be used to surface treat the pigment particles include sulfur-containing treating agents, such as sulfuric acid, fuming sulfuric acid, sulfur trioxide, chlorosulfuric acid, fluorosulfuric acid, amidosulfuric acid, sulfonated pyridine salts, and sulfamic acid. Preferred of them are sulfonating agents, such as sulfur trioxide, sulfonated pyridine salts, and sulfamic acid, which can be used either individually or as a mixture of two or more thereof. The term "sulfonating agent" as used herein denotes a treating agent capable of introducing at least one of a sulfonic acid group ($-SO_3H$) and a sulfinic acid group ($-RSO_2H$; wherein R is an alkyl group having 1 to 12 carbon atoms, or a phenyl or its derivative group).

Complexes of sulfur trioxide formed with a mixed solvent of a solvent capable of forming a complex with sulfur trioxide, such as basic solvents (e.g., N,N-dimethylformamide, dioxane, pyridine, triethylamine, and trimethylamine), nitromethane or acetonitrile, and at least one solvent described below are also effective sulfonating agents. In particular, where the reactivity of sulfur trioxide is so high that the pigment itself may be decomposed or denatured or where use of a strong acid such as sulfuric acid is unsuitable due to difficulty of reaction control, it is advisable to use a tertiary amine-sulfur trioxide complex to accomplish the surface treatment (sulfonation in this case) of pigment particles.

Where a strong acid, such as sulfuric acid, fuming sulfuric acid, chlorosulfuric acid or fluorosulfuric acid, is used alone, the pigment particles easily dissolve to undergo reaction molecule by molecule. In this case, the reaction must be performed under control, giving due consideration to the kind and amount of a solvent used.

The solvent which can be used in the surface treatment reaction is selected from those which are inert to the sulfur-containing treating agent and in which the pigment is insoluble or sparingly soluble. Examples are sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide, and trichlorofluoromethane.

The treatment with the sulfur-containing treating agent is carried out by dispersing pigment particles in the solvent, adding the treating agent to the dispersion, and heating the mixture while stirring at 60 to 200° C. for 3 to 10 hours. It is advisable that the mixture be slurried prior to the reaction by high shear dispersion in a high-speed mixer, etc. or impact dispersion in a bead mill, a jet mill, etc. The resulting slurry is then stirred gently, and the sulfur-containing treating agent is added thereto to introduce the hydrophilic group onto the surface of the pigment particles. The amount of the hydrophilic group that can be introduced largely depends on the reaction conditions and the kind of the sulfur-containing treating agent. After heating the reaction mixture under the above-recited conditions, the solvent and the residual sulfur-containing treating agent are removed from the pigment slurry by washing with water, ultrafiltration, reverse osmosis, repetition of centrifugation and filtration, or like means.

The pigment particles having a sulfonic acid group. ($-SO_3H$) and/or a sulfinic acid group ($-RSO_2H$; wherein R is as defined above) introduced thereon can further be treated with an alkali compound to convert the sulfonic acid group and/or the sulfinic acid group to a sulfonate anion ($-SO_3^-$) and/or a sulfinate anion ($-RSO_2^-$; wherein R is as defined above).

The alkali compound is selected from those capable of dissociating an alkali metal cation or a monovalent cation represented by formula: $(R_1R_2R_3R_4N)^+$, wherein $R_1$, $R_2$, $R_3$, and $R_4$ which may be the same or different, each represent a hydrogen atom, an alkyl group, a hydroxyalkyl group or a halogenated alkyl group. Preferred alkali compounds are those capable of dissociating a lithium ion ($Li^+$), a potassium ion ($K^+$), a sodium ion ($Na^+$), an ammonium ion ($NH_4^+$) or an alkanolamine cation, e.g., a triethanolamine cation.

The anion of the alkali compound is preferably a hydroxide ion. Examples of alkali compounds include ammonia, alkanolamines (e.g., monoethanolamine, diethanolamine, N,N-butylethanolamine, triethanolamine, propanolamine, aminomethylpropanol, and 2-aminoisopropanol), and monovalent alkali metal hydroxides (e.g., LiOH, NaOHO, and KOH).

The alkali compound is preferably added in amounts equal to or more than the neutralization equivalent for the sulfonic acid group and/or the sulfinic acid group on the pigment particles. Volatile alkali compounds, such as ammonia and alkanolamines, are preferably added in amounts at least 1.5 times the neutralization equivalent. The treatment is conducted by adding the pigment particles having the sulfonic acid group and/or the sulfinic acid group chemically bonded thereto into the alkali compound, followed by shaking in a paint shaker, etc.

The hydrophilic group-imparting agents for treating the pigment particles surface also include carboxylating agents. The term "carboxylating agent" as used herein denotes a treating agent capable of introducing a carboxyl group ($-COOH$).

Techniques for introducing a carboxyl group include chemical treatment with an oxidizing agent, such as hypohalogenous acid salts (e.g., sodium hypochlorite and potassium hypochlorite), which severs part of the bonds ($C=C$ or $C-C$) on the pigment particles surface to achieve oxidation, and physical oxidation such as a plasma treatment. Various techniques are applicable as long as a stable dispersed state in an aqueous medium is achieved as a result. The above-described treatments for carboxyl introduction are sometimes accompanied by introduction of a quinone group, etc., while not much in quantity. Such cases are included under the scope and spirit of the present invention unless the dispersion stability of the microencapsulated pigment in an aqueous medium is spoiled.

The following describes an example of the treatment with a carboxylating agent. Pigment particles are previously dispersed in an aqueous medium by high shear dispersion in a high-speed mixer, etc or impact dispersion in a bead mill, a jet mill, etc. to prepare a pigment slurry. The slurry is mixed with a hypohalogenous acid salt, such as sodium hypochlorite, having an effective halogen concentration of 10 to 30% in an adequate amount of water. The mixture is heated with stirring at 60 to 80° C. for about 5 to 10 hours, preferably 10 hours or longer. Accompanied by considerable heat generation, the reaction should be carried out with due care about safety. After the reaction, the solvent and the residual carboxylating agent are removed from the slurry by heat treatment. If necessary, the resulting dispersion is further worked up by washing with water, ultrafiltration, reverse osmosis, repetition of centrifugation and filtration, or like means to obtain a desired aqueous dispersion.

Similarly to the pigment particles having a sulfonic acid group and/or a sulfinic acid group, the pigment particles having a carboxyl group ($-COOH$) can be treated with an alkali compound to convert the carboxyl group to a carboxylate anion ($-COO^-$). The kind of the alkali compound and the method of treating with the alkali compound are the same as described above.

A preferred amount of the hydrophilic group to be introduced on the surface of pigment particles and a method of investigating the introduced state of the hydrophilic group will then be described.

Where hydrophilization of pigment particles is achieved by a sulfonating agent, the amount of the hydrophilic group to be introduced on the pigment particles surface is preferably $10 \times 10^{-6}$ equivalent or more per gram of the pigment particles. Amounts less than $10 \times 10^{-6}$ equivalent tend to result in agglomeration of the pigment particles in the step of microencapsulating the pigment particles in an aqueous medium, which tends to result in an increased average particle size of the resulting encapsulated pigment. As the average particle size of microencapsulated pigment particles increases, it becomes harder to obtain ink jet recording ink excellent in dispersion stability and ejection stability and capable of forming images with high density.

The upper limit of the amount of the hydrophilic group introduced is not particularly limited but is preferably not more than $150 \times 10^{-6}$ equivalent per gram of the pigment particles. Seeing that introduction of more than $150 \times 10^{-6}$ equivalent of a hydrophilic group does not always bring about a reduction in average particle size, $150 \times 10^{-6}$ equivalent can be seen as an advisable upper limit from the standpoint of cost performance.

Where hydrophilization is achieved with a carboxylating agent by the surface treating method adopted in the present invention, it is impossible to directly measure the amount of the carboxyl group ($-COOH$) and/or the carboxylate anion ($-COO^-$) which are believed to be introduced by the method. Instead, the amount is estimated from the content of surface active hydrogen. Details of the method of measuring the surface active hydrogen content will be described later.

The active hydrogen content of the surface treated pigment is preferably 1.0 mmol/g or higher, still preferably 1.5 mmol/g or higher. With active hydrogen contents lower than 1.0 mmol/g, the pigment particles tend to have poor dispersibility in an aqueous medium and are liable to agglomerate in the step of microencapsulation.

According to the above-described techniques of hydrophilization, it is easy to obtain hydrophilized pigment particles with an average particle size of 150 nm or smaller. It is still preferred to control the average particle size in a range of 20 to 80 nm by properly selecting the kinds of the pigment and the hydrophilic group-imparting agent, the amount of a hydrophilic group introduced, and so forth. The preferred average particle size is more effective in providing an ink jet recording ink having excellent dispersion stability, excellent ejection stability, and capability of forming ink images with an increased density. The term "average particle size" as referred to in the present invention means a value measured by a laser light scattering method.

The resulting hydrophilized pigment particles are then coated with a polymer having a repeating unit derived from a polymerizable surface active agent having a hydrophilic group, a hydrophobic group, and a polymerizable group to become a microencapsulated pigment according to the first embodiment. As stated previously, such a microencapsulated pigment is conveniently prepared by adding the polymerizable surface active agent and a polymerization initiator to an aqueous dispersion of the hydrophilized pigment particles and subjecting the system to emulsion polymerization.

The hydrophilic group of the polymerizable surface active agent is preferably an anionic group selected from the group consisting of a sulfonic acid group or a salt thereof, a sulfinic acid group or a salt thereof, a carboxyl group or a salt thereof, and a carbonyl group or a salt thereof. The hydrophobic group of the polymerizable surface active agent is preferably selected from the group consisting of an alkyl group, an aryl group, and a group composed of a combination thereof.

The polymerizable group of the polymerizable surface active agent is preferably an unsaturated hydrocarbon group and is still preferably selected from the group consisting of a vinyl group, an allyl group, an acryloyl group, a methacryloyl group, a propenyl group, a vinylidene group, and a vinylene group. Particularly preferred of them are an acryloyl group and a methacryloyl group.

Examples of such polymerizable surface active agents are anionic allyl derivatives described, e.g., in JP-B-49-46291, JP-B-1-24142, and JP-A-62-104802; anionic propenyl derivatives described, e.g., in JP-A-62-221431; anionic acrylic acid derivatives described, e.g., in JP-A-62-34947 and JP-A-55-11525; anionic itaconic acid derivatives described, e.g., in JP-B-46-34898 and JP-A-51-30284; anionic maleic acid derivatives described, e.g., in JP-B-51-4157 and JP-A-51-30284; nonionic allyl derivatives described, e.g., in JP-A-62-104802; nonionic propenyl derivatives described, e.g., in JP-A-62-100502; nonionic acrylic acid derivatives described, e.g., in JP-A-56-28208; nonionic itaconic acid derivatives described, e.g., in JP-B-59-12681; and nonionic maleic acid derivatives described, e.g., in JP-A-59-74102.

The polymerizable surface active agents which can be used in the invention include acrylic acid-modified polyoxyethylene alkyl ethers, acrylic acid-modified polyoxyethylene alkylphenyl ethers, allylic acid-modified polyoxyethylene alkyl ethers, allylic acid-modified polyoxyethylene alkylphenyl ethers; allylic acid-modified polyoxyethylene polystyrylphenyl ether; acrylic acid-modified polyoxyethylene polystyrylphenyl ether, and polyoxyethylene-polyoxypropylene glycol monoacrylate.

Preferred polymerizable surface active agents for use in the invention include compounds represented by formula (31):

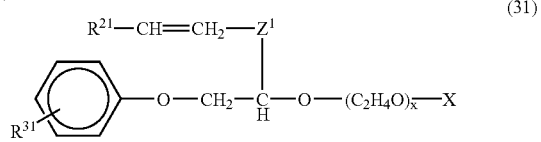

(31)

wherein $R^{21}$ and $R^{31}$ each represent a hydrogen atom or a hydrocarbon group having 1 to 12 carbon atoms; $Z^1$ represents a carbon-carbon single bond or $—CH_2—O—CH_2—$: x represents an integer of 2 to 20; X represents a hydrogen atom or $—SO_3M^1$; and $M^1$ represents an alkali metal atom, an ammonium salt residue or an alkanolamine residue; and compounds represented by formula (32):

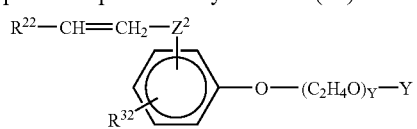

(32)

wherein $R^{22}$ and $R^{32}$ each represent a hydrogen atom or a hydrocarbon group having 1 to 12 carbon atoms; $Z^2$ represents a carbon-carbon double bond or $—CH_2—O—CH_2—$; y represents an integer of 2 to 20; Y represents a hydrogen atom or $—SO_3M^2$; $M^2$ represents an alkali metal atom, an ammonium salt residue or an alkanolamine residue.

The compounds of formula (31) are disclosed in JP-A-5-320276 and JP-A-10-316909. The hydrophilicity or hydrophobicity of the compound of formula (31) can be adjusted to match the hydrophilicity or hydrophobicity of the pigment particle surface by appropriately selecting the group for $R^{21}$ and the value of x. Preferred polymerizable surface active agents of formula (31) are represented by formulae (31a) to (31d) shown below.

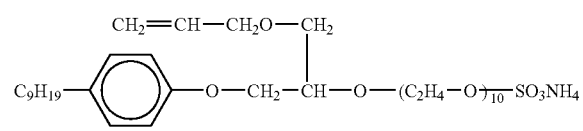

(31a)

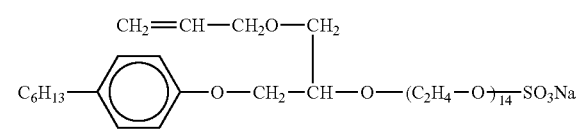

(31b)

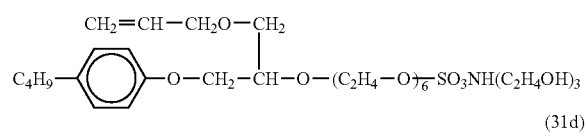

(31c)

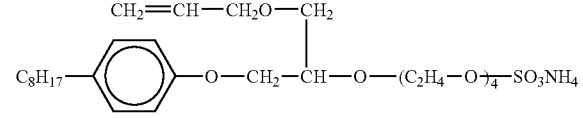

(31d)

Some of the polymerizable surface active agents supra are commercially available, which can be made use of in the present invention. Examples of useful commercial products are Aqualon HS series (HS-05, HS-10, HS-20 and HS-1025), Aqualon RN series (RN-10, RN-20, RN-30, RN-50, and RN-2025), and New Frontier series (N-177E and S-510), all available from Daiichi Kogyo Yakuhin Co., Ltd.; and Adeka Reasope SE series and Adeka Reasope NE series both available from Asahi Denka Co., Ltd.

Preferred polymerizable surface active agents for use in the invention also include compounds represented by formula (33):

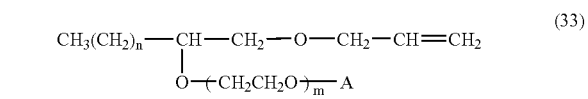

(33)

wherein n represents 9 or 11; m represents an integer of 2 to 20; A represents a hydrogen atom or $—SO_3M^3$; $M^3$ represents an alkali metal atom, an ammonium salt residue or an alkanolamine residue.

The compounds of formula (33) include compounds represented by formula:

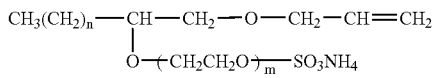

wherein n is 9 or 11; and m is 5 or 10.

The polymerizable surface active agents supra which are commercially available, such as Aqualon KH-05 and Aqualon KH-10 from Daiichi Kogyo Yakuhin Co., Ltd., can be made use of.

Compounds represented by formula (A) shown below are also preferred polymerizable surface active agents.

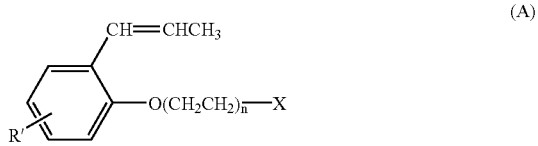

wherein $R^1$ represents a hydrogen atom or a hydrocarbon group having 1 to 12 carbon atoms; n represents 2 to 20; X represents a hydrogen atom or —$SO_3M$; and M represents an alkali metal atom, an ammonium salt residue or an alkanolamine residue.

The above-enumerated polymerizable surface active agents can be used either individually or as a mixture of two or more thereof.

The polymerizable surface active agent is preferably used in an amount of about 5 to 70% by weight, particularly about 10 to 50% by weight, based on the pigment. Amounts of 5% or more assure excellent dispersibility of the encapsulated particles and excellent ejection stability, adsorbability to paper fiber, image density, and color developability of the resulting ink. When added in amounts exceeding 70%, part of the polymerizable surface active agent tends to remain unadsorbed onto the pigment particles, and polymer particles containing no core substance tend to be produced.

In the first embodiment, the polymer layer coating the pigment particles may be a copolymer comprising a repeating unit derived from the above-described polymerizable surface active agent having a hydrophilic group, a hydrophobic group, and a polymerizable group and a repeating unit derived from a comonomer copolymerizable with the polymerizable surface active agent. The microencapsulated pigment having such a copolymer layer is conveniently produced by adding the polymerizable surface active agent, a comonomer copolymerizable therewith, and a polymerization initiator to an aqueous dispersion of the hydrophilized pigment particles and subjecting the system to emulsion polymerization to coat the pigment particles with a copolymer. This modification is particularly effective to control the fixability, abrasion resistance, and solvent resistance of recorded images and storage stability of the ink. In particular, the fixability and abrasion resistance of recorded images can be controlled by selecting an appropriate glass transition point (Tg) of the copolymer. A preferred Tg of the copolymer is −20° to 30° C. A Tg higher than 30° C. tends to result in reduction of fixability and abrasion resistance. A Tg lower than −20° C. tends to result in reduction of solvent resistance.

The comonomer copolymerizable with the polymerizable surface active agent includes hydrophilic monomers and hydrophobic monomers.

The hydrophobic monomers are compounds having at least a hydrophobic group and a polymerizable group in the molecule thereof. The hydrophobic group is preferably selected from the group consisting of aliphatic hydrocarbon groups, alicyclic hydrocarbon groups, and aromatic hydrocarbon groups. The hydrophilic monomers are compounds having at least a hydrophilic group and a polymerizable group in the molecule thereof. The hydrophilic group is preferably selected from the group consisting of a sulfonic acid group or a salt thereof, a sulfinic acid group or a salt thereof, a carboxyl group or a salt thereof, a carbonyl group or a salt thereof, a hydroxyl group, an oxyethylene group, an amido group, and an amino group.

The polymerizable group possessed by the comonomer, whether hydrophilic or hydrophobic, is preferably a radically polymerizable unsaturated hydrocarbon group selected from the group consisting of a vinyl group, an allyl group, an acryloyl group, a methacryloyl group, a propenyl group, a vinylidene group, and a vinylene group.

As for the hydrophobic monomer, the aliphatic hydrocarbon groups include methyl, ethyl, and propyl. The alicyclic hydrocarbon groups include cyclohexyl, dicyclopentenyl, and isobornyl. The aromatic hydrocarbon groups include benzyl, phenyl, and naphthyl.

Examples of the hydrophobic monomers having a radically polymerizable group are styrene; styrene derivatives, such as methylstyrene, dimethylstyrene, chlorostyrene, dichlorostyrene, bromostyrene, p-chloromethylstyrene, and divinylbenzene; monofunctional acrylic esters, such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, caprolactone acrylate, and glycidyl acrylate; monofunctional methacrylic esters, such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, caprolactone methacrylate, and glycidyl methacrylate; allyl compounds, such as allylbenzene, allyl-3-cyclohexane propionate, 1-allyl-3,4-dimethoxybenzene, allylphenoxy acetate, allylphenyl acetate, allylcyclohexane, and allyl polycarboxylates; esters of fumaric acid, maleic acid or itaconic acid; acrylonitrile, methacrylonitrile, N-substituted maleimides, and cyclic olefins.

The hydrophilic monomers are compounds having at least a hydrophilic group and a polymerizable group in the molecule thereof. The hydrophilic group is preferably selected from the group consisting of a sulfonic acid group or a salt thereof, a sulfinic acid group or a salt thereof, a carboxyl group or a salt thereof, a carbonyl group or a salt thereof, a hydroxyl group, an oxyethylene group, an amido group, and an amino group.

Of these, anionic groups, such as a sulfonic acid group, a sulfinic acid group, a carboxyl group, a carbonyl group, and their salts, easily exert interaction with various metal ions (e.g., Mg, Ca or Al ions) and cationic starch or a cationic polymer which are usually contained in plain paper and also with cellulose fiber of paper. Microencapsulated pigments having a copolymer layer comprising a repeating unit derived from a polymerizable monomer having such an anionic hydrophilic group, when formulated into ink jet recording ink and ejected onto plain paper, readily stay at the landing position on the paper to form an image with high density and little feathering.

From this viewpoint, preferred hydrophilic monomers include methacrylic acid, acrylic acid, 2-hydroxymethacrylates, ethyldiethylene glycol acrylate, polyethylene glycol monomethacrylate, methoxypolyethylene glycol methacrylate, phosphoric group-containing (meth)acrylates, N-vinyl-2-pyrrolidone, sodium vinylsulfonate, 2-sulfoethyl methacrylate, and 2-acrylamido-2-methylpropanesulfonic acid. Still preferred of them are methacrylic acid, acrylic acid, sodium vinylsulfonate, 2-sulfoethyl methacrylate, 2-acrylamido-2-methylpropanesulfonic acid, and phosphoric group-containing (meth)acrylates.

Where the polymerizable surface active agent is a highly electron-donating compound, such as one represented by formula (1) described supra, it is preferred to use a highly electron-accepting compound as a comonomer. Highly electron-accepting comonomers include acrylonitrile, fumaronitrile, fumaric diesters (e.g., dibutyl fumarate), maleic diesters (e.g., dibutyl maleate), maleimides (e.g., N-phenylmaleimide), and vinylidene cyanide. They can be used either individually or as a mixture of two or more thereof.

The comonomer is preferably used in an amount of about 2 to 15 mol, particularly about 3 to 12 mol, per mole of the polymerizable surface active agent. By using at least double the molar quantity of the comonomer, the resulting microencapsulated pigment exhibits particularly high dispersion stability in an aqueous medium. When used in amounts of 15 mol or less, the comonomer completely copolymerizes with the polymerizable surface active agent with a reduced fear that excess of the comonomer may homopolymerize to produce a water-insoluble polymer. After the polymerization, the mixture is preferably worked up by, for example, micro-filtration to remove coarse particles which may clog the nozzle of a recording head.

The polymerization of the polymerizable surface active agent or copolymerization of the polymerizable surface active agent and the comonomer is preferably initiated by addition of a polymerization initiator. It is preferable to use a water-soluble polymerization initiator, such as potassium persulfate, ammonium persulfate, sodium persuflate, 2,2-azobis(2-methylpropionamidine) dihydrochloride or 4,4-azobis(4-cyanovaleric acid).

In a preferred example, the microencapsulated pigment according to the first embodiment is obtained as follows. An aqueous dispersion of the hydrophilized pigment particles and, if necessary, an aqueous solvent is/are put into a reaction vessel equipped with an ultrasonic generator, a stirrer, a reflux condenser, a dropping funnel, and a temperature controller and mixed by stirring. The polymerizable surface active agent is added thereto, and the system is ultrasonicated for a prescribed period of time. The comonomer, if used, is added here, followed by ultrasonication for a prescribed time. The system is heated to a predetermined polymerization temperature, and a solution of the water-soluble polymerization initiator in pure water is added dropwise to carry out polymerization under ultrasonication. After completion of the polymerization, the reaction mixture is preferably adjusted to a pH of 7.0 to 9.0 and filtered. The aqueous solvent (aqueous medium) used here is a solvent mainly comprising water as previously defined. The aqueous medium may further comprise other water-soluble solvents, such as glycerols and glycols. The polymerization temperature preferably ranges 60° to 90° C. In case the hydrophilized pigment particles are not in the form of an aqueous dispersion, they are preferably previously subjected to a dispersion operation by use of a general dispersing machine, such as a ball mill, a roll mill, an Eiger mill or a jet mill.

It is considered that the microencapsulated pigment of the first embodiment has a structure in which pigment particles with a small average particle size are completely coated with a polymer layer, and the hydrophilic groups of the polymer layer are regularly orientated toward the aqueous medium as shown in FIGS. 2 and 4. Therefore, the microencapsulated pigment exhibits high dispersion stability in an aqueous medium.

[II] SECOND EMBODIMENT

Figure 5:
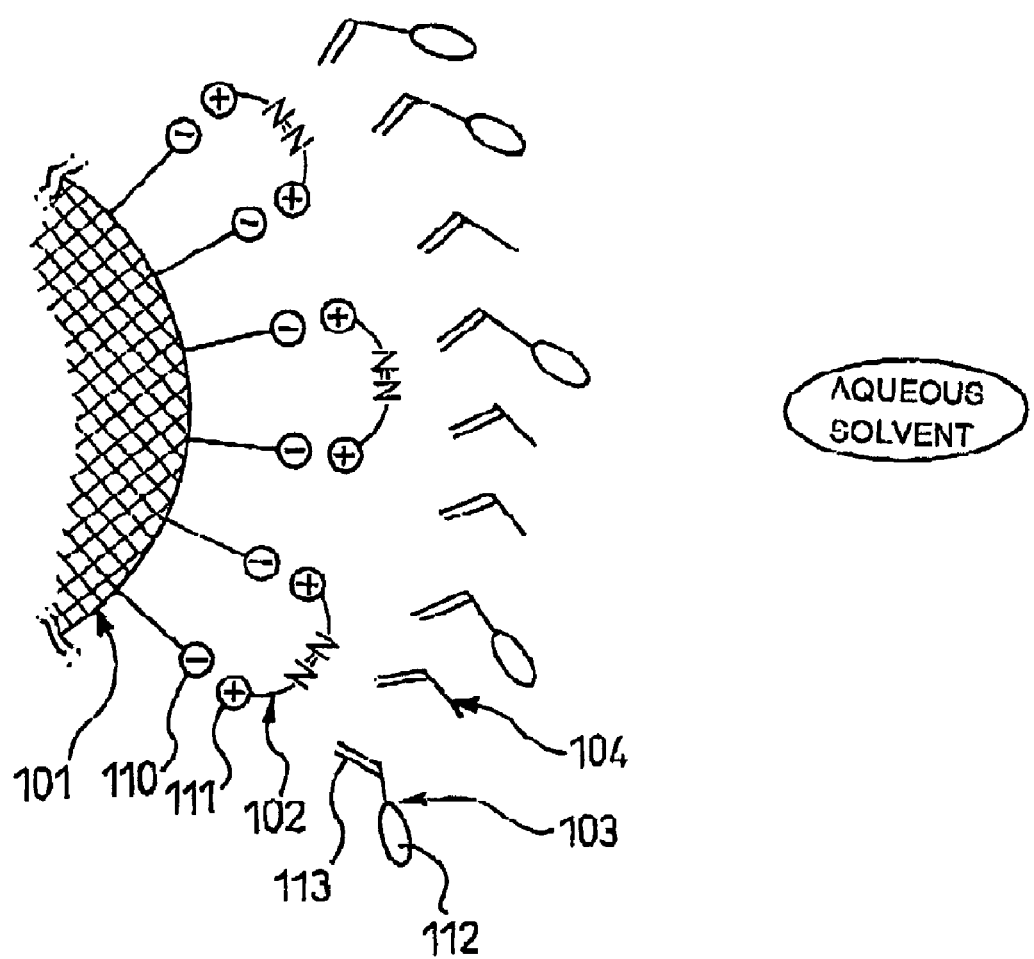
FIG. 5 schematically depicts a disperse state in which a pigment particle having an anionic group on the surface thereof is dispersed in an aqueous medium and is coexistent with an azo compound having a cationic group, a hydrophilic monomer, and a comonomer.
Figure 6:
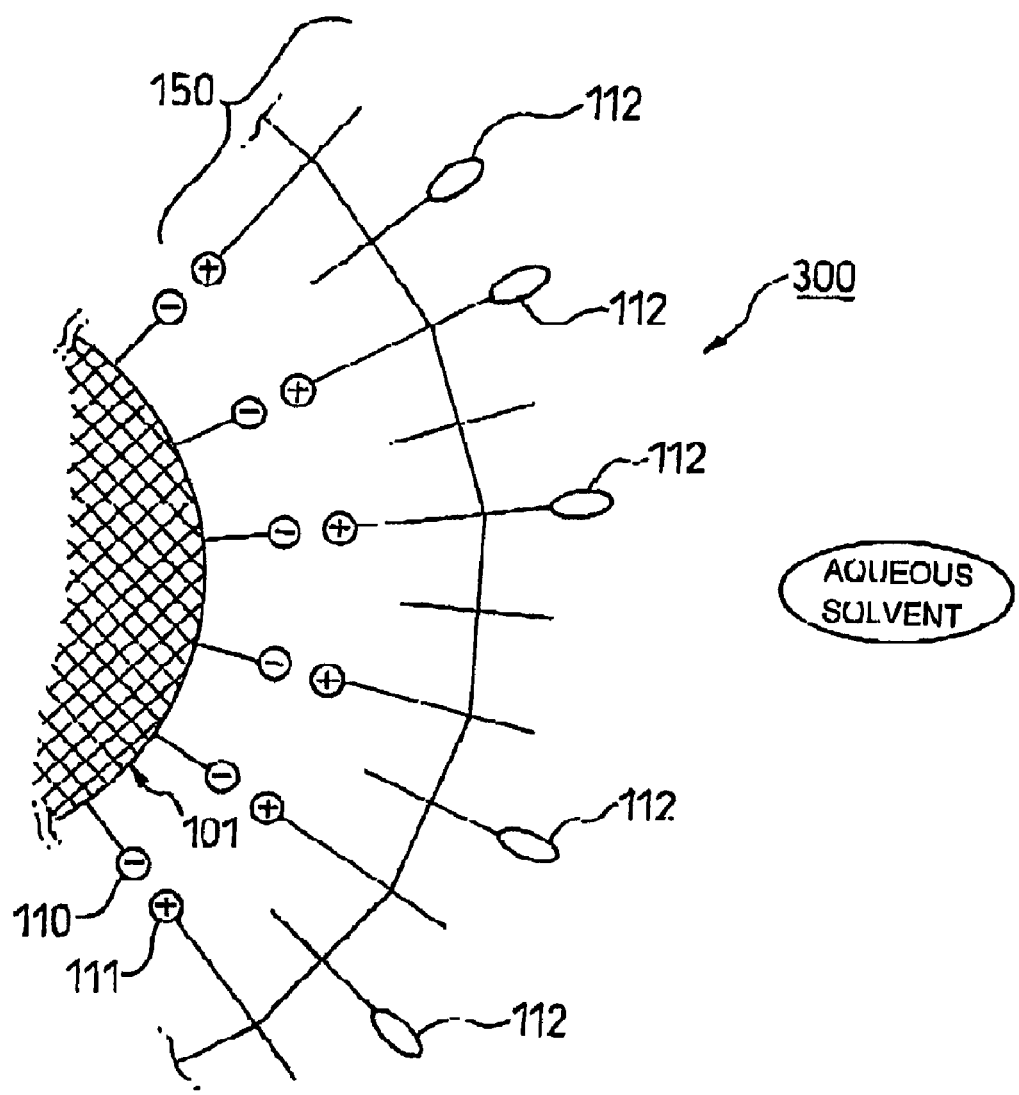
FIG. 6 schematically shows the disperse state of FIG. 5 in which the polymerizable monomer and the comonomer have been copolymerized.

The microencapsulated pigment according to the second embodiment of the invention is characterized in that pigment particles having an anionic group as a hydrophilic group on their surface are coated with a polymer produced by polymerizing a hydrophilic monomer with the aid of a polymerization initiator having a cationic group. The microencapsulated pigment of the second embodiment is conveniently produced by a process comprising the steps of mixing a polymerization initiator having a cationic group with an aqueous dispersion of pigment particles having an anionic hydrophilic group on their surface under a condition that does not activate the polymerization initiator, adding a hydrophilic monomer and a surface active agent to the dispersion, and activating the polymerization initiator to carry out emulsion polymerization to thereby coat the pigment particles with a polymer. The process will be described with reference to a disperse state the pigment particles could take in the process. Note that the description contains theoretical assumptions. FIGS. 5 and 6 are referred to.

FIG. 5 illustrates a disperse state in which a pigment particle 101 having an anionic group 110 on the surface thereof is dispersed in an aqueous medium in the presence of an azo compound 102 having a cationic group 111 as a polymerization initiator having a cationic group, a hydrophilic monomer 103 having a hydrophilic group 112 and a polymerizable group 113, and a comonomer 104 copolymerizable with the hydrophilic monomer 103. The azo compound 102 is orientated with its cationic groups 111 facing the anionic groups 110 of the pigment particle 101. The hydrophilic monomer 103 is orientated with its hydrophilic group 112 directed toward the aqueous medium and its polymerizable group 113 positioned near the azo group (-M=N—) of the azo compound 102. The comonomer 104 is in the same position as the hydrophilic monomer 103 with respect to the pigment particle 101.

In this disperse state, when the hydrophilic monomer 103 and the comonomer 104 are copolymerized by, for example, heating or irradiation, there is produced a microencapsulated pigment 300 comprising the pigment particle 101 encapsulated with a polymer layer 150 as shown in FIG. 6. Since the polymer layer 150 has the hydrophilic groups 112 on its surface, the microencapsulated pigment 300 is dispersible in an aqueous medium.

Since the pigment particles 101 are in a dispersed state in an aqueous medium by virtue of their surface hydrophilic groups 101. The pigment particles 101 achieve a high dispersed state in an aqueous medium compared with pigment particles having no hydrophilic groups on their surface dispersed in an aqueous medium with a dispersant. Since the hydrophilic groups originated in the hydrophilic monomer are considered to be regularly and densely orientated toward the aqueous medium, there seems to be produced electrostatic repulsive force among the encapsulated particles. Besides the electrostatic repulsion, the polymer covering the pigment particles seems to produce a polymer effect.

Accordingly, the microencapsulated pigment of the second embodiment, in which pigment particles having an anionic group on their surface are coated with a polymer, is capable of providing a microencapsulated pigment ink excellent in dispersion stability and ejection stability and having a higher pigment concentration than the conventional microencapsulated pigment inks. Ink jet recording using the microencapsulated pigment ink having the increased pigment concentration will produce recorded matter enjoying high image density as well as excellent image fastness. Compared with inks comprising conventional surface-treated pigment particles as a colorant, the ink jet recording ink of the present invention, in which the pigment is coated with a polymer, exhibits high fixability on a recording medium to provide recorded matter with excellent abrasion resistance.

Components constituting the microencapsulated pigment of the second embodiment will be described in detail.

The pigment particles having an anionic group as a hydrophilic group on their surface (hereinafter referred to as anionic-hydrophilized pigment particles) are conveniently prepared by treating the surface of pigment particles with an anionic group-imparting agent. The anionic group-imparting agent includes the hydrophilic group-imparting agents recited with respect to the first embodiment. Accordingly, the anionic-hydrophilized pigment particles include the hydrophilized pigment particles described with respect to the first embodiment.

A preferred amount of the anionic group to be introduced onto the surface of pigment particles and a method of investigating the introduced state of the anionic groups will then be described.

Where hydrophilization with an anionic group (hereinafter referred to as anionic hydrophilization) is achieved with a sulfonating agent, the amount of the anionic group to be introduced on the pigment particles surface is preferably 1.0 mmol or more per gram of the pigment particles. Amounts less than 1.0 mmol/g tend to result in agglomeration of the pigment particles in the step of microencapsulating the pigment particles in an aqueous medium, which tends to result in an increased average particle size of the resulting encapsulated pigment. As the average particle size of microencapsulated pigment particles increases, it becomes harder to obtain an ink jet recording ink excellent in dispersion stability and ejection stability and capable of forming images with high density.

The upper limit of the amount of the anionic group introduced is not particularly limited but is preferably not more than 15 mmol/g. Seeing that introduction of more than 15 mmol/g of an anionic group does not always bring about a reduction in average particle size, 15 mmol/g can be seen as an advisable upper limit from the standpoint of cost performance.

Where anionic hydrophilization is achieved with a carboxylating agent by the surface treating method adopted in the present invention, it is impossible to directly measure the amount of the carboxyl group (—COOH) and/or the carboxylate anion (—COO$^-$) which are believed to be introduced by the method. Instead, the amount is estimated from the content of surface active hydrogen. Details of the method of measuring the surface active hydrogen content will be described later.

The active hydrogen content of the surface treated pigment is preferably 1.0 mmol/g or higher, still-preferably 1.5 mmol/g or higher. With active hydrogen contents lower than 1.0 mmol/g, the pigment particles tend to have poor dispersibility in an aqueous medium and are liable to agglomerate in the step of microencapsulation.

According to the above-described techniques of anionic hydrophilization, it is easy to obtain pigment particles having a hydrophilic anionic group on their surface with an average particle size of 150 nm or smaller. It is preferred to control the average particle size in a range of 20 to 80 nm by properly selecting the kinds of the pigment and the anionic group-imparting agent, the amount of an anionic group introduced, and so forth. The preferred average particle size is more effective in providing an ink jet recording ink having excellent dispersion stability, excellent ejection stability, and capability of forming ink images with an increased density.

The resulting anionic-hydrophilized pigment particles are then coated with a polymer to become a microencapsulated pigment according to the second embodiment. The polymer is one obtained by polymerizing a hydrophilic monomer in the presence of a polymerization initiator having a cationic group. As stated previously, such a microencapsulated pigment is conveniently prepared by adding a polymerization initiator having a cationic group to an aqueous dispersion of the anionic-hydrophilized pigment particles under such a condition that does not activate the polymerization initiator having a cationic group, adding a hydrophilic monomer and a surface active agent to the mixture, and activating the polymerization initiator having a cationic group to carry out emulsion polymerization.

Suitable examples of the polymerization initiator having a cationic group include 2,2'-azobis[2-(5-methyl-2-imidazolin-2-yl)propane] dihydrochloride (VA-041, available from Wako Pure Chemical Industries, Ltd.), 2,2'-azobis[2-(2-imidazolin-2-yl)propane]dihydrochloride (VA-044, from Wako Pure Chemical), 2,2'-azobis[2-(2-imidazolin-2-yl) propane] disulfite dihydrate (VA-046B, from Wako Pure Chemical), 2,2'-azobis[2-(3,4,5,6-tetrahydropyrimidin-2-yl) propane] dihydrochloride (VA-058, from Wako Pure Chemical), 2,2'-azobis[2-[1-(2-hydroxyethyl)-2-imidazolin-2-yl] propane] dihydrochloride (VA-060, from Wako Pure Chemical), and 2,2'-azobis(2-amidinopropane) dihydrochloride (V-50, from Wako Pure Chemical).

The amount of the polymerization initiator having a cationic group to be used is preferably about 0.5 mol, still preferably from 0.1 to 0.5 mol, per the amount of the anionic group content of the hydrophilized pigment particles. In other words, the amount of the polymerization initiator having a cationic group to be added is arbitrarily selected within the above-recited range according to the anionic group content of the hydrophilized pigment particles and the amount of the pigment charged. With amounts less than 0.1 mol of the polymerization initiator, the resulting polymer has difficulty in uniformly covering the individual pigment particles. When the polymerization initiator is added in amounts more than 0.5 mol, the excess remains free in water without being adsorbed on the surface of pigment particles. It would follow that an increased amount of polymer molecules is free in water, which may lead to insufficient performance of resulting ink jet recording ink such as ejection stability.

The hydrophilic monomer which can be used in the second embodiment includes those described as for the first embodiment. The hydrophilic monomer is preferably used in a weight ratio of from about 5/100 to 50/100, particularly about 5/100 to 30/100, to the pigment. The hydrophilic monomer/pigment weight ratio of 5/100 or higher assures excellent dispersibility in water. Where the hydrophilic monomer is added at a weight ratio exceeding 30/100, the hydrated layer may tend to extend to increase the diameter of the particles, or water-soluble oligomers or polymers may tend to be generated and dissolved in water without being adsorbed onto the pigment particles.

The polymer coating the pigment particles may be a copolymer produced from the hydrophilic monomer and a comonomer copolymerizable with the hydrophilic monomer with the aid of the polymerization initiator having a cationic group. The microencapsulated pigment having such a copolymer layer is conveniently produced by a process comprising the steps of mixing the polymerization initiator having a cationic group with an aqueous dispersion of the anionic-hydrophilized pigment particles under a condition that does not activate the polymerization initiator having a cationic group, adding the hydrophilic monomer and a comonomer copolymerizable with the hydrophilic monomer to the mixture, and activating the polymerization initiator to carry out emulsion polymerization to thereby coat the pigment particles with a copolymer. This modification is particularly effective to control the fixability, abrasion resistance, and solvent resistance of recorded images and storage stability of the ink. In particular, the fixability and abrasion resistance of recorded images can be controlled by appropriately selecting the glass transition point (Tg) of the copolymer. A preferred Tg of the copolymer is −20° to 30° C. A Tg higher than 30° C. tends to result in reduction of fixability and abrasion resistance. A Tg lower than −20° C. tends to result in reduction of solvent resistance.

The comonomer copolymerizable with the hydrophilic monomer includes the hydrophobic monomers recited above with reference to the first embodiment.

The comonomer to be added is chosen according to the performance required of the resulting polymer, such as water resistance, solvent resistance, and Tg.

The surface active agent which can be used in the second embodiment includes anionic surface active agents, such as sulfonic acid types, e.g., alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, e.g., alkylphosphoric ester salts, polyoxyethylene alkyl ether phosphoric ester salts, and glycerophosphoric ester salts; and nonionic surface active agents, such as ethylene oxide adduct types, e.g., polyoxyethylene alkyl ethers, polyoxyethylene alkylphenyl ethers, polyoxyethylene alkyl esters, and polyoxyethylene alkylamides; polyol ester types, e.g., glycerol alkyl esters, sorbitan alkyl esters, and sugar alkyl esters; polyether types, e.g., polyhydric alcohol alkyl ethers; and alkanolamide types, e.g., alkanolamine fatty acid amides.

The surface active agent is preferably added in concentrations of about 0.01 to 10% by weight, particularly about 0.1 to 5% by weight, in the aqueous dispersion.

In the second embodiment, it is preferred to use a polymerizable surface active agent having a hydrophilic group, a hydrophobic group, and a polymerizable group. In this case, the polymerizable surface active agent copolymerizes with the hydrophilic monomer to bring about marked improvements in dispersibility in an aqueous medium and long-term storage stability. The polymerizable surface active agents useful in the second embodiment include those recited with respect to the first embodiment.

The polymerizable surface active agent is preferably added at a weight ratio to the pigment of about 1/100 to 50/100, particularly 5/100 to 30/100. A polymerizable surface active agent/pigment weight ratio of 1/100 or higher assures excellent dispersibility. When used at a weight ratio exceeding 50/100 to the pigment, part of the polymerizable surface active agent tends to remain unadsorbed onto the pigment particles and to produce polymer particles containing no core substance.

Where the polymerizable surface active agent is a highly electron-donating compound, such as one represented by formula (1) described below, it is preferred to use a highly electron-accepting compound as the comonomer. Highly electron-accepting comonomers include acrylonitrile, fumaronitrile, fumaric diesters (e.g., dibutyl fumarate), maleic diesters (e.g., dibutyl maleate), maleimides (e.g., N-phenylmaleimide), and vinylidene cyanide. These comonomers can be used either individually or as a mixture of two or more thereof.

In a preferred example, the microencapsulated pigment according to the second embodiment is obtained as follows. An aqueous dispersion of the anionic-hydrophilized pigment particles in an aqueous medium and the polymerization initiator having a cationic group are mixed by stirring at a low temperature (0° C. or lower, preferably −5 to −20° C.) and ultrasonicated. The resulting mixture is put into a reaction vessel equipped with an ultrasonic generator, a stirrer, a reflux condenser, a dropping funnel, and a temperature controller. Separately, an emulsified monomer mixture is prepared by mixing the hydrophilic monomer, the polymerizable surface active agent and, if desired, the comonomer by stirring. The monomer mixture is slowly added through the dropping funnel to the reaction vessel, the inner temperature of which is set to a prescribed polymerization temperature, and the system is allowed to undergo polymerization under ultrasonication for a prescribed period of time. After completion of the polymerization, the reaction mixture is preferably adjusted to a pH of 7.0 to 9.0 and filtered. The aqueous medium used here is a solvent mainly comprising water as previously defined. The aqueous medium may further comprise other water-soluble solvents, such as glycerols and glycols. The polymerization temperature preferably ranges 60° to 90° C. In case the hydrophilized pigment particles are not in the form of an aqueous dispersion, they are preferably previously subjected to a dispersion operation by use of a general dispersing machine, such as a ball mill, a roll mill, an Eiger mill or a jet mill.

In more detail, the anionic-hydrophilized pigment particles having an anionic group content of 1 mmol/g or more, ion-exchanged water, and a glycerol aqueous solution are put into a stirring apparatus equipped with an ultrasonic generator, and the mixture is dispersively stirred under ultrasonication for a prescribed period of time. The resulting dispersion is put into a reaction vessel equipped with an ultrasonic generator, a stirrer, a temperature controller, a reflux condenser, and a dropping funnel. The cationic polymerization initiator is added thereto in an amount of 0.1 to 0.5 mol per the amount of the anionic group content of the hydrophilized pigment particles, and the mixture is stirred at −20 to 0° C. for a prescribed period of time under ultrasonication. Then, the polymerizable surface active agent is added thereto, followed by mixing with stirring for a prescribed time. The inner temperature of the reaction vessel is set to a prescribed temperature while slowly adding an emulsified monomer mixture that has been prepared by stirring the hydrophilic monomer, the polymerizable surface active agent, water, and, if desired, a comonomer from the dropping funnel to carry out polymerization for a prescribed period of time. During the reaction, the reaction system is preferably ultrasonicated. The resulting microencapsulated pigment dispersion is adjusted to a pH 7.0 to 9.0 with an appropriate pH adjuster, e.g., potassium hydroxide or ammonia, followed by filtration to remove coarse particles. The filtrate is further subjected to ultrafiltration to remove oligomers or unreacted monomers to obtain a desired microencapsulated pigment dispersion.

It is considered that the microencapsulated pigment of the second embodiment has a structure in which pigment particles with a small average particle size are completely coated with a polymer layer, and the hydrophilic groups of the polymer layer are regularly orientated toward the aqueous medium as shown in FIG. 6. Therefore, the microencapsulated pigment exhibits high dispersion stability in an aqueous medium.

[III] THIRD EMBODIMENT

The microencapsulated pigment according to the third embodiment of the present invention is characterized in that pigment particles having a hydrophilic group on their surface (hydrophilized pigment particles) are coated with a polymer obtained by polymerizing a polymerizable surface active agent having a hydrophilic group, a hydrophobic group and a polymerizable group and/or a hydrophilic monomer by using a polymeric azo initiator comprising a repeating unit represented by formula (I):

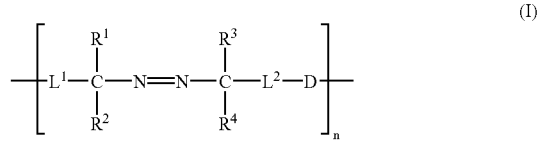

wherein D represents a portion having at least a hydrophobic segment; $L^1$ and $L^2$, which may be the same or different, each represent a linking group; $R^1$, $R^2$, $R^3$, and $R^4$ each represent an alkyl group having 1 to 4 carbon atoms or a cyano group; and n represents an integer of 1 or greater.

The microencapsulated pigment of the third embodiment is conveniently produced by a process comprising the steps of mixing the polymeric azo initiator comprising a repeating unit represented by formula (I) into an aqueous dispersion having hydrophilized pigment particles dispersed therein under a condition that does not activate the initiator, adding a polymerizable surface active agent having a hydrophilic group, a hydrophobic group, and a polymerizable group and/or a hydrophilic monomer to the mixture, and activating the polymeric azo initiator to carry out emulsion polymerization.

The resulting encapsulated pigment of the third embodiment has a structure in which hydrophilized pigment particles are substantially completely coated with a polymer layer, i.e., completely encapsulated in a polymer layer.

The pigment particles before encapsulation is in a dispersed state in an aqueous medium by virtue of their surface hydrophilic groups. The aqueous dispersion of the hydrophilized pigment particles has a highly dispersed state as compared with an aqueous dispersion prepared by dispersing pigment particles having no hydrophilic groups on their surface with the aid of a dispersant.

Similarly to the microencapsulated pigments of the first and second embodiments, the microencapsulated pigment of the third embodiment, having the individual hydrophilized pigment particles coated with a polymer, is excellent in dispersion stability and ejection stability. Seeing that the hydrophilic groups originated in the polymerizable surface active agent and/or the hydrophilic monomer are considered orientated regularly and densely toward the aqueous medium, it seems that an effective electrostatic repulsive force is generated. Besides the electrostatic repulsion, it is believed that a polymer effect due to the polymer coating the pigment particles is exerted.

Thus, the microencapsulated pigment of the third embodiment provides a microencapsulated pigment ink having an increased colorant concentration as compared with conventional microencapsulated pigment inks. Application of such a microencapsulated pigment ink having a high colorant concentration to ink jet recording makes it feasible to provide images with not only excellent fastness but high density. Further, the ink jet recording ink containing the microencapsulated pigment of the third embodiment exhibits superior fixability on a recording medium to provide images with excellent abrasion resistance compared with inks containing conventional surface-treated pigment particles.

Although the mechanism of the hydrophilized pigment particles' being completely encapsulated in a polymer layer according to the third embodiment has not been elucidated clearly, the following assumption can be presented.

The preparation of the aqueous dispersion of hydrophilized pigment particles starts with addition of the hydrophilized pigments to an aqueous medium in the presence of the polymeric azo initiator comprising the repeating unit of formula (I). Having both a hydrophobic moiety and a hydrophilic moiety in the repeating unit, the polymeric azo initiator is adsorbed to the surface of a hydrophilized pigment particle with the hydrophobic moiety thereof being adsorbed to the hydrophobic regions of the pigment particle and with the hydrophilic moiety thereof being adsorbed to the hydrophilic groups of the pigment particle. In the region of the polymeric azo initiator that does not participate in the adsorption, the hydrophilic moiety appears to face the aqueous medium to form a loop projection. In this state, when the polymerizable surface active agent and/or the hydrophilic monomer is/are added to the dispersion under ultrasonication, the hydrophobic moiety of the polymerizable surface active agent and/or the hydrophilic monomer is directed to the regions of the hydrophobic moiety of the polymeric azo initiator, while the hydrophilic moiety is directed to the aqueous medium. This configuration is favorable for assuring a satisfactory disperse state. The step of dispersing the hydrophilized pigment particles should be conducted under a condition that does not activate the polymeric azo initiator, i.e., a condition that does not cause the azo group of the polymeric azo initiator to decompose to generate a radical. Such a condition that does not activate the polymeric azo initiator includes a cooling condition.

Upon being activated, the polymeric azo initiator cleaves its azo group to generate nitrogen ($N_2$) and offer a radical. The radical attacks the polymerizable group of the polymerizable surface active agent and/or the hydrophilic monomer thereby inducing polymerization. The polymerizable surface active agent and/or the hydrophilic monomer bond(s) to the cleaved site of the polymeric azo initiator to produce a polymer having block chains originated in the polymeric azo initiator, with which the pigment particle is coated.

The polymer coating the pigment particles can further comprise a repeating unit derived from a hydrophobic comonomer. Useful hydrophobic comonomers include the above-recited hydrophobic monomers. By using a hydrophobic comonomer, the chain length from the pigment particle surface to the hydrophilic group regions increases to ensure satisfactory dispersibility.

It is a preferred modification of the third embodiment to add a crosslinking agent to the polymerization system. A crosslinking agent crosslinks the polymer to form a polymer layer which is bonded to the surface of a pigment particle more firmly.

As stated above, the microencapsulated pigment of the third embodiment is assumed to have a structure in which the individual pigment particles are completely coated with a polymer layer, but the present invention is not restricted by this assumption.

The components constituting the microencapsulated pigment of the third embodiment will be described in more detail below.

The pigment particles having a hydrophilic group on their surface (hydrophilized pigment particles) include those described in the first embodiment.

The polymeric azo initiator, polymerizable surface active agent and/or hydrophilic monomer, hydrophobic monomer, and crosslinking agent, and furthermore other additives, which can be used in the third embodiment are illustrated in order.

The polymeric azo initiator for use in the third embodiment can be prepared by, for example, copolymerizing an azo compound represented by formula (II):

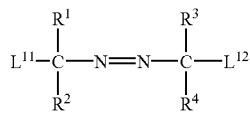

(II)

wherein $L^{11}$ and $L^{12}$ each represent a group capable of forming a linking group $L^1$ or $L^2$ in formula (I) on bonding to a linking group $L^{21}$ or $L^{22}$ in formula (III) shown infra; and $R^1$, $R^2$, $R^3$, and $R^4$ each represent an alkyl group having 1 to 4 carbon atoms or a cyano group, and a compound represented by formula (III):

$$L^{21}\text{-}D\text{-}L^{22} \qquad (III)$$

wherein $L^{21}$ and $L^{22}$ each represent a group capable of forming a linking group $L^1$ or $L^2$ in formula (I) on bonding to a linking group $L^{11}$ or $L^{12}$ in formula (II); and D is a portion containing at least a hydrophobic segment.

The polymeric azo initiator used in the third embodiment includes a compound having the structure of formula (I) wherein D is a hydrophobic segment, and $L^1$ and $L^2$, which may be the same or different, each represent a hydrophilic linking group, such as an ester linkage or an amido linkage. In this compound the portion between the hydrophilic linking groups $L^1$ and $L^2$ is a hydrophilic moiety.

The polymeric azo initiator used in the third embodiment also includes a compound having the structure of formula (I) wherein D is a copolymer segment represented by formula (11):

$$-B^1\text{-}A^1\text{-} \qquad (11)$$

wherein $A^1$ is a hydrophilic segment; and $B^1$ is a hydrophobic segment. The copolymer segment of formula (11) includes an ethylene oxide-propylene oxide copolymer segment represented by formula (11a):

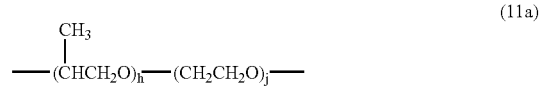

(11a)

wherein h and j each represent an integer of 1 or greater, preferably 1 to 30, still preferably 1 to 20, particularly preferably 4 to 20.

The polymeric azo initiator used in the third embodiment also includes a compound having the structure of formula (I) wherein D is a copolymer segment represented by formula (12):

$$-A^2\text{-}B^2\text{-}A^3\text{-} \qquad (12)$$

wherein $A^2$ and $A^3$, which may be the same or different, each represent a hydrophilic segment; and $B^2$ represent a hydrophobic segment. The copolymer segment of formula (12) includes an α,ω-bis(polyoxyethylene)polydimethylsiloxane segment represented by formula (12a):

(12a)

wherein $R^{11}$ and $R^{12}$ each represent a methyl group; Y represents an ethylene group; and a, b, and c each represent an integer of 1 or greater (a is preferably 1 to 24; b is preferably 1 to 20; and c is preferably 1 to 24).

The hydrophobic segment in the repeating unit represented by formula (I) is not limited as long as it has adsorbability to pigment particles. Preferred hydrophobic segments include a polysiloxane segment, a polyaryl segment, a polyalkyl segment, a polyalkylene oxide segment having 3 or more carbon atoms in the alkylene moiety thereof, and a combination thereof.

The polysiloxane segment includes a polydialkylsiloxane segment (preferably a polydimethylsiloxane segment) represented by formula (13):

(13)

wherein $R^6$, $R^7$, $R^8$, and $R^9$ each represent an alkyl group having 1 to 4 carbon atoms (preferably a methyl group) or an aryl group having 6 to 10 carbon atoms (preferably a phenyl group); d represents 0 or 1 (preferably 1); and e represents an integer of 1 or greater, preferably 1 to 20, still preferably 1 to 10.

The hydrophilic segment in the repeating unit of formula (I) is not particularly limited as long as it is not adsorbed to the pigment particles but protrudes toward an aqueous medium in a loop. A polyethylene oxide segment is a preferred hydrophilic segment. A polyethylene oxide segment includes one represented by formula (21):

$$-(CH_2CH_2O)_t- \quad (21)$$

wherein t represents an integer of 1 or greater, preferably 1 to 30, still preferably 1 to 20, particularly preferably 4 to 20.

The polymeric azo initiator having the repeating unit of formula (I) includes a compound represented by formula (Ia), a compound represented by formula (Ib), and a compound represented by formula (Ic):

preferably 1 to 30; j is preferably 1 to 30; and n is preferably 1 to 20).

While the amount of the polymeric azo initiator to be added is not particularly limited provided that it is sufficient for covering all the surface of the hydrophilized pigment particles, it preferably ranges from 1 to 30% by weight,

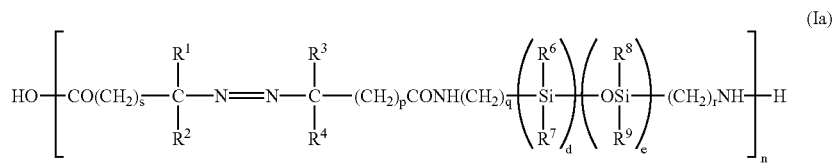

wherein $R^1$ and $R^3$ each represent an alkyl group having 1 to 4 carbon atoms; $R^2$ and $R^4$ each represent a cyano group; $R^6$, $R^7$, $R^8$, and $R^9$ each represent an alkyl group having 1 to 4 carbon atoms or an aryl group having 6 to 10 carbon atoms; d represents 0 or an integer of 1 or greater; and e, n, p, q, r, and s each represent an integer of 1 or greater (In formula (Ia), $R^1$ and $R^3$ each preferably represent a methyl group; e is preferably 1 to 20; n is preferably 1 to 20; p is preferably 1 to 5; q is preferably 1 to 30; r is preferably 1 to 5; and s is preferably 1 to 5);

particularly from 3 to 10% by weight, based on the total weight of the hydrophilized pigment particles. Use of 1% or more of the polymeric azo initiator ensures the improvement on dispersion stability of the hydrophilized pigment particles. With amounts of not more than 30%, existence of the polymeric azo pigment remaining unadsorbed to the pigment particles is suppressed, and production of a water-insoluble polymer or polymer particles having no core is prevented. Amounts of 3% or more further ensures the improvement on the dispersion stability of the pigment

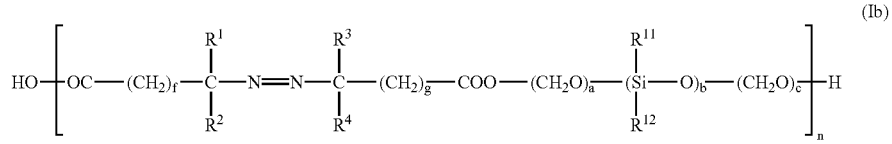

wherein $R^1$ and $R^3$ each represent an alkyl group having 1 to 4 carbon atoms; $R^2$ and $R^4$ each represent a cyano group; $R^{11}$ and $R^{12}$ each represent an alkyl group having 1 to 4 carbon atoms or an aryl group having 6 to 10 carbon atoms; a, b, c, f, g, and n each represent an integer of 1 or greater (In formula (Ib), $R^1$ and $R^3$ each preferably represent a methyl group; $R^{11}$ and $R^{12}$ each preferably represent a methyl group; a is preferably 1 to 24; b is preferably 1 to 20; c is preferably 1 to 24; f is preferably 1 to 5; g is preferably 1 to 5; and n is preferably 1 to 20);

particles, and amounts of 10% or less assure suppression of an increase of the encapsulated pigment particle size.

The polymerizable surface active agents which can be used in the third embodiment preferably include those illustrated with respect to the first embodiment.

The hydrophilic monomer which can be used in the third embodiment include those described as for the first embodiment.

The hydrophilic monomers can be used either individually or as a mixture of two or more thereof. One or more of

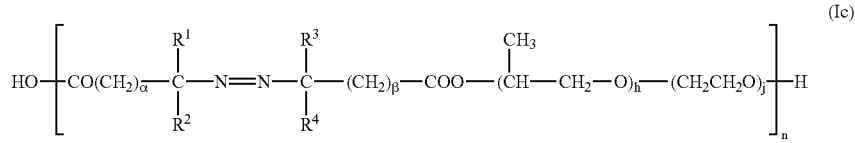

wherein $R^1$ and $R^3$ each represent an alkyl group having 1 to 4 carbon atoms; $R^2$ and $R^4$ each represent a cyano group; and $\alpha$, $\beta$, h, j, and n each represent an integer of 1 or greater (In formula (Ic), $R^1$ and $R^3$ each preferably represent a methyl group; $\alpha$ is preferably 1 to 5; $\beta$ is preferably 1 to 5; h is the polymerizable surface active agents and one or more of the hydrophilic monomers can be used in combination.

The amount of the polymerizable surface active agent and/or the hydrophilic monomer to be added preferably ranges 5 to 70% by weight, particularly 10 to 50% by weight, based on the total weight of the hydrophilized pigment particles. Use of 5% or more of the polymerizable surface active agent and/or the hydrophilic monomer brings about improved dispersion stability of the encapsulated pigment. With the amount being not more than 70%, production of polymer particles having no core or a water-soluble polymer can be prevented. Amounts of 10% or more result in further improvement on the dispersion stability of the encapsulated pigment. With amounts not more than 50% by weight, an increase in the encapsulated pigment particle size can be suppressed. The hydrophobic monomers which can be used in the third embodiment include those recited with respect to the first embodiment. The hydrophobic monomers can be used either individually or as a mixture of two or more thereof.

In the third embodiment, a crosslinking agent may be used to form a crosslinked polymer layer on the hydrophilized pigment particles.

Crosslinkable groups include a glycidyl group, an isocyanate group, a hydroxyl group, and an unsaturated hydrocarbon group (e.g., vinyl, allyl, acryloyl, methacryloyl, propenyl, vinylidene or vinylene).

The crosslinking agent that can be used is not particularly limited provided that it is highly reactive with the polymerizable surface active agent and/or the hydrophilic monomer. Crosslinking agents having at least two functional groups reactive with the crosslinkable group are preferred.

Such functional groups include an amino group, a carboxyl group, a hydroxyl group, a mercapto group, a glycidyl group, an isocyanate group, an N-methylol group, an N-methyl ether group, and a vinyl group.

Suitable crosslinking agents include (meth)acrylic ester monomers having a blocked isocyanate group, (meth)acrylic ester monomers having a glycidyl group, and (meth)acrylic ester monomers having a 1,3-dioxolan-2-one-4-yl group.

Specific examples are 2-methacryloyloxyethyl isocyanate, glycidyl(meth)acrylate, (1,3-dioxolan-one-4-yl)methyl (meth)acrylate, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol)adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bs[4-(acryloxyethoxy-diethoxy)phenyl]propane, 2,2-bis[4-(acryloxyethoxy-polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy) phenyl]propane, 2,2-bis[4-(methacryloxyethoxy-diethoxy) phenyl]propane, 2,2-bis[4-(methacryloxyethoxy-polyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, and diethylene glycol bisallyl carbonate.

The aqueous dispersion containing the microencapsulated pigment according to the third embodiment is prepared by a process comprising the steps of:

(1) allowing the polymeric azo initiator to be adsorbed onto the hydrophilized pigment particles in the presence of the polymeric surface active agent and/or the hydrophilic monomer under a condition that does not activate the polymeric azo initiator, and subsequently (2) activating the polymeric azo initiator to polymerize the polymerizable surface active agent and/or the hydrophilic monomer.

In the step (1), a mixture comprising the hydrophilized pigment particles, the polymeric azo initiator, the polymerizable surface active agent and/or the hydrophilic monomer, and a water-soluble organic solvent and/or water is ultrasonicated under, if necessary, cooling. Alternatively, a mixture of the hydrophilized pigment particles, the polymeric azo initiator, and a water-soluble organic solvent and/or water is ultrasonicated under, if necessary, cooling, and the polymerizable surface active agent and/or the hydrophilic monomer are added to the dispersion, followed by ultrasonication. If desired, a hydrophobic monomer and/or a crosslinking agent can be added to the system. The cooling is effected by, for example, circulating cooling water by means of a circulator. The cooling temperature, which depends on the decomposition (cleavage) temperature of the polymeric azo initiator, is preferably 20° C. or lower, still preferably 10° C. or lower.

Subsequently, the obtained mixture is put into a reaction vessel equipped with an ultrasonic generator, a stirrer, a temperature controller, a reflux condenser, and a dropping funnel. A water-soluble organic solvent and/or water is added to give a post-reaction solids content of 10 to 30% by weight, followed by stirring well. The system is then heated up to the decomposition temperature of the polymeric azo initiator to thereby activate the initiator and induce radical polymerization. If desired, crosslinking reaction by the crosslinking agent follows. The heating temperature, while varying with the kind of the polymeric azo initiator, preferably ranges from 60° to 80° C.

Addition of ink formulation components (described later) to the system in the above described step results in direct preparation of ink, for example, an ink jet recording ink.

The microencapsulated pigment according to the first, second, and third embodiments preferably has a particle size of 400 nm or smaller, particularly 300 nm or smaller, especially 50 to 200 nm. An embodiment in which the hydrophilized pigment particles are dispersed in an aqueous medium with the aid of a general non-polymerizable surface active agent, such as sodium dodecylbenzenesulfonate, sodium dodecyl sulfate or sodium lauryl sulfate, and a monomer is emulsion polymerized in the aqueous dispersion is also included under the scope of the present invention. Comparing with such an embodiment, the first to third embodiments are preferred in that foaming of the aqueous dispersion is suppressed.

[Aqueous Dispersion]

The aqueous dispersion according to an embodiment of the present invention contains the microencapsulated pigment according to the embodiments of the invention, preferably the liquid resulting from the emulsion polymerization as carried out according to the first, second or third embodiments described supra. Mixing the aqueous dispersion of the invention with ink components for ink jet recording provides an ink jet recording ink according to an embodiment of the present invention.

[Ink Jet Recording Ink]

In an embodiment of the invention, the ink jet recording ink contains the aqueous dispersion of the invention as stated.

In another embodiment, the ink jet recording ink contains the microencapsulated pigment of the invention and water. The microencapsulated pigment content is preferably 1 to 20% by weight, still preferably 3 to 15% by weight, based on the total ink composition. A content of 5 to 15% by weight is particularly recommended for securing high image density and high color developability.

The solvent of the ink jet recording ink preferably comprises water and a water-soluble organic solvent. If desired, other solvents may be added.

Suitable water-soluble organic solvents include alkyl alcohols having 1 to 4 carbon atoms, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane.

The ink jet recording ink preferably contains a high-boiling water-soluble organic solvent as a water-soluble organic solvent which can serve as a wetting agent for imparting water retentivity and wetting properties to the ink composition. Such a high-boiling water-soluble organic solvent includes one having a boiling point of 180° C. or higher.

Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, mesoerythritol, and pentaerythritol. Preferred of them are those having boiling points of 200° C. or higher. They can be used either individually or as a mixture of two or more thereof. Use of the high-boiling organic solvents provides ink jet recording inks which retain flowability and re-dispersibility for an extended period of time even when left to stand in an open state (in contact with air at room temperature) and which exhibit high ejection stability, hardly clogging nozzles during printing or on resuming printing after suspension.

The water-soluble organic solvent content in the ink jet recording ink is preferably about 10 to 50% by weight, still preferably 10 to 30% by weight, based on the total ink composition.

Useful water-soluble organic solvents further include polar solvents, such as 2-pyrrolidone, N-methylpyrrolidone, ε-caprolactam, dimethyl sulfoxide, sulfolane, morpholine, N-ethylmorpholine, and 1,3-dimethyl-2-imidazolidinone. These polar solvents can be used either individually or as a combination of two or more thereof. Use of the polar solvent is effective on dispersibility, bringing about satisfactory ejection stability.

The amount of the polar solvent is preferably 0.1 to 20% by weight, still preferably 1 to 10% by weight, based on the total ink composition.

The ink jet recording ink preferably contains a penetrant for accelerating penetration of the aqueous medium into recording media. Accelerated penetration of the aqueous medium into a recording medium assures formation of images with little feathering. Penetrants suitable for this purpose include polyhydric alcohol alkyl ethers (glycol ethers) and 1,2-alkyldiols. Examples of the polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of the 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol.

Particularly preferred penetrants are propylene glycol monobutyl ether, dipropylene glycol monobutyl ether, diethylene glycol monobutyl ether, triethylene glycol monobutyl ether, 1,2-pentanediol, and 1,2-hexanediol. The penetrant is preferably used in an amount of 1 to 20% by weight, particularly 1 to 10% by weight, based on the total ink composition. Less than 1% of the penetrant is substantially ineffective. More than 20% of the penetrant rather results in disadvantages such as feathering or an increased viscosity. Use of the 1,2-alkyldiol, such as 1,2-pentanediol or 1,2-hexanediol, is particularly effective in improving drying properties after recording and feathering resistance.

It is particularly preferred for the ink jet printing ink to contain at least one compound selected from the group consisting of glycerol, a polyhydric alcohol alkyl ether, and a 1,2-alkyldiol to improve penetrability of ink solvent components into a recording medium while sufficiently securing ejection reliability (non-clogging properties) and storage stability of the ink. These effects in cooperation with the effects of the microencapsulated pigment bring about remarkably improved image quality with greatly reducing feathering even when plain paper or regenerated paper is used as a recording medium.

In using the glycol ethers supra, they are preferably used in combination with an acetylene glycol compound hereinafter described as a surface active agent.

The ink jet recording ink of the invention preferably contains a surface active agent, especially an anionic surface active agent and/or a nonionic surface active agent. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Useful nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides.

Examples of the anionic surface active agents are sodium dodecylbenzenesulfonate, sodium laurate, and a polyoxyethylene alkyl ether sulfate ammonium salt. Examples of the nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g., polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

It is still preferred for the ink jet recording ink of the invention to contain an acetylene glycol surface active agent and/or an acetylene alcohol surface active agent to improve the penetrability of the aqueous medium into recording media thereby achieving printing with little feathering.

The acetylene glycol surface active agent which is preferably used includes one represented by formula (6):

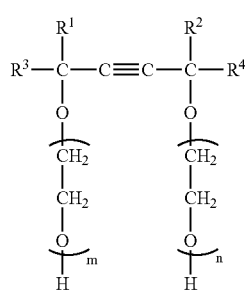

(6)

wherein $R^1$, $R^2$, $R^3$, and $R^4$ each represent an alkyl group (preferably having 6 or fewer carbon atoms); and m and n are numbers satisfying the relationship: $0 \leq m+n \leq 50$.

Of the compounds represented by formula (6) particularly preferred are 2,4,7,9-tetramethyl-5-decyne-4,7-diol, 3,6-dimethyl-4-octyne-3,6-diol, and 3,5-dimethyl-1-hexyn-3-ol.

The acetylene glycol surface active agents represented by formula (6) which are commercially available can be made use of. Examples include Surfynol series 104, 82, 465, 485 and TG, produced by Air Products and Chemicals, Inc., and Olfine series STG and E1010, supplied by Nisshin Chemical Industry Co., Ltd.

The acetylene alcohol surface active agents that are commercially available include Surfynol 61 from Air Products and Chemicals, Inc.

These surface active agents are preferably used in amounts of 0.01 to 10% by weight, particularly 0.1 to 5% by weight, based on the total ink composition.

The ink jet recording ink can contain a pH adjuster for adjusting its pH preferably to 7 to 9, still preferably 7.5 to 8.5.

Suitable pH adjusters include potassium metal compounds, such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine, and propanolamine.

Inter alia, an alkali metal hydroxide or an amine alcohol is contributory to the improvement of dispersion stability of the pigment particles.

The alkali metal hydroxide is preferably used in an amount of 0.01 to 5% by weight, particularly 0.05 to 3% by weight, based on the total ink composition.

The amine alcohol is preferably used in an amount of 0.1 to 10% by weight, particularly 0.5 to 5% by weight, based on the total ink composition.

The ink jet recording ink can contain antifungals, antiseptics, and rust inhibitors, such as benzoic acid, dichlorophene, hexachlorophene, sorbic acid, p-hydroxybenzoic esters, ethylenediaminetetraacetic acid (EDTA), sodium dehydroacetate, 1,2-benthiazolin-3-one (commercially sold under a trade name "Proxel" from Avecia), 3,4-isothiazolin-3-one, and 4,4-dimethyloxazolidine.

The ink jet recording ink can contain urea, thiourea and/or ethylene urea for preventing the ink from drying at nozzles of a recording head.

A particularly preferred formulation of the ink jet recording ink according to the invention comprises at least:

(1) the microencapsulated pigment according to the present invention, (2) an acetylene glycol surface active agent and/or an acetylene alcohol surface active agent, (3) at least one compound (penetrant) selected from the group consisting of diethylene glycol monobutyl ether, triethylene glycol monobutyl ether, and a 1,2-alkyldiol having 4 to 10 carbon atoms, (4) glycerol, and (5) water.

The ink jet recording ink having the above formulation is excellent in dispersion stability and ejection stability and assures stable recording without causing nozzle clogging for a prolonged period of time. It has satisfactory drying properties after ejected to form high-quality ink images with high density and excellent color developability and with little feathering even on plain paper, regenerated paper or coated paper.

In general, pigments are dispersed in the presence of surface active agents or polymeric dispersants. However, because these dispersing aids are simply adsorbed by pigment particles, they are liable to separate from the surface of pigment particles by some environmental factors. In the present invention, to the contrary, the (crosslinked) polymer layer completely encapsulates the hydrophilized pigment particles and hardly comes off the surface of the particles because, as is believed, the polymer layer is very firmly adsorbed onto the surface of the pigment particles.

Conventional ink compositions comprising a pigment dispersion prepared by dispersing pigment particles with a surface active agent or a polymeric dispersant, the above-described acetylene glycol surface active agent and/or the acetylene alcohol surface active agent, and a penetrant, such as diethylene glycol monobutyl ether, triethylene glycol monobutyl ether, propylene glycol monobutyl ether, dipropylene glycol monobutyl ether or a 1,2-alkyldiol, are apt to undergo reduction of dispersion stability, which leads to instable ejection, because the dispersant is easily released from the pigment surface due to the strong shear force imposed when the ink is ejected through fine nozzles.

Such a phenomenon is not at all observed with the ink jet recording ink of the present invention. Since the (crosslinked) polymer layer encapsulates the pigment particles to exhibit satisfactory solvent resistance, the penetrant is prevented from accelerating separation of the polymer from the pigment particles or swelling the polymer. The ink of the invention therefore maintains excellent dispersion stability for a prolonged period of time.

Further, the conventional ink compositions containing a pigment dispersion prepared by dispersing pigment particles with a surface active agent or a polymeric dispersant and a penetrant generally tend to have an increased viscosity on account of the existence of a free dispersant which has failed to be adsorbed by the pigment particles in the very beginning of dispersion or which has separated from the particles later and is dissolved in the ink solvent. The amount of the pigment that is allowed to exist in inks is therefore limited of necessity. As a result, these conventional ink compositions often fail to provide images with sufficient density and satisfactory color developability particularly on plain paper or regenerated paper. The ink jet recording ink of the present invention enjoys low viscosities in the absence of the viscosity increase problem because the encapsulating (crosslinked) polymer layer hardly comes off the pigment particles. This allows the ink composition to contain an increased amount of a colorant, leading to obtaining sufficient image densities on plain paper or regenerated paper.

In the particularly preferred formulation of the ink jet recording ink described supra, the total amount of the acetylene glycol surface active agent and/or the acetylene alcohol surface active agent as component (2) is preferably 0.01 to 10% by weight, particularly 0.1 to 5% by weight, based on the total ink composition.

In the particularly preferred formulation of the ink jet recording ink described supra, diethylene glycol monobutyl ether and/or triethylene glycol monobutyl ether, which are added as component (3) (penetrant), are preferably added in an amount of 10% by weight or less, particularly from 0.5 to 5% by weight, based on the total ink composition. Addition of diethylene glycol monobutyl ether or triethylene glycol monobutyl ether produces remarkable effects on ink penetrability. Addition of diethylene glycol monobutyl ether and/or triethylene glycol monobutyl ether is effective in improving solubility of the acetylene glycol surface active agent and image quality.

In the particularly preferred formulation of the ink jet recording ink described supra, the 1,2-alkylene glycol having 4 to 10 carbon atoms as component (3) (penetrant) is preferably used in an amount of 15% by weight or less based on the total ink composition. 1,2-Alkylene glycols having 3 or fewer carbon atoms are not so effective, and 1,2-alkylene glycols having 15 or more carbon atoms hardly dissolve in water. Addition of more than 15% by weight of the 1,2-alkylene glycol tends to result in an increase of viscosity. The 1,2-alkylene glycol is preferably 1,2-pentanediol and/or 1,2-hexanediol. 1,2-Pentanediol is preferably added in an amount of 3 to 15% by weight. Less than 3% fails to secure satisfactory penetrability. 1,2-Hexanediol is preferably added in an amount of 0.5 to 10% by weight. Less than 0.5% fails to obtain satisfactory penetrability.

In order to improve reliability against clogging and to prevent generation of undesired white blanks in image areas, it is preferred for the ink jet recording ink of the invention to contain a solid wetting agent in amounts of 3 to 20% by weight based on the total ink composition.

The term "solid wetting agent" as used herein means a water-soluble substance which has a water-retaining function and is solid at ambient temperature (25° C.). Preferred solid wetting agents include saccharides, saccharide derivatives such as sugar alcohols, hyaluronic acid salts, trimethylolpropane, and 1,2,6-hexanetriol. The saccharides include monosaccharides, disaccharides, oligosaccharides (including trisaccharides and tetrasaccharides), and polysaccharides. Examples of the saccharides are glucose, mannose, fructose, ribose, xylose, arabinose, galactose, aldonic acids, glucitol (or sorbitol), maltose, cellobiose, lactose, sucrose, trehalose, and maltotriose. The term "polysaccharide" as used herein is intended to mean saccharide in its broad sense and to include substances widely occurring in nature such as alginic acid, α-cyclodextrin, and cellulose. The saccharide derivatives include reduced sugars, such as sugar alcohols represented by formula: $HOCH_2(CHOH)_nCH_2OH$, where n is an integer of 2 to 5), oxidized sugars, such as aldonic acids and uronic acids, amino acid, and thiosugars, with sugar alcohols being preferred. Examples of sugar alcohols are maltitol, sorbitol, and xylitol. The hyaluronic acid salt can be a commercially available 1% aqueous solution of sodium hyaluronate (molecular weight: 350,000). These solid wetting agents can be used either individually or as a mixture of two or more thereof.

Having a water retaining function, the solid wetting agent suppresses water evaporation to prevent a viscosity increase in the ink flow passageways or near the nozzles and film formation. As a result, the ink hardly clogs. The above-described solid wetting agents are chemically stable. They do not decompose in ink and retain the performance for a long time. Addition of the solid wetting agent does not make the ink wet the nozzle plate and therefore does not adversely affect the ejection stability.

The solid wetting agent or agents is/are preferably added in a total amount of 3 to 20% by weight, particularly 3 to 10% by weight, based on the total ink composition. Where two or more solid wetting agents are used in combination, it is preferred to combine at least one of saccharides, sugar alcohols, and hyaluronic acids and at least one of trimethylolpropane and 1,2,6-hexanetriol. These combinations are favorable for suppressing an increase of viscosity that may have resulted from addition of solid wetting agents. Addition of less than 3% of the solid wetting agent results in insubstantial effect on clogging prevention. Addition of more than 20% tends to result in too high a viscosity to assure stable ejection.

Since the microencapsulated pigment used as a colorant in the ink jet recording ink of the invention has a truly spherical shape as previously described, the ink easily exhibit Newtonian behavior. Further, it is considered that the hydrophilic groups on the encapsulated pigment particles are regularly and densely orientated to face the aqueous medium, which would result in effective electrostatic repulsive force. Therefore, the ink jet recording ink of the invention is superior in ejection stability, high dispersibility, and dispersion stability and is allowed to have an increased colorant content compared with the conventional microencapsulated pigment inks.

Ink jet recording using the ink of the present invention is conveniently carried out by loading a known ink jet printer with the ink of the invention and printing on plain paper or other ink jet recording media. Ink jet recording using the ink of the invention can be continued with high ink ejection stability and provides recorded images with excellent fastness and abrasion resistance, satisfactory color developability, high density, and less feathering. Even on plain paper, the ink hardly feathers and exhibits high color developability.

The present invention will now be illustrated in greater detail with reference to Examples and Comparative Examples, but it should be understood that the invention is not construed as being limited thereto. Unless otherwise noted, all the parts and percents are by weight. In Examples, the amounts of hydrophilic groups introduced on the surface of pigment particles were measured as follows.

Quantitative Determination of Introduced Hydrophilic (Anionic) Group Content:

(a) Hydrophilic Group Content Introduced by Sulfonating Agent

Pigment particles having been surface treated with a sulfonating agent by the oxygen flask combustion method. The combustion gas was absorbed by a 0.3% hydrogen peroxide aqueous solution. The sulfate ion ($SO_4^{-2}$) content of the solution was determined by ion chromatography (Model 2000i, supplied by Dionex Corp.), converted to a sulfonic acid group (—$SO_3H$) content, and expressed in terms of equivalent per gram of the pigment.

(b) Hydrophilic Group Content Introduced by Carboxylating Agent

A solution of diazomethane in an appropriate solvent was dropped into a hydrophilized pigment dispersion to convert all the active hydrogen to a methyl group, which was to be quantitatively determined by making use of the Zeisel method. Hydroiodic acid (specific gravity: 1.7) was added to the treated pigment, followed by heating to convert methyl groups into methyl iodide, which was vaporized. The methyl iodide vapor was trapped in a standard silver nitrate solution and precipitated as silver iodide. The amount of the methyl group, i.e., active hydrogen was calculated from the weight of the silver iodide and expressed in terms of molar quantity per gram of the pigment (mmol/g).

Preparation of Anionic-Hydrophilized Black Pigment Particles P1:

Fifteen parts of carbon black (MA-7, available from Mitsubishi Chemical Corp.) were dispersed in 200 parts of sulfolane in Eiger Motor Mill M250 (supplied by Eiger Japan) at a bead loading of 70% and an agitation speed of 5000 rpm for 1 hour. The pigment dispersion was transferred to an evaporator, where it was heated to 120° C. under a reduced pressure of 30 mmHg or lower to remove as much water present in the system as possible. The temperature was then kept at 150° C., and 25 parts of sulfur trioxide was added and allowed to react for 6 hours. After completion of the reaction, the reaction mixture was washed several times with excess sulfolane and poured into water. Filtration yielded anionic-hydrophilized black pigment particles P1.

The amount of the hydrophilic group (anionic group) introduced on the surface of the pigment particles was found to be $120 \times 10^{-6}$ eq./g-pigment (12 mmol/g).

Preparation of Anionic-Hydrophilized Black Pigment Particles P2:

Three hundred grams of acidic carbon black (MA-100, from Mitsubishi Chemical Corp.) were mixed well with 1000 ml of water, and. 450 g of sodium hypochlorite (effective chlorine concentration: 12%) was added thereto dropwise, followed by stirring at 80° C. for 15 hours. The resulting slurry was purified by repetition of washing with ion-exchanged water and filtration through filter paper (Toyo Roshi No. 2) until addition of a 0.1N silver nitrate aqueous solution to a filtrate no longer caused turbidity. The washed pigment slurry was re-dispersed in 2500 ml of water and desalted through a reverse osmosis membrane until the conductivity of the desalted product was decreased to 0.2 ms or lower. The dispersion was concentrated to give a pigment concentration of about 15%.

The hydrophilized pigment dispersion was treated with a hydrochloric acid aqueous solution, concentrated, dried, and pulverized to powder. The surface active hydrogen content of the hydrophilized pigment particles, as determined by the method described supra, was 2.8 mmol/g.

Preparation of Anionic-Hydrophilized Cyan Pigment Particles P3:

Twenty parts of phthalocyanine pigment (C.I. Pigment Blue 15:3) were dispersed in 500 parts of quinoline in Eiger Motor Mill M250 (from Eiger Japan) at a bead loading of 70% and an agitation speed of 5000 rpm for 2 hours. The pigment dispersion was transferred to an evaporator, where the mixture was heated to 120° C. under a reduced pressure of 30 mmHg or lower to remove as much water present in the system as possible. The temperature was maintained at 160° C., and 20 parts of a sulfonated pyridine complex was added and allowed to react for 8 hours. After completion of the reaction, the reaction mixture was washed several times with excess quinoline and poured into water. Filtration yielded anionic-hydrophilized cyan pigment particles P3.

The amount of the hydrophilic group (anionic group) introduced on the surface of the pigment particles was found to be $40 \times 10^{-6}$ eq./g-pigment (4 mmol/g).

Preparation of Anionic-Hydrophilized Yellow Pigment Particles P4:

Anionic-hydrophilized yellow pigment particles P4 were obtained in the same manner as for the hydrophilized cyan pigment particles P3, except for replacing the phthalocyanine pigment with the same amount of an isoindolinone pigment (C.I. Pigment Yellow 110).

The resulting yellow pigment particles P4 were found to have a hydrophilic (anionic) group content of $45 \times 10^{-6}$ eq./g-pigment (4.5 mmol/g).

Preparation of Anionic-Hydrophilized Magenta Pigment Particles P5:

Anionic-hydrophilized magenta pigment particles P5 were obtained in the same manner as for the hydrophilized cyan pigment particles P3, except for replacing the phthalocyanine pigment with the same amount of an isoindolinone pigment (C.I. Pigment Red 122).

The resulting yellow pigment particles P5 were found to have a hydrophilic (anionic) group content of $60 \times 10^{-6}$ eq./g-pigment (6 mmol/g).

Preparation of Microencapsulated Pigments MCP 1-1 to 1-8 and 1-13 to 1-15:

A mixture consisting of hydrophilized pigment particles, a polymerizable surface active agent, and an aqueous medium (optionally including glycerin or glycol) was prepared according to the formulation shown in Table 1 below. A polymerization initiator of the amount shown in Table 1 was added, and the mixture was allowed to react at 80° C. for 10 hours for encapsulation while applying ultrasonic waves from an ultrasonic generator. The resulting dispersion of the encapsulated pigments was adjusted to a pH of 7 to 9 with a potassium hydroxide aqueous solution. The dispersion was purified by filtration to remove coarse particles and by ultrafiltration to remove the unreacted polymerizable surface active agent and comonomer to obtain microencapsulated pigments MCP 1-1 to -8 and -13 to -15. The aspect ratio and the Zingg index of the microencapsulated pigments are shown in Table 1.

5 g of 2-sulfoethyl methacrylate, 10 g of styrene, 10 g of n-butyl methacrylate, 1.2 g of a polymerizable surface active agent Adeka Reasope SE-10N (from Asahi Denka Co., Ltd.), and 150 g of ion-exchanged water was slowly added dropwise from the dropping funnel to the reaction mixture. The reaction was continued for 24 hours under ultrasonication. The resulting dispersion of the encapsulated pigments was adjusted to a pH of 7 to 9 with a potassium hydroxide aqueous solution. The dispersion was filtered through a membrane filter of 1 μm to remove coarse particles and then subjected to ultrafiltration to remove the unreacted monomers and oligomers to obtain a dispersion of microencapsulated pigment MCP 2-1.

Preparation of Microencapsulated Pigment MCP 2-2 to 2-9:

Microencapsulated pigments MCP 2-2 to -9 were obtained in the same manner as for microencapsulated pigment MCP 2-1 according to the formulation given in Table 2 below. As described with respect to the preparation of microencapsulated pigment MCP 2-1, the amount of the cationic polymerization initiator to be added was decided based on the molecular amount of the anionic group content possessed by 100 g of the pigment particles P2 to P5 as follows.

TABLE 1

|  |  | MCP 1-1 | MCP 1-2 | MCP 1-3 | MCP 1-4 | MCP 1-5 | MCP 1-6 | MCP 1-7 | MCP 1-8 | MCP 1-13 | MCP 1-14 | MCP 1-15 |
|---|---|---|---|---|---|---|---|---|---|---|---|---|
| Hydrophilized Pigment (part) | P1 | 10 | 5 | — | — | — | — | — | — | — | — | — |
|  | P2 | 5 | 10 | — | — | — | — | — | — | — | — | — |
|  | P3 | — | — | 7 | 15 | — | — | — | — | 7 | — | — |
|  | P4 | — | — | — | — | 7 | — | 15 | — | — | 7 | — |
|  | P5 | — | — | — | — | — | 7 | — | 15 | — | — | 7 |
| Polymerizable Surface Active Agent (part) | Adeka Reasope SE-10N | 7.5 | — | 2 | — | 2 | — | — | 5 | — | — | — |
|  | Aqualon HS-1025 | — | 10 | — | 0.75 | — | 3.5 | 10.5 | 5 | — | — | — |
|  | Aqualon KH-10 | — | — | — | — | — | — | — | — | 3 | 3 | 3 |
| Comonomer (part) | Methylstyrene | 2.5 | — | — | — | 1 | 1 | — | 2 | — | — | — |
|  | 2-Ethylhexyl methacrylate | — | — | 1 | 0.5 | 1 | — | — | — | 1 | 1 | 1 |
|  | Benzyl methacrylate | — | — | — | — | — | — | — | — | 1 | 1 | 1 |
| Aqueous Medium (part) | Glycerin | 10 | — | — | — | — | 5 | 8 | — | — | — | — |
|  | Diethylene glycol | — | 15 | — | 10 | — | — | 5 | — | — | — | — |
|  | Ion-exchanged Water | 65 | 60 | 30 | 38.75 | 33 | 34.5 | 51.5 | 100 | 40 | 40 | 40 |
| Initiator (part) | Potassium persulfate | 0.5 | 0.5 | 0.5 | 0.2 | 0.3 | 0.3 | 0.5 | 0.5 | 0.5 | 0.5 | 0.5 |
|  | Aspect ratio | 1.0 | 1.0 | 1.0 | 1.0 | 1.0 | 1.0 | 1.0 | 1.0 | 1.0 | 1.0 | 1.0 |
|  | Zingg index | 1.0 | 1.0 | 1.0 | 1.0 | 1.0 | 1.0 | 1.0 | 1.0 | 1.0 | 1.0 | 1.0 |

Preparation of Microencapsulated Pigment MCP 2-1:

A hundred grams of anionic-hydrophilized black pigment particles P1 (anionic sulfonic acid group and anionic sulfinic acid group content: 12 mmol/g) were stirred in a solution of 50 g of glycerin in 250 g of ion-exchanged water in a stirring machine equipped with an ultrasonic generator for 2 minutes under ultrasonication. The resulting dispersion was poured into a reaction vessel equipped with an ultrasonic generator, a stirrer, a temperature controller, a reflux condenser, and a dropping funnel, and to the dispersion was added 1.63 g of a cationic polymerization initiator V-50 (from Wako Pure Chemical Industries, Ltd.; 10-hour half-life temperature: 56° C.; molecular weight: 411), which corresponded to 0.5 mol per mole of the anionic group content of the hydrophilized black pigment particles P1. The mixture was stirred at −10° to 0° C. under ultrasonication. Then, 10 g of a polymerizable surface active agent Adeka Reasope SE-10N (from Asahi Denka Co., Ltd.) was added, followed by stirring for 1 hour. While the inner temperature of the reaction vessel was heated up to 70° C., an emulsified monomer mixture that had separately been prepared by stirring 3 g of methacrylic acid, Microencapsulated Pigment MCP 2-2:

0.58 g of VA-060 (Wako Pure Chemical; 10-hour half-life temperature: 60° C.; molecular weight: 411) equivalent to 0.5 mol of the anionic group content of 100 g of pigment particles P2 was added.

Microencapsulated Pigment MCP 2-3:

0.70 g of VA-058 (Wako Pure Chemical; 10-hour half-life temperature: 58° C.; molecular weight: 351) equivalent to 0.5 mol of the anionic group content of 100 g of pigment particles P3 was added.

Microencapsulated pigment MCP 2-4:

0.75 g of VA-046B (Wako Pure Chemical; 10-hour half-life temperature: 47° C.; molecular weight: 250) equivalent to 0.5 mol of the anionic group content of 100 g of pigment particles P4 was added.

Microencapsulated Pigment MCP 2-5:

0.73 g of VA-044 (Wako Pure Chemical; 10-hour half-life temperature: 44° C.; molecular weight: 323) equivalent to 0.5 mol of the anionic group content of 100 g of pigment particles P5 was added.

Microencapsulated Pigment MCP 2-6:
1.48 g of VA-060 equivalent to 0.1 mol of the anionic group content of 100 g of pigment particles P1 was added.

Microencapsulated Pigment MCP 2-7:
0.1 g of VA-058 equivalent to 0.1 mol of the anionic group content of 100 g of pigment particles P3 was added.

Microencapsulated Pigment MCP 2-8:
0.15 g of VA-046B equivalent to 0.1 mol of the anionic group content of 100 g of pigment particles P4 was added.

Microencapsulated Pigment MCP 2-9:
0.73 g of VA-044 equivalent to 0.5 mol of the anionic group content of 100 g of pigment particles P5 was added.

The aspect ratio and Zingg index of the resulting microencapsulated pigment MCP 2-1 to -9 are shown in Table 2.

After the dropwise addition, the reaction was continued for 15 hours to obtain a solution of a vinyl polymer.

In a stainless steel beaker were charged 8 g of the polymer solution, 0.4 g of dimethylethanolamine, and 8 g of a black pigment (MA-100 from Mitsubishi Chemical Corp.), and ion-exchanged water was added to make 40 g. The mixture was kneaded in a sand mill together with 250 g of zirconia beads having an average particle size of 0.5 mm for 4 hours. The zirconia beads were separated by filtration to give an aqueous dispersion in which a dispersion of the base-neutralized carboxyl-containing polymer and the pigment was dispersed in water. The dispersion was put into a dispersing machine, and a 1N hydrochloric acid aqueous solution was added thereto while stirring at room temperature until the resin was insolubilized and adsorbed onto the

TABLE 2

| | | (unit of amount of component: g) | | | | | | | | |
|---|---|---|---|---|---|---|---|---|---|---|
| | | MCP 2-1 | MCP 2-2 | MCP 2-3 | MCP 2-4 | MCP 2-5 | MCP 2-6 | MCP 2-7 | MCP 2-8 | MCP 2-9 |
| Anionic-Hydrophilized Pigment | P1 (black) | 100 | | | | | 100 | | | |
| | P2 (black) | | 100 | | | | | 100 | | |
| | P3 (cyan) | | | 100 | | | | | 100 | |
| | P4 (yellow) | | | | 100 | | | | | 100 |
| | P5 (magenta) | | | | | 100 | | | | |
| Cationic Polymerization Initiator | V-50 | 1.63 | | | | | | | | |
| | VA-060 | | 0.58 | | | | 1.48 | | | |
| | VA-058 | | | 0.70 | | | | 0.10 | | |
| | VA-046B | | | | 0.75 | | | | 0.15 | |
| | VA-044 | | | | | 0.73 | | | | 0.73 |
| Hydrophilic Monomer | Methacrylic acid | 3 | 5 | | | 3 | | 5 | | |
| | 2-Sulfoethyl methacrylate | 5 | | 10 | 7 | | 5 | | 5 | |
| | 2-Acrylamido-2-methylpropanesulfonic acid | | 7 | 5 | | | | | 8 | 6 |
| | Vinylsulfonic acid | | | | 5 | | 5 | 5 | | |
| | 2-Hydroxyethyl methacrylate | | | 5 | | 10 | | | | |
| | Tetraethylene glycol monomethacrylate | | | | | 7 | | | | 4 |
| | N-vinylpyrrolidone | | | | | | | 2 | | 3 |
| Comonomer | Styrene | 10 | | 15 | | 10 | 10 | 5 | | |
| | Benzyl methacrylate | | 7 | | 20 | | | | 15 | 7 |
| | Phenoxyethyl methacrylate | | 7 | | | | | | 3 | 5 |
| | n-Butyl acrylate | 10 | | 10 | 5 | | | 5 | | |
| | 2-Ethylhexyl methacrylate | | 10 | | 10 | 10 | 10 | 3 | 10 | |
| | Butoxymethyl methacrylate | | | 10 | | 5 | 3 | | | 10 |
| Polymerizable surface active agent | Adeka Reasope SE-10N | 10 | | 5 | | 5 | | 5 | | 3 |
| | Aqualon HS-10 | | 10 | | 5 | | 5 | | 5 | 3 |
| Polymerizable surface active agent (for monomer emulsification) | Adeka Reasope SE-10N | 1.2 | | 1.1 | | 0.9 | | 0.5 | | 0.7 |
| | Aqualon HS-10 | | 0.72 | | 0.94 | | 0.66 | | 0.82 | |
| | Ion-exchanged water | 400 | 400 | 400 | 400 | 400 | 400 | 400 | 400 | 400 |
| | Glycerin | 50 | 50 | 50 | 50 | 50 | 50 | 50 | 50 | 50 |
| | Aspect ratio | 1.0 | 1.0 | 1.0 | 1.0 | 1.0 | 1.0 | 1.0 | 1.0 | 1.0 |
| | Zingg index | 1.0 | 1.0 | 1.0 | 1.0 | 1.0 | 1.0 | 1.0 | 1.0 | 1.0 |

Preparation of Microencapsulated Pigment MCP 1-9 to -12:

MCP 1-9 (microencapsulated black pigment), MCP 1-10 (microencapsulated cyan pigment), MCP 1-11 (microencapsulated magenta pigment), and MCP 1-12 (microencapsulated yellow pigment) were prepared in accordance with the process taught in JP-A-10-140065 as follows.

Preparation of MCP 1-9:

Into a flask was put 250 g of methyl ethyl ketone and heated up to 75° C. while stirring in a nitrogen stream. A mixture consisting of 85 g of n-butyl methacrylate, 90 g of n-butyl acrylate, 40 g of 2-hydroxyethyl methacrylate, 25 g of methacrylic acid, and 20 g of a polymerization initiator Perbutyl O (t-butyl peroxyoctoate available from NOF Corp.) was added thereto dropwise over a period of 2 hours.

pigment. The pH of the system was 3 to 5. The aqueous medium containing the polymer-adsorbed pigment was filtered by suction, and the filter cake was washed with water. A 10% sodium hydroxide aqueous solution was added to the wet cake while stirring in a disperser until the pH rose to 8.5 to 9.5. After stirring for an additional 1 hour period, ion-exchanged water was added to give a solids content of 20% to obtain microencapsulated black pigment MCP 1-9, which was found to have an aspect ratio of 1.4 and a Zingg index of 1.4.

Preparation of MCP 1-10:

Into a flask was put 250 g of methyl ethyl ketone and heated up to 75° C. while stirring in a nitrogen stream. A mixture consisting of 155 g of n-butyl methacrylate, 20 g of n-butyl acrylate, 35 g of 2-hydroxyethyl methacrylate, 40 g of methacrylic acid, and 5 g of a polymerization initiator Perbutyl O was added thereto dropwise over a period of 2 hours. After the dropwise addition, the reaction was continued for 15 hours to obtain a solution of a vinyl polymer.

Ten grams of the polymer solution, 7 g of a cyan pigment (C.I. Pigment Blue 15:3), 40 g of methyl ethyl ketone, and 150 g of ceramic beads having an average particle size of 0.5 mm were put into a stainless steel container of a bead mill and dispersed. The ceramic beads were separated by filtration to obtain a paste for microencapsulated pigment preparation.

Twenty grams of the resulting paste and 0.2 g of diethanolamine were mixed to make an organic solvent phase. While the organic solvent phase was stirred under ultrasonication, 25 g of ion-exchanged water was added thereto dropwise over 20 minutes to cause phase inversion of emulsion to obtain an aqueous dispersion of a microencapsulated pigment.

The resulting dispersion was distilled at 85° C. to remove the solvent to yield microencapsulated cyan pigment MCP 1-10, which was found to have an aspect ratio of 1.4 and a Zingg index of 1.4.

Preparation of MCP 1-11:

Into a flask was put 250 g of methyl ethyl ketone and heated up to 75° C. while stirring in a nitrogen stream. A mixture consisting of 70 g of n-butyl methacrylate, 58 g of n-butyl acrylate, 35 g of 2-hydroxyethyl methacrylate, 35 g of acrylic acid, and 20 g of a polymerization initiator Perbutyl O was added thereto dropwise over a period of 2 hours. After the dropwise addition, the reaction was continued for 15 hours to obtain a vinyl polymer solution.

In a stainless steel beaker were charged 15 g of the polymer solution, 0.8 g of dimethylethanolamine, and 15 g of a magenta pigment (C.I. Pigment Red 122), and ion-exchanged water was added to make 75 g. The mixture was kneaded in a sand mill together with 250 g of zirconia beads having an average particle size of 0.5 nm for 4 hours. The zirconia beads were separated by filtration to give an aqueous dispersion in which a dispersion of the base-neutralized carboxyl-containing polymer and the pigment was dispersed in water. A 1N hydrochloric acid aqueous solution was added to the dispersion while stirring at room temperature in a disperser until the resin was insolubilized and adsorbed onto the pigment. The pH of the system was 3 to 5. The aqueous medium containing the polymer-adsorbed pigment was filtered by suction, and the filter cake was washed with water to obtain a water-containing cake. A 10% sodium hydroxide aqueous solution was added to the wet cake while stirring in a disperser until the pH rose to 8.5 to 9.5. The stirring was continued for an additional 1 hour, and ion-exchanged water was added to give a solids content of 20% to obtain microencapsulated magenta pigment MCP 1-11, which was found to have an aspect ratio of 1.4 and a Zingg index of 1.4.

Preparation of MCP 1-12:

Into a flask was put 250 g of methyl ethyl ketone and heated up to 75° C. while stirring in a nitrogen stream. A mixture consisting of 170 g of n-butyl methacrylate, 5 g of n-butyl acrylate, 35 g of 2-hydroxyethyl methacrylate, 35 g of acrylic acid, and 20 g of a polymerization initiator Perbutyl O was added thereto dropwise over 2 hours. After the dropwise addition, the reaction was continued for an additional 15 hour period to obtain a vinyl polymer solution.

In a stainless steel beaker were charged 15 g of the polymer solution, 0.8 g of dimethylethanolamine, and 15 g of a yellow pigment (C.I. Pigment Yellow 110), and ion-exchanged water was added to make 75 g. The mixture was kneaded in a sand mill together with 250 g of zirconia beads having an average particle size of 0.5 mm for 4 hours. The zirconia beads were separated by filtration to give an aqueous dispersion in which a dispersion of the base-neutralized carboxyl-containing polymer and the pigment was dispersed in water. While the dispersion was stirred in a disperser at ambient temperature, a 1N hydrochloric acid aqueous solution was added thereto until the resin was insolubilized and adsorbed onto the pigment. The pH of the system was 3 to 5. The aqueous medium containing the polymer-adsorbed pigment was filtered by suction, and the filter cake was washed with water to obtain a water-containing cake. A 10% sodium hydroxide aqueous solution was added to the wet cake while stirring in a disperser until the pH rose to 8.5 to 9.5. The stirring was continued for an additional 1 hour, and ion-exchanged water was added to give a solids content of 20% to obtain microencapsulated yellow pigment MCP 1-12, which was found to have an aspect ratio of 1.4 and a Zingg index of 1.4.

<Preparation of Polymeric Azo Initiator>

(1) Preparation of Polymeric Azo Initiator 1:

Polymeric azo initiators for use in the invention were synthesized by the process disclosed in Example 1 of JP-A-12-53716. Specifically, 4,4'-Azobis(4-cyanopentanoic acid), α,ω-bis(polyoxyethylene)polydimethylsiloxane (number average molecular weight: 1400), and 4-dimethylaminopyridine were dissolved in acetonitrile, and dicyclohexylcarbodiimide was added thereto. The system was allowed to react at room temperature. The precipitated crystals were removed by filtration. The filtrate was concentrated to dryness to give a polymeric azo initiator having an organopolysiloxane moiety and a polyoxyalkylene moiety in its molecule (designated polymeric azo initiator 1).

(2) Preparation of Polymeric Azo Initiator 2:

4,4'-Azobis(4-cyanopentanoic acid), a polyethylene glycol-polypropylene glycol block copolymer represented by formula (11b):

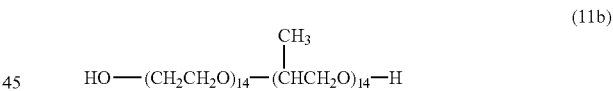

(11b)

and 4-dimethylaminopyridine were dissolved in acetonitrile, and dicyclohexylcarbodiimide was added thereto. The system was allowed to react at room temperature. The precipitated crystals were removed by filtration. The filtrate was concentrated to dryness to give a polymeric azo initiator having a polyethylene glycol moiety and a polypropylene glycol moiety in its molecule (designated polymeric azo initiator 2).

Preparation of Microencapsulated Pigments MCP 3-1 to -15:

(1) Preparation of Microencapsulated Pigment MCP 3-1:

A hundred grams of hydrophilized black pigment particles P1, 30 g of polymeric azo initiator 1, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent represented by formula (31a) (SE-10N, available from Asahi Denka Co., Ltd.), 15 g of 2-sulfoethyl methacrylate as a hydrophilic monomer, and 300 g of ion-exchanged water. After the mixture was stirred well, the monomers were copolymerized at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-1), which was found to have an aspect ratio of 1.0 and a Zingg index of 1.0.

(2) Preparation of Microencapsulated Pigment MCP 3-2:

A hundred grams of hydrophilized black pigment particles P1, 30 g of polymeric azo initiator 2, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent represented by formula (31a) (SE-10N, available from Asahi Denka Co., Ltd.), 10 g of sodium vinylsulfonate as a hydrophilic monomer, 5 g of diethylene glycol dimethacrylate as a crosslinking agent, and 300 g of ion-exchanged water. After the mixture was stirred well, the monomers were copolymerized at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-2), which was found to have an aspect ratio of 1.0 and a Zingg index of 1.0.

(3) Preparation of Microencapsulated Pigment MCP 3-3:

A hundred grams of hydrophilized black pigment particles P1, 30 g of polymeric azo initiator 1, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent represented by formula (31a) (SE-10N, available from Asahi Denka Co., Ltd.), 5 g of 2-acrylamido-2-methylpropanesulfonic acid as a hydrophilic monomer, 4.2 g of methacrylic acid as a hydrophilic monomer, 6.3 g of glycidyl methacrylate as a crosslinking agent, and 300 g of ion-exchanged water. After the mixture was stirred well, the monomers were copolymerized at 70° C. for 3 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-3), which was found to have an aspect ratio of 1.0 and a Zingg index of 1.0.

(4) Preparation of Microencapsulated Pigment MCP 3-4:

Pigment microencapsulation was carried out in the same manner as for microencapsulated pigment MCP 3-1, except for replacing hydrophilized black pigment P1 with hydrophilized black pigment P2. The resulting microencapsulated pigment dispersion was adjusted to pH 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-4), which was found to have an aspect ratio of 1.0 and a Zingg index of 1.0.

(5) Preparation of Microencapsulated Pigment MCP 3-5:

Pigment microencapsulation was carried out in the same manner as for microencapsulated pigment MCP 3-2, except for replacing hydrophilized black pigment P1 with hydrophilized black pigment P2. The resulting microencapsulated pigment dispersion was adjusted to pH 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-5), which was found to have an aspect ratio of 1.0 and a Zingg index of 1.0.

(6) Preparation of Microencapsulated Pigment MCP 3-6:

Pigment microencapsulation was carried out in the same manner as for microencapsulated pigment MCP 3-3, except for replacing hydrophilized black pigment P1 with hydrophilized black pigment P2. The resulting microencapsulated pigment dispersion was adjusted to pH 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-6), which was found to have an aspect ratio of 1.0 and a Zingg index of 1.0.

(7) Preparation of Microencapsulated Pigment MCP 3-7:

A hundred grams of hydrophilized cyan pigment particles P3, 30 g of polymeric azo initiator 1, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent (New Frontier N-177E, available from Daiichi Kogyo Yakuhin Co., Ltd.), 15 g 2-sulfoethyl methacrylate as a hydrophilic monomer, and 300 g of ion-exchanged water. After the mixture was stirred well, the monomers were copolymerized at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated cyan pigment (designated microencapsulated pigment MCP 3-7), which was found to have an aspect ratio of 1.0 and a Zingg index of 1.0.

(8) Preparation of Microencapsulated Pigment MCP 3-8:

A hundred grams of hydrophilized magenta pigment particles P5, 30 g of polymeric azo initiator 2, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent Aqualon HS-10 (available from Daiichi Kogyo Yakuhin Co., Ltd.), 10 g sodium vinylsulfonate as a hydrophilic monomer, 5 g of 1,6-hexanediol diacrylate as a crosslinking agent, and 300 g of ion-exchanged water. After the mixture was stirred well, the monomers were copolymerized at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated magenta pigment (designated microencapsulated pigment MCP 3-8), which was found to have an aspect ratio of 1.0 and a Zingg index of 1.0.

(9) Preparation of Microencapsulated Pigment MCP 3-9:

A hundred grams of hydrophilized yellow pigment particles P4, 30 g of polymeric azo initiator 1, and 500 g of ion-exchanged water were put into a reaction vessel equipped with an ultrasonic generator, a stirrer, a temperature controller, a reflux condenser, and a dropping funnel. The mixture was stirred under ultrasonication. To the mixture were added 15 g of a polymerizable surface active agent represented by formula (31a) (SE-10N, available from Daiichi Kogyo Yakuhin Co., Ltd.), 5 g of N-vinyl-2-pyrrolidine as a hydrophilic monomer, 4.2 g of methacrylic acid as a hydrophilic monomer, 6.3 g of glycidyl methacrylate as a crosslinking agent, and 300 g of ion-exchanged water. After the mixture was stirred well, the monomers were copolymerized at 70° C. for 3 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated yellow pigment (designated microencapsulated pigment MCP 3-9), which was found to have an aspect ratio of 1.0 and a Zingg index of 1.0.

(10) Preparation of Microencapsulated Pigment MCP 3-10:

A hundred grams of carbon black (Raven C, available from Columbian Carbon) and 30 g of polymeric azo initiator 1 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel, followed by stirring and ultrasonication. To the dispersion were added 15 g of a polymerizable surface active agent of formula (31a) (SE-10N, from Asahi Denka Co., Ltd.), 15 g of 2-sulfoethyl methacrylate as a hydrophilic monomer, and 300 g of ion-exchanged water, followed by stirring well. The reaction system was allowed to polymerize at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated carbon black pigment (designated microencapsulated pigment MCP 3-10), which was found to have an aspect ratio of 1.0 and a Zingg index of 1.0.

(11) Preparation of Microencapsulated Pigment MCP 3-11:

A hundred grams of carbon black (Raven C, available from Columbian Carbon) and 30 g of polymeric azo initiator 2 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel and stirred under ultrasonication. To the dispersion were added 15 g of a polymerizable surface active agent of formula (31a) (SE-10N, from Asahi Denka Co., Ltd.), 10 g of sodium vinylsulfonate as a hydrophilic monomer, 5 g of diethylene glycol dimethacrylate as a crosslinking agent, and 300 g of ion-exchanged water, followed by stirring well. The reaction system was allowed to polymerize at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-11), which was found to have an aspect ratio of 1.0 and a Zingg index of 1.0.

(12) Preparation of Microencapsulated Pigment MCP 3-12:

A hundred grams of carbon black (Raven C, available from Columbian Carbon) and 30 g of polymeric azo initiator 1 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel and stirred under ultrasonication. To the dispersion were added 15 g of a polymerizable surface active agent of formula (31a) (SE-10N, from Asahi Denka Co., Ltd.), 5 g of 2-acrylamido-2-methylpropanesulfonic acid as a hydrophilic monomer, 4.2 g of methacrylic acid as a hydrophilic monomer, 6.3 g of glycidyl methacrylate as a crosslinking agent, and 300 g of ion-exchanged water, followed by stirring well. The reaction system was allowed to polymerize at 70° C. for 3 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated black pigment (designated microencapsulated pigment MCP 3-12), which was found to have an aspect ratio of 1.0 and a Zingg index of 1.0.

(13) Preparation of Microencapsulated Pigment MCP 3-13:

A hundred grams of C.I. Pigment Blue 15 (Fastgen Blue TGR, available from Dainippon Ink & Chemicals, Inc.): and 30 g of polymeric azo initiator 1 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel and stirred under ultrasonication. To the dispersion were added 15 g of a polymerizable surface active agent New Frontier N-177E (from Daiichi Kogyo Yakuhin Co., Ltd.), 15 g of 2-sulfoethyl methacrylate as a hydrophilic monomer, and 300 g of ion-exchanged water, followed by stirring well. The reaction system was allowed to polymerize at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated cyan pigment (designated microencapsulated pigment MCP 3-13), which was found to have an aspect ratio of 1.0 and a Zingg index of 1.0.

(14) Preparation of Microencapsulated Pigment MCP 3-14:

A hundred grams of C.I. Pigment Red 122 (Fastgen Super Magenta RTS, available from Dainippon Ink & Chemicals Inc.) and 30 g of polymeric azo initiator 2 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel and stirred under ultrasonication. To the dispersion were added 15 g of a polymerizable surface active agent Aqualon HS-10 (from Daiichi Kogyo Yakuhin Co., Ltd.), 10 g of sodium vinylsulfonate as a hydrophilic monomer, 5 g of 1,6-hexanediol diacrylate as a crosslinking agent, and 300 g of ion-exchanged water, followed by stirring well. The reaction system was allowed to polymerize at 70° C. for 2 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated magenta pigment (designated microencapsulated pigment MCP 3-14), which was found to have an aspect ratio of 1.0 and a Zingg index of 1.0.

(15) Preparation of Microencapsulated Pigment MCP 3-15:

A hundred grams of C.I. Pigment Yellow 17 (Fastgen (Symuler Fast Yellow 8GF, available from Dainippon Ink & Chemicals Inc.) and 30 g of polymeric azo initiator 1 were dispersed in 500 g of ion-exchanged water in Eiger Motor Mill M250 (from Eiger Japan) at a bead loading of 70% and an agitation speed of 5000 rpm for 1 hour while cooling with cooling water. The resulting dispersion was put into a reaction vessel equipped with an ultrasonic generator, a stirrer, a temperature controller, a reflux condenser, and a dropping funnel and stirred under ultrasonication. To the dispersion were added 15 g of a polymerizable surface active agent represented by formula (31a) (SE-10N, available from Asahi Denka Co., Ltd.), 5 g of N-vinyl-2-pyrrolidone as a hydrophilic monomer, 4.2 g of methacrylic acid as a hydrophilic monomer, 6.3 g of glycidyl methacrylate as a crosslinking agent, and 300 g of ion-exchanged water, followed by stirring well. The reaction system was allowed to polymerize at 70° C. for 3 hours while stirring and ultrasonicating. The resulting microencapsulated pigment dispersion was adjusted to a pH of 7 to 9 with a potassium hydroxide aqueous solution. The dispersion was filtered through a 1 μm membrane filter to remove coarse particles to obtain a dispersion of microencapsulated yellow pigment (designated microencapsulated pigment MCP 3-15), which was found to have an aspect ratio of 1.0 and a Zingg index of 1.0.

It is seen that the microencapsulated pigments of the present invention (MCP 1-1 to -8, -13 to -15, MCP 2-1 to -9, and MCP 3-1 to -9) had an aspect ratio of 1.0 and a Zingg index of 1.0, i.e., a truly spherical shape, whereas the comparative microencapsulated pigments (MCP 1-9 to -12) had an aspect ratio greater than 1.3 and a Zingg index of 1.3 or greater, i.e., a non-truly spherical shape. The aspect ratio and the Zingg index were obtained from the major and minor diameters and the thickness of dispersed particles (the aqueous dispersion was 100-fold diluted with ion-exchanged water and dried) as observed under a transmission electron microscope and a scanning electron microscope.

Preparation of Ink Jet Recording Ink:

EXAMPLES 1-1 TO 1-11 AND 2-1 TO 2-13

Ink jet recording inks were prepared according to the formulations shown in Tables 3 and 4 below.

TABLE 3

(unit: wt %)

| | | Example | | | | | | | | | | |
|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 |
| Micro- | MCP 1-1 | 8 | | | | | | | | | | |
| encapsulated | MCP 1-2 | | 6 | | | | | | | | | |
| Pigment | MCP 1-3 | | | 4 | | | | | | | | |
| | MCP 1-4 | | | | 6 | | | | | | | |
| | MCP 1-5 | | | | | 10 | | | | | | |
| | MCP 1-6 | | | | | | 8 | | | | | |
| | MCP 1-7 | | | | | | | 6 | | | | |
| | MCP 1-8 | | | | | | | | 8 | | | |
| | MCP 1-13 | | | | | | | | | 8 | | |
| | MCP 1-14 | | | | | | | | | | 8 | |
| | MCP 1-15 | | | | | | | | | | | 8 |
| Wetting Agent | Glycerin | 15 | 12 | 15 | 15 | 12 | 10 | 10 | 10 | 12 | 12 | 12 |
| | Diethylene glycol | | | | | | 5 | 2 | 5 | | | |
| Penetrant | Diethylene glycol monobutyl ether | 5 | 5 | | | 3 | 3 | 5 | | 3 | 3 | 3 |
| | 1,2-Hexanediol | | | 6 | 6 | 3 | 3 | | 5 | 3 | 3 | 3 |
| Surfactant | Surfynol 465 | 1 | 0.5 | 1 | 0.5 | 1 | 0.5 | 1 | 1 | 1 | 1 | 1 |
| | Polyoxyethylene nonylphenyl ether | | | | | 0.5 | 1 | 0.5 | 0.5 | | | |
| pH Adjuster | Potassium hydroxide | | | | 0.2 | 0.2 | 0.1 | | | 0.1 | 0.1 | 0.1 |
| | Propanolamine | 3 | 3 | 3 | | | | 2 | 2 | | | |
| Antiseptic | Proxel XL | 0.05 | 0.05 | 0.05 | | | 0.05 | | | 0.05 | 0.05 | 0.05 |
| | 4,4-Dimethyloxazolidine | | | | 1 | 1 | | 1 | 1 | | | |
| Solid wetting | Trimethylolpropane | | | | | | | | | | 8 | 10 |
| agent | 1,2,6-Hexanetriol | | | | | | | | | 3 | | |
| Water | Ion-exchanged water | bal. | bal. | bal. | bal. | bal. | bal. | bal. | bal. | bal. | bal. | bal. |

TABLE 4

(unit: wt %)

| | | Example | | | | | | | | | | | | |
|---|---|---|---|---|---|---|---|---|---|---|---|---|---|
| | | 2-1 | 2-2 | 2-3 | 2-4 | 2-5 | 2-6 | 2-7 | 2-8 | 2-9 | 2-10 | 2-11 | 2-12 | 2-13 |
| Micro-encapsulated pigment | MCP 2-1 (black) | 8 | 8 | | | | | | | | | | | |
| | MCP 2-2 (black) | | | 6 | | | | | | | | | | |
| | MCP 2-3 (cyan) | | | | 6 | | | | | | | | | |
| | MCP 2-4 (yellow) | | | | | 6 | | | | | | | | |
| | MCP 2-5 (magenta) | | | | | | 10 | | | | | | | |
| | MCP 2-6 (black) | | | | | | | 8 | | | | | | |
| | MCP 2-7 (cyan) | | | | | | | | 6 | | | 8 | | |
| | MCP 2-8 (yellow) | | | | | | | | | 8 | | | 8 | |
| | MCP 2-9 (magenta) | | | | | | | | | | 8 | | | 8 |
| Glycerin | | 15 | 15 | 12 | 15 | 15 | 12 | 13 | 12 | 15 | 15 | 15 | 15 | 15 |
| Diethylene glycol | | | | | | | | 5 | 2 | 5 | 5 | | | |
| Trimethylolpropane | | | | | 3 | | | 3 | | | | 8 | 10 | |
| Diethylene glycol monobutyl ether | | | | 3 | | | 3 | | | | 3 | | | |
| Triethylene glycol monobutyl ether | | | 3 | | | 5 | | 5 | 5 | | | 3 | 3 | 3 |
| 1,2-Hexanediol | | 5 | 5 | | 5 | | 5 | | | 5 | 3 | 4 | 4 | 4 |
| 1,2-Pentanediol | | | | 3 | | 2 | | 3 | | 2 | 4 | | | |
| 1,3-Dimethyl-2-imidazolidinone | | | 4 | | | | | | 5 | | | | | |
| 2-Pyrrolidone | | 6 | | 4 | 2 | | 3 | 3 | | 4 | | 2 | 2 | 2 |
| Maltitol | | | | 3 | | 3 | | | | 3 | 3 | | | |
| Xylitol | | | 5 | 2 | | | 3 | 2 | 5 | 1 | 1 | | | |
| Sorbitol | | | | | 3 | 3 | 2 | | | 1 | 2 | | | |
| Surfynol 465 | | 1 | | 1 | 1 | 1 | 1 | | 1 | | 3 | | | |
| Olfine E1010 | | | 1 | | | | | 1 | | 1 | 1 | 1 | 1 | 1 |
| 1,2,6-Hexantriol | | | | | | | | | | | | 3 | 3 | 3 |
| Potassium hydroxide | | | 0.1 | | | 0.2 | 0.2 | 0.1 | | 0.1 | 0.2 | 0.1 | 0.1 | 0.1 |
| Triethanolamine | | 3 | 2 | 3 | 3 | | | 2 | 2 | 2 | | | | |
| Proxel XL-2 | | 0.05 | 0.05 | 0.05 | 0.05 | 0.05 | 0.05 | 0.05 | 0.05 | 0.05 | 0.05 | 0.05 | 0.05 | 0.05 |
| Ion-exchanged water | | bal. | bal. | bal. | bal. | bal. | bal. | bal. | bal. | bal. | bal. | bal. | bal. | bal. |

EXAMPLE 3-1

A mixture consisting of 8 g (solid basis) of microencapsulated pigment MCP 3-1, 12 g of glycerin, 5 g of 1,2-hexanediol, 0.3 g of an acetylene glycol surface active agent Surfynol 104, and 0.7 g of an acetylene glycol surface active agent Surfynol 485 was mixed with ion-exchanged water to make 100 g. The mixture was adjusted to a pH of 7.5 by addition of triethanolamine.

The mixture was stirred for 2 hours and filtered through a stainless steel filter having a pore size of about 5 μm to prepare an ink jet printing ink.

EXAMPLES 3-2 TO 3-10

Ink jet printing inks were prepared in the same manner as in Example 3-1 according to the formulations given in Table 5 below.

TABLE 5

(unit: wt %)

| | | Example | | | | | | | | | |
|---|---|---|---|---|---|---|---|---|---|---|---|
| | | 3-1 | 3-2 | 3-3 | 3-4 | 3-5 | 3-6 | 3-7 | 3-8 | 3-9 | 3-10 |
| Micro-encapsulated pigment | MCP 3-1 | 8 | | | | | | | | | 8 |
| | MCP 3-2 | | 8 | | | | | | | | |
| | MCP 3-3 | | | 8 | | | | | | | |
| | MCP 3-4 | | | | 8 | | | | | | |
| | MCP 3-5 | | | | | 8 | | | | | |
| | MCP 3-6 | | | | | | 8 | | | | |
| | MCP 3-7 | | | | | | | 8 | | | |
| | MCP 3-8 | | | | | | | | 8 | | |
| | MCP 3-9 | | | | | | | | | 8 | |
| Glycerin | | 12 | 10 | 10 | 12 | 10 | 10 | 10 | 10 | 10 | 12 |
| 1,2-Hexanediol | | 5 | 5 | 3 | 5 | 5 | 3 | 5 | 5 | 3 | 5 |
| Diethylene glycol monobutyl ether | | | | 5 | | | 5 | | | 5 | |
| Triethylene glycol monobutyl ether | | | 5 | | | 5 | | 5 | 5 | | 3 |
| 2-Pyrrolidone | | | | 2 | | | 2 | | | 2 | 2 |
| Surfynol 104 | | 0.3 | | | 0.3 | | | | | | |
| Surfynol 485 | | 0.7 | | | 0.7 | | | | | | |
| Surfynol 465 | | | 1 | | | 1 | | 1 | 1 | | 1 |
| Olefine E1010 | | | | 1 | | | 1 | | | | 1 |
| Trimethylolpropane | | | | | | | | | | | 10 |
| Triethanolamine | | 0.4 | 0.4 | | 0.4 | 0.4 | | | | | |

TABLE 5-continued (unit: wt %)

| | Example | | | | | | | | | |
|---|---|---|---|---|---|---|---|---|---|---|
| | 3-1 | 3-2 | 3-3 | 3-4 | 3-5 | 3-6 | 3-7 | 3-8 | 3-9 | 3-10 |
| KOH | | | 0.1 | | | 0.1 | 0.1 | 0.1 | 0.1 | 0.1 |
| Ion-exchanged water | bal. | bal. | bal. | bal. | bal. | bal. | bal. | bal. | bal. | bal. |

COMPARATIVE EXAMPLES 1-1 TO 1-13 AND 2-1 TO 2-13

Ink jet printing inks were prepared in accordance with the formulations shown in Tables 6 to 9.

TABLE 6

(unit: wt %)

| | | Comparative Example | | | | | | | |
|---|---|---|---|---|---|---|---|---|---|
| | | 1-1 | 1-2 | 1-3 | 1-4 | 1-5 | 1-6 | 1-7 | 1-8 |
| Micro-encapsulated pigment | MCP 1-9 | 4 | | | | 8 | | | |
| | MCP 1-10 | | 2 | | | | 4 | | |
| | MCP 1-11 | | | 2 | | | | 8 | |
| | MCP 1-12 | | | | 2 | | | | 6 |
| Wetting agent | Glycerin | 15 | 15 | 12 | 12 | 15 | 10 | 10 | 15 |
| | Diethylene glycol | | | | | | 5 | 5 | |
| Penetrant | Diethylene glycol monobutyl ether | 6 | 6 | | | 7.5 | | 6 | |
| | 1,2-Hexanediol | | | 6 | 6 | | 7.5 | | 6 |
| Surface active agent | Surfynol 465 | 1 | 0.5 | 1 | 0.5 | 1 | 1 | 1 | 1 |
| | Polyoxyethylene nonylphenyl ether | | | | | | 0.5 | 0.5 | |
| pH Adjuster | Potassium hydroxide | | | | | | | | 0.1 |
| | Propanolamine | 2 | 3 | 3 | 3 | 3 | 3 | 3 | |
| Antiseptic | Proxel XL | 0.05 | 0.05 | | | 0.05 | | 0.05 | |
| | 4,4-Dimethyloxazolidine | | | 1 | 1 | | 1 | | 1 |
| Water | Ion-exchanged water | bal. | bal. | bal. | bal. | bal. | bal. | bal. | bal. |

TABLE 7

(unit: wt %)

| | | Comparative Example | | | | |
|---|---|---|---|---|---|---|
| | | 1-9 | 1-10 | 1-11 | 1-12 | 1-13 |
| Pigment | P1 | 8 | | | | |
| | P2 | | 4 | | | |
| | P3 | | | 6 | | |
| | P4 | | | | 10 | |
| | P5 | | | | | 8 |
| Wetting agent | Glycerin | 15 | 10 | 10 | 12 | 15 |
| | Diethylene glycol | | 2 | 2 | | |
| Penetrant | Diethylene glycol monobutyl ether | 6 | 3 | | 7.5 | |
| | 1,2-Hexanediol | | 3 | 6 | | 7.5 |
| Surface active agent | Surfynol 465 | 1 | 1 | 1 | 1 | 1 |
| | Polyoxyethylene nonylphenyl ether | | | 0.5 | 0.5 | |
| pH Adjuster | Potassium hydroxide | 0.5 | 0.5 | | | |
| | Propanolamine | | | 1 | 1 | 1 |
| Antiseptic | Proxel XL | 0.05 | 0.05 | | | 0.05 |
| | 4,4-Dimethyloxazolidine | | | 1 | 1 | |
| Water | Ion-exchange water | bal. | bal. | bal. | bal. | bal. |

TABLE 8

(unit: wt %)

|  |  | Comparative Example | | | | |
|---|---|---|---|---|---|---|
|  |  | 2-1 | 2-2 | 2-3 | 2-4 | 2-5 |
| Pigment | Carbon black | 8 | 8 | | | |
|  | C.I. Pigment Red 122 | | | 6 | | |
|  | C.I. Pigment Blue 15:3 | | | | 6 | |
|  | C.I. Pigment Yellow 185 | | | | | 6 |
| Styrene-acrylic acid copolymer ammonium salt (mol. wt.: 7000; polymer component: 38%) | | 1 | 1 | 1 | 1 | 1 |
| Glycerin | | 15 | 10 | 10 | 15 | 10 |
| Diethylene glycolk | | 10 | 8 | 8 | 10 | 8 |
| 1,2-Hexanediol | | | | | | 5 |
| 2-Pyrrolidone | | | 2 | 2 | | 2 |
| Olfine E1010 | | | 1 | 1 | | |
| Potassium hydroxide | | 0.1 | 0.1 | 0.1 | 0.1 | 0.1 |
| Proxel XL-2 | | 0.05 | 0.05 | 0.05 | 0.05 | 0.05 |
| Ion-exchanged water | | bal. | bal. | bal. | bal. | bal. |

TABLE 9

(unit: wt %)

|  |  | Comparative Example | | | | | | | |
|---|---|---|---|---|---|---|---|---|---|
|  |  | 2-6 | 2-7 | 2-8 | 2-9 | 2-10 | 2-11 | 2-12 | 2-13 |
| Microencapsulated Pigment | MCP 1-9 (black) | 4 | | | | 8 | | | |
|  | MCP 1-10 (cyan) | | 3 | | | | 8 | | |
|  | MCP 1-11 (magenta) | | | 3 | | | | 8 | |
|  | MCP 1-12 (yellow) | | | | 3 | | | | 8 |
| Glycerin | | 15 | 15 | 15 | 15 | 15 | 10 | 10 | 15 |
| Diethylene glycol | | | | | | | 5 | 5 | |
| Trimethylolpropane | | | | | | | 6 | 6 | 6 |
| Diethylene glycol monobutyl ether | | | | | | 8 | | | |
| 1,3-Dimethyl-2-imidazolidinone | | | | 2 | 2 | | | | |
| 2-Pyrrolidone | | 2 | 2 | | | | | | |
| Surfynol 465 | | 1 | 1 | 1 | 1 | 1 | 1 | 1 | 1 |
| Potassium hydroxide | | 0.1 | 0.1 | 0.1 | 0.1 | 0.1 | 0.1 | 0.1 | 0.1 |
| Proxel XL-2 | | 0.05 | 0.05 | 0.05 | 0.05 | 0.05 | 0.05 | 0.05 | 0.05 |
| Ion-exchanged water | | bal. | bal. | bal. | bal. | bal. | bal. | bal. | bal. |

COMPARATIVE EXAMPLES 3-1 TO 3-12

Ink jet recording inks were prepared in the same manner as in Example 3-1 according to the formulations given in Tables 10 and 11 below.

COMPARATIVE EXAMPLE 3-13

A hundred grams of carbon black (Raven C, from Columbian Carbon), 70 g of a dispersant Joncryl J-62 (from Johnson Polymer), 40 g of a 10% sodium hydroxide aqueous solution, and 150 g of water were mixed and dispersed in a ball mill together with zirconia beads for 10 hours. The resulting dispersion was filtered through a stainless steel filter having a pore size of about 5 μm. The filtrate was diluted with water to a pigment concentration of 20% to prepare a carbon black dispersion. Thirty grams of the pigment dispersion, 10 g of glycerin, 5 g of 2-pyrrolidone, and 4 g of ethanol were mixed, and ion-exchanged water was added to make 100 g. The mixture was stirred for 2 hours and filtered through a stainless steel filter having a pore size of about 5 μm to prepare an ink jet recording ink.

COMPARATIVE EXAMPLE 3-14

Thirty grams of the pigment dispersion prepared in Comparative Example 3-1, 10 g of glycerin, and 7 g of triethylene glycol monobutyl ether were mixed and adjusted to pH 7.5 with triethanolamine. The mixture was stirred for 2 hours and filtered through a stainless steel filter having a pore size of about 5 μm to prepare an ink jet recording ink.

TABLE 10

|  |  | Comparative Example | | | | | |
|---|---|---|---|---|---|---|---|
|  |  | 3-1 | 3-2 | 3-3 | 3-4 | 3-5 | 3-6 |
| Microencapsulated pigment | MCP 3-10 | 8 | | | | | |
|  | MCP 3-11 | | 8 | | | | |
|  | MCP 3-12 | | | 8 | | | |
|  | MCP 3-13 | | | | 8 | | |
|  | MCP 3-14 | | | | | 8 | |
|  | MCP 3-15 | | | | | | 8 |
| Glycerin | | 12 | 10 | 10 | 10 | 10 | 10 |
| 1,2-Hexanediol | | 5 | 5 | 3 | 5 | 5 | 3 |
| Diethylene glycol monobutyl ether | | | | 5 | | | 5 |

TABLE 10-continued

| | Comparative Example | | | | | |
|---|---|---|---|---|---|---|
| | 3-1 | 3-2 | 3-3 | 3-4 | 3-5 | 3-6 |
| Triethylene glycol monobutyl ether | | 5 | | 5 | 5 | |
| 2-Pyrrolidone | | | 2 | | | 2 |
| Surfynol 104 | 0.3 | | | | | |
| Surfynol 485 | 0.7 | | | | | |
| Surfynol 465 | | 1 | | 1 | 1 | 1 |
| Olfine E1010 | | | 1 | | | |
| Triethanolamine | 0.4 | 0.4 | | | | |
| Potassium hydroxide | | | 0.1 | 0.1 | 0.1 | 0.1 |
| Ion-exchanged water | bal. | bal. | bal. | bal. | bal. | bal. |

TABLE 11

| | | Comparative Example | | | | | |
|---|---|---|---|---|---|---|---|
| | | 3-7 | 3-8 | 3-9 | 3-10 | 3-11 | 3-12 |
| Microencapsulated pigment | MCP 3-10 | 4 | | | | | |
| | MCP 3-11 | | 4 | | | | |
| | MCP 3-12 | | | 4 | | | |
| | MCP 3-13 | | | | 4 | | |
| | MCP 3-14 | | | | | 4 | |
| | MCP 3-15 | | | | | | 4 |
| Glycerin | | 12 | 10 | 10 | 10 | 10 | 10 |
| 1,2-Hexanediol | | 5 | 5 | 3 | 5 | 5 | 3 |
| Diethylene glycol monobutyl ether | | | | 5 | | | 5 |
| Triethylene glycol monobutyl ether | | | 5 | | 5 | 5 | |
| 2-Pyrrolidone | | | | 2 | | | 2 |
| Surfynol 104 | | 0.3 | | | | | |
| Surfynol 485 | | 0.7 | | | | | |
| Surfynol 465 | | | 1 | | 1 | 1 | 1 |
| Olefine E1010 | | | | 1 | | | |
| Triethanolamine | | 0.4 | 0.4 | | | | |
| Potassium hydroxide | | | | 0.1 | 0.1 | 0.1 | 0.1 |
| Ion-exchanged water | | bal. | bal. | bal. | bal. | bal. | bal. |

The ink jet recording inks of Examples and Comparative Examples and images printed with these inks were evaluated according to the following methods. The results obtained are shown in Tables 12 to 17.

1-1) Dispersibility-1

An ink sample was set in a rheometer (Physica MCR300, supplied by Paar Physica), and the storage modulus (Pa) was measured using a corn/plate measuring system CP 75-1 (Paar Physica) having a radius of 37.5 mm and an angle of measuring corn of 1°. The gap was set at 0.05 mm. Measurement was taken at 20° C. at an angular speed varying from 0.5 to 5 rad/sec. The storage moduli at 0.6 rad/sec ($G'_{\omega=0.6}$) and 0.8 rad/sec ($G'_{\omega=0.8}$) were recorded. The ink dispersibility was rated A to D according to the following standard.

A: (log $G'_{\omega=0.8}$ − log $G'_{\omega=0.6}$)/(log 0.8 − log 0.6) = 1.8 to 2.0
B: (log $G'_{\omega=0.8}$ − log $G'_{\omega=0.6}$)/(log 0.8 − log 0.6) = 1.6 to 1.8
C: (log $G'_{\omega=0.8}$ − log $G'_{\omega=0.6}$)/(log 0.8 − log 0.6) = 1.2 to 1.6
D: (log $G'_{\omega=0.8}$ − log $G'_{\omega=0.6}$)/(log 0.8 − log 0.6) < 1.2

1-2) Dispersibility-2

The viscosity of an ink sample was measured with a rolling ball viscometer AMVn (Anton Paar) at 20° C. using a steel ball having a diameter of 0.794 mm and a density of 7.850 g/cm$^3$ and a capillary having an inner diameter of 0.9 mm inclined at an angle of 70°, 60°, 50°, 40°, and 30°. The sin θ was plotted as abscissa and the viscosity as ordinate. The dispersibility of the ink was evaluated from the slope of the resulting sin θ-viscosity curve and rated as follows.

A: The slope is 0 to −0.05, indicating Newtonian flow behavior and excellent dispersibility of the sample.
B: The slope is −0.05 to −0.1, indicating nearly Newtonian flow behavior and good dispersibility of the sample.
C: The slope is −0.1 to −0.15, indicating non-Newtonian flow behavior but slightly good dispersibility of the sample.
D: The slope is smaller than −0.15, indicating non-Newtonian flow behavior. The sample fluid easily settles due to poor dispersibility.

2) Dispersion Stability

An ink sample was put into a glass bottle, sealed, and allowed to stand at 60° C. for 2 weeks. The viscosity of the sample before and after the standing was measured with Physica MCR 300 (Paar Physica) using a corn/plate measuring system CP 75-1 (Paar Physica) having a radius of 37.50 mm and an angle of measuring corn of 1°. The gap was set at 0.05 mm. Measurement was taken at 20° C. at a shear rate of 150 s$^{-1}$. The dispersion stability was evaluated from the change in viscosity and rated as follows.

A: The change is smaller than ±0.1 mPa·s.
B: The change is ±0.1 mPa·s or greater and smaller than ±0.3 mPa·s.
C: The change is ±0.3 mPa·s or greater.

3) Non-Settling Properties

Non-settling properties of the colorant in an ink were evaluated from the back scattered and transmitted light intensity distributions in the height direction of a sample as measured at 20° C. with Turbiscan 2000, supplied by Formulaction. Turbiscan 2000 comprises a reading head that vertically moves along a cylindrical cell to scan the sample length, the reading head having a transmission detector which monitors light transmitted through the sample and a backscattering detector which receives light backscattered by the sample. The reading head acquires transmission and backscattering date every 40 μm along the sample height. The acquisition scan is then repeated over and over at an arbitrary frequency so that any movement of particles or change in particle diameter can be observed on the transmission and backscattering data. The non-settling properties of the sample were ranked A or B based on the following standard.

A: No settling occurs for more than 2 weeks.
B: Settling occurs after 2 weeks.

4) Image Density

Plain paper Xerox P (from Xerox Corp.) was printed solid on an inkjet printer PM-720C (supplied by Seiko Epson Corp.) loaded with an ink cartridge filled with each of the inks prepared in Examples and Comparative Examples. The optical density (OD) of the solid printed area was measured with a spectrophotometer Gretag SPM-50 (supplied by GretagMacbeth GmbH) and rated as follows.

A: The OD of black ink is 1.4 or higher, or the OD of color ink is 1.2 or higher.
B: The OD of black ink is 1.3 or higher and lower than 1.4, or the OD of color ink is 1.15 or higher and lower than 1.2.
C: The OD of black ink is lower than 1.3, or the OD of color ink is lower than 1.15.

5) Print Quality

Large and small alphabet letters A,a to Z,z were printed on various kinds of paper using the Epson inkjet printer PM-720C loaded with an ink cartridge filled with each of the inks prepared in Examples and Comparative Examples. The printed letters were observed with the naked eye and ranked AA, A, B or C based on the following standard. Printing papers used were Conqueror, Favorit, Modo, Rapid Copy, EPSON EPP, Xerox P, Xerox 4042, Xerox 10, Neenha Bond, Ricopy 6200, Yamayuri (regenerated paper), and Xerox R (regenerated paper). All the papers except Yamayuri and Xerox R are plain papers.

AA: No feathering occurs on any paper.
A: Slight feathering is observed on two or three papers.
B: Slight feathering is observed on all papers.
C: Appreciable feathering is observed on all papers.

6) Color Developability

MC Semigloss Photo Paper (available from Seiko Epson Corp.) and plain paper Xerox P (from Xerox Corp.) were each printed solid on the Epson inkjet printer PM-720C loaded with an ink cartridge filled with each of the inks prepared in Examples and Comparative Examples. The C* value of the solid printed area was measured. The color developability on plain paper was evaluated from the ratio of the C* value on Xerox P to that on MC Semigloss Photo Paper according to the following standard.

A: 0.9 or higher
B: 0.8 or higher and lower than 0.9
C: lower than 0.8

7) Abrasion Resistance

Super Fine Glossy Film (designed for inkjets, available from Seiko Epson) was printed solid (printing duty ratio: 100%) in an area of 10 mm×10 mm on the Epson inkjet printer PM-720C loaded with an ink cartridge filled with each of the inks of Examples and Comparative Examples. After the printed matter was left to stand at 25° C. for 1 hour, the printed area was abraded with a water-based, fluorescent yellow marker pen ZEBRA PEN 2 (available from Zebra Pen Corp.) under a load of 500 g at a stroke speed of 10 mm/sec, and occurrence of smearing was observed and rated as follows.

A: Two strokes causes no smearing.
B: One stroke causes no smearing, but two strokes causes smearing.
C: One stroke causes smearing.

8) Water Resistance

One milliliter of ion-exchanged water was dropped on the printed image of the printed matter obtained in (4) above (evaluation of image density). After 20 minutes, the condition of the printed image was observed with the naked eye and rated as follows.

A: No change occurs on all papers.
B: The colorant slightly dissolves but leaves letters legible.
C: The colorant dissolves and spreads to make letters illegible.

9) Ejection Stability

Ruling lines 1 mm thick were printed on Super Fine (paper designed for inkjets, available from Seiko Epson) by use of the Epson inkjet printer PM-720 loaded with each ink of Examples and Comparative Examples. Print defects, such as dot missing and dot placement errors, were observed with the naked eye and rated on the following basis.

A: No dot missing nor dot placement errors occur in obtaining 10000 or more prints.
B: Dot missing or dot placement errors occur in obtaining 1000 or more prints and less than 10000 prints.
C: Dot missing or dot placement errors occur in obtaining 100 or more prints and less than 1000 prints.
D: Dot missing or dot placement errors occur in obtaining less than 100 prints.

10) Non-Clogging Properties

After the printing test in (5) above (evaluation of print quality), the inkjet printer was switched off. After one week suspension, the same printing test was carried out. The condition of ink ejection was observed with the naked eye and rated as follows.

A: Printing is resumed normally on inputting image signals without requiring a cleaning operation.
B: Normal printing starts after three or fewer cleaning operations.
C: Normal printing starts after six or fewer cleaning operations.
D: Normal printing does not start even after seven or more cleaning operations.

11) Freedom from White Blank

Each of the plain papers used in (5) above (evaluation of print quality) was printed solid on the Epson ink jet printer PM-720C loaded with an ink cartridge filled with the ink of Examples and Comparative Examples. The solid printed area was inspected for what we call white blanks with the naked eye and ranked as follows. White blanks as referred to herein are small spots where the background color of the paper is exposed without attachment of ink.

A: White blanks are not observed.
B: White blanks are slightly observed.
C: White blanks are observed.
D: Many white blanks are observed.

TABLE 12

| Example No. | Dispersibility-1 | Dispersibility-2 | Dispersion Stability | Non-settling Properties | Image Density | Print quality | Color Developability | Abrasion Resistance | Water Resistance | Ejection Stability | Non-clogging Properties | White blanks |
|---|---|---|---|---|---|---|---|---|---|---|---|---|
| 1-1 | A | A | A | A | A | A | AA | A | B | A | A | B | A |
| 1-2 | A | A | A | A | A | A | AA | A | B | A | A | B | A |
| 1-3 | B | B | B | A | A | A | A | A | A | A | B | B | B |
| 1-4 | A | A | A | A | A | A | AA | A | A | A | A | B | A |
| 1-5 | A | A | A | A | A | A | AA | A | A | A | A | B | A |
| 1-6 | A | A | A | A | A | A | AA | A | B | A | A | B | A |
| 1-7 | A | A | A | A | A | A | AA | A | B | A | A | B | A |
| 1-8 | A | A | A | A | A | A | AA | A | B | A | A | B | A |
| 1-9 | A | A | A | A | A | A | AA | A | A | A | A | A | A |
| 1-10 | A | A | A | A | A | A | AA | A | A | A | A | A | A |
| 1-11 | A | A | A | A | A | A | AA | A | A | A | A | A | A |

TABLE 13

| Example No. | Disper-sibility-1 | Disper-sibility-2 | Dispersion Stability | Non-settling Properties | Image Density | Print quality | Color Develop-ability | Abrasion Resis-tance | Water Resis-tance | Ejection Stability | Non-clogging Properties | White blanks |
|---|---|---|---|---|---|---|---|---|---|---|---|---|
| 2-1 | A | A | A | A | A | AA | — | A | A | A | B | A |
| 2-2 | B | B | A | A | A | AA | — | A | A | A | A | A |
| 2-3 | A | A | A | A | A | AA | — | A | A | A | A | A |
| 2-4 | A | A | A | A | A | AA | A | A | A | A | A | A |
| 2-5 | A | A | A | A | A | AA | A | A | A | A | B | A |
| 2-6 | A | A | A | A | A | AA | A | A | A | A | A | A |
| 2-7 | A | A | A | A | A | AA | A | A | A | A | A | A |
| 2-8 | A | A | A | A | A | AA | A | A | A | A | A | A |
| 2-9 | A | A | A | A | A | AA | A | A | A | A | B | A |
| 2-10 | A | A | A | A | A | AA | A | A | A | A | B | A |
| 2-12 | A | A | A | A | A | AA | A | A | A | A | A | A |
| 2-13 | A | A | A | A | A | AA | A | A | A | A | A | A |

TABLE 14

| Example No. | Disper-sibility-1 | Disper-sibility-2 | Dispersion Stability | Non-settling Properties | Image Density | Print quality | Color Develop-ability | Abrasion Resis-tance | Water Resis-tance | Ejection Stability | Non-clogging Properties | White blanks |
|---|---|---|---|---|---|---|---|---|---|---|---|---|
| 3-1 | A | A | A | A | A | AA | A | A | A | A | B | A |
| 3-2 | A | A | A | A | A | AA | A | A | A | A | B | A |
| 3-3 | A | A | A | A | A | AA | A | A | A | A | B | A |
| 3-4 | A | A | A | A | A | AA | A | A | A | A | B | A |
| 3-5 | A | A | A | A | A | AA | A | A | A | A | B | A |
| 3-6 | A | A | A | A | A | AA | A | A | A | A | B | A |
| 3-7 | A | A | A | A | A | AA | A | A | A | A | B | A |
| 3-8 | A | A | A | A | A | AA | A | A | A | A | B | A |
| 3-9 | A | A | A | A | A | AA | A | A | A | A | B | A |
| 3-10 | A | A | A | A | A | AA | A | A | A | A | A | A |

TABLE 15

| Comp. Example No. | Disper-sibility-1 | Disper-sibility-2 | Dispersion Stability | Non-settling Properties | Image Density | Print quality | Color Develop-ability | Abrasion Resis-tance | Water Resis-tance | Ejection Stability | Non-clogging Properties | White blanks |
|---|---|---|---|---|---|---|---|---|---|---|---|---|
| 1-1 | B | B | B | A | C | C | — | B | A | B | C | C |
| 1-2 | A | A | A | A | C | C | B | B | A | A | B | C |
| 1-3 | A | A | A | A | C | C | B | B | A | A | B | C |
| 1-4 | A | A | A | A | C | C | B | B | A | A | B | C |
| 1-5 | C | C | C | B | B | C | — | A | A | C | C | C |
| 1-6 | B | B | B | A | B | C | B | A | A | B | C | C |
| 1-7 | C | C | C | B | B | C | B | A | A | C | C | C |
| 1-8 | B | B | B | A | B | C | B | A | A | B | C | C |
| 1-9 | A | A | A | A | A | A | — | C | A | A | A | A |
| 1-10 | A | A | A | A | A | A | — | C | A | A | A | A |
| 1-11 | A | A | A | A | A | A | A | C | A | A | A | A |
| 1-12 | A | A | A | A | A | A | A | C | A | A | A | A |
| 1-13 | A | A | A | A | A | A | A | C | A | A | A | A |

TABLE 16

| Comp. Example No. | Disper-sibility-1 | Disper-sibility-2 | Dispersion Stability | Non-settling Properties | Image Density | Print quality | Color Develop-ability | Abrasion Resis-tance | Water Resis-tance | Ejection Stability | Non-clogging Properties | White blanks |
|---|---|---|---|---|---|---|---|---|---|---|---|---|
| 2-1 | D | D | C | B | B | B | — | C | A | D | C | C |
| 2-2 | C | C | C | V | C | C | — | C | A | C | C | D |
| 2-3 | C | C | C | B | C | C | C | C | A | C | C | D |
| 2-4 | D | D | C | B | B | B | B | C | A | D | C | C |
| 2-5 | C | B | C | B | C | C | C | C | A | C | C | D |
| 2-6 | B | B | B | A | C | C | — | B | A | B | C | C |
| 2-7 | B | B | B | A | C | C | B | B | A | B | C | C |
| 2-8 | B | B | B | A | C | C | B | B | A | B | C | C |
| 2-9 | B | C | B | A | C | C | B | B | A | B | C | C |
| 2-10 | C | C | C | B | B | C | — | A | A | C | C | C |

TABLE 16-continued

| Comp. Example No. | Dispersibility-1 | Dispersibility-2 | Dispersion Stability | Non-settling Properties | Image Density | Print quality | Color Developability | Abrasion Resistance | Water Resistance | Ejection Stability | Non-clogging Properties | White blanks |
|---|---|---|---|---|---|---|---|---|---|---|---|---|
| 2-11 | C | C | C | B | B | C | B | A | A | C | B | B |
| 2-12 | C | C | C | B | B | C | B | A | A | C | B | B |
| 2-13 | C | C | C | B | B | C | B | A | A | C | B | B |

TABLE 17

| Comp. Example No. | Dispersibility-1 | Dispersibility-2 | Dispersion Stability | Non-settling Properties | Image Density | Print quality | Color Developability | Abrasion Resistance | Water Resistance | Ejection Stability | Non-clogging Properties | White blanks |
|---|---|---|---|---|---|---|---|---|---|---|---|---|
| 3-1 | B | B | B | A | A | A | — | A | A | B | C | B |
| 3-2 | B | B | B | A | A | A | — | A | A | B | C | B |
| 3-3 | B | B | B | A | A | A | — | A | A | B | C | B |
| 3-4 | B | B | B | A | A | A | B | A | A | B | C | B |
| 3-5 | B | B | B | A | A | A | B | A | A | B | C | B |
| 3-6 | B | B | B | A | A | A | B | A | A | B | C | B |
| 3-7 | A | A | B | A | B | A | — | A | A | A | C | B |
| 3-8 | A | A | A | A | B | A | — | A | A | A | C | B |
| 3-9 | A | A | A | A | B | A | — | A | A | A | C | B |
| 3-10 | A | A | A | A | B | A | B | A | A | A | C | B |
| 3-11 | A | A | A | A | B | A | B | A | A | A | C | B |
| 3-12 | A | A | A | A | B | A | B | A | A | A | C | B |
| 3-13 | D | D | C | B | B | B | — | C | A | D | C | C |
| 3-14 | C | C | C | B | C | C | — | C | A | C | C | D |

As shown in Tables 12 through 17, the ink jet printing inks of Examples were proved superior in all the tested attributes.

The inks of Examples 1-9 to 1-11, Comparative Examples 2-11 to 2-13 and Comparative Example 3-10, which contain a solid wetting agent, gave particularly satisfactory results in the test of non-clogging properties.

The inks of Comparative Examples 2-1 to 2-5, 3-13, and 3-14, in which the pigment is dispersed by a dispersant, are found insufficient in dispersibility, dispersion stability, image density, print quality, color developability, abrasion resistance, and ejection stability. The inks of Comparative Examples 1-1 to 1-4 and 2-6 to 2-9, which comprise a conventional microencapsulated pigment obtained by coating pigment particles that have not been treated with an anionic group-imparting agent with a polymer and which have a lower pigment content than the inks of Examples, are excellent in dispersion stability and ejection stability but fail to achieve sufficient print quality in terms of image density, print quality, abrasion resistance, and color developability.

The inks of Comparative Examples 1-5 to 1-8 and 2-10 to 2-13, which comprise the conventional microencapsulated pigment and has the same pigment content as the inks of Examples, are particularly inferior in dispersibility, dispersion stability, and ejection stability. The inks of Comparative Examples 3-1 to 3-12 have markedly poor reliability against clogging. The inks of Comparative Examples 1-9 to 1-13 containing pigment particles having been treated with an anionic group-imparting agent are, while superior in dispersion stability and ejection stability, inferior in abrasion resistance.

As described above, the present invention provides a microencapsulated pigment, a process for producing the microencapsulated pigment, and an aqueous dispersion, with which to provide an ink jet recording ink satisfying all the requirements: (1) high dispersion stability, (2) high ejection stability, (3) capability of forming images with excellent fastness, (4) capability of forming images with high density, (5) capability of forming images with excellent abrasion resistance, and (6) capability of forming images which hardly feather and show high color developability even on plain paper.

Accordingly, the present invention provides an ink jet recording ink satisfying all the above requirements (1) to (6).

While the invention has been described in detail and with reference to the specific embodiments thereof, it will be apparent to those skilled in the art that various changes and modifications can be made therein without departing from the spirit and the scope thereof.

This application is based on Japanese Patent Application No. 2001-256025 filed Aug. 27, 2001, No. 2001-256033 filed Aug. 27, 2001, No. 2002-38793 filed Feb. 15, 2002, and No. 2002-242979 filed Aug. 23, 2002, the entire contents thereof being hereby incorporated by reference.

What is claimed is:

1. A process for producing a microencapsulated pigment, comprising
coating pigment particles having a hydrophilic group on the surface thereof with a polymer,
wherein said hydrophilic group on the surface of the pigment particles is an anionic group and the coating step comprises the steps of: (a) mixing a polymerization initiator having a cationic group with an aqueous dispersion having dispersed therein the pigment particles having the anionic group under a condition that does not activate said polymerization initiator; (b) adding a hydrophilic monomer, a surface active agent and, optionally, a comonomer copolymerizable with said hydrophilic monomer to the dispersion; and (c) activating said polymerization initiator to carry out emulsion polymerization.

2. The process according to claim 1, wherein the hydrophilic monomer, a the comonomer copolymerizable with said hydrophilic monomer, and a the surface active agent are added to the dispersion in step (c).

3. The process according to claim 2, wherein said comonomer is at least one of a hydrophilic monomer or a hydrophobic monomer.

4. The process according to claim 3, wherein said hydrophobic monomer has at least a hydrophobic group and a polymerizable group in its molecule, and is selected from the group consisting of an aliphatic hydrocarbon group, an alicyclic hydrocarbon group and an aromatic hydrocarbon group.

5. The process according to claim 4, wherein said polymerizable group is a radically polymerizable unsaturated hydrocarbon group and is selected from the group consisting of a vinyl group, an allyl group, an acryloyl group, a methacryloyl group, a propenyl group, a vinylidene group, and a vinylene group.

6. The process according to claim 3, wherein said hydrophilic monomer has at least a hydrophilic group and a polymerizable group in its molecule thereof, and said hydrophilic group is selected from the group consisting of a sulfonic acid group or a salt thereof, a sulfinic acid group or a salt thereof, a carboxyl group or a salt thereof, a carbonyl group or a salt thereof, a hydroxyl group, an oxyethylene group, an amido group, and an amino group.

7. The process according to claim 1, wherein said polymerization initiator is at least one member selected from the group consisting of 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(2-imidazolin-2-yl)propane] disulfite dihydrate, 2,2'-azobis[2-(3,4,5,6-tetrahydropyrimidin-2-yl)propane] dihydrochloride, 2,2'-azobis[2-[1-(2-hydroxyethyl)-2-imidazolin-2-yl] propane] dihydrochioride, and 2,2'-azobis(2-amidinopropane)dihydrochioride.

8. The process according to claim 1, wherein said surface active agent is a polymerizable surface active agent having a hydrophilic group, a hydrophobic group, and a polymerizable group.

9. The process according to claim 8, wherein said polymerizable group of said polymerizable surface active agent is selected from the group consisting of a vinyl group, an allyl group, an acryloyl group, a methacryloyl group, a propenyl group, a vinylidene group, and a vinylene group.

10. The process according to claim 8, wherein said hydrophilic group of said polymerizable surface active agent is at least one of: an anionic group selected from the group consisting of a sulfonic acid group or a salt thereof a sulfinic acid group or a salt thereof, a carboxyl group or a salt thereof, or a carbonyl group or a salt thereof; and a nonionic group selected from the group consisting of a hydroxyl group, and an oxyethylene group.

11. The process according to claim 8, wherein said hydrophobic group of said polymerizable surface active agent is selected from the group consisting of an alkyl group, an aryl group, and a group composed of a combination thereof.

12. The process according to claim 1, wherein said hydrophilic group of said pigment particles is at least one of a sulfonic acid group ($-SO_3H$) and a sulfinic acid group of the formula $-RSO_2H$; wherein R represents an alkyl group having 1 to 12 carbon atoms, or a phenyl.

13. The process according to claim 1, wherein said hydrophilic group of said pigment particles is at least one of a sulfonic acid anion ($-SO_3^-$) and a sulfinic acid anion of the formula $-RSO_2^-$; wherein R represents an alkyl group having 1 to 12 carbon atoms, or a phenyl.

14. The process according to claim 1, wherein said hydrophilic group of said pigment particles is at least one of a carboxyl group ($-COOH$) or a carboxylate anion ($-COO^-$).

* * * * *